United States Patent
Compte Grau et al.

(10) Patent No.: US 12,454,577 B2
(45) Date of Patent: Oct. 28, 2025

(54) TRIMERIC POLYPEPTIDE COMPLEXES COMPRISING A COLLAGEN XVIII HOMOTRIMERIZATION DOMAIN AND/OR A COLLAGEN XV HOMOTRIMERIZATION AND AN AGONIST OF A TNFR FAMILY COSTIMULATORY RECEPTOR, ENCODING POLYNUCLEOTIDE THEREOF AND METHOD OF USE THEREOF TO TREAT CANCER

(71) Applicant: LEADARTIS, S.L., Madrid (ES)

(72) Inventors: Marta Compte Grau, Madrid (ES); Luis Álvarez Vallina, Madrid (ES)

(73) Assignee: LEADARTIS, S.L., Madrid (ES)

( * ) Notice: Subject to any disclaimer, the term of this patent is extended or adjusted under 35 U.S.C. 154(b) by 972 days.

(21) Appl. No.: 16/972,654

(22) PCT Filed: Jun. 6, 2019

(86) PCT No.: PCT/EP2019/064864
§ 371 (c)(1),
(2) Date: Dec. 7, 2020

(87) PCT Pub. No.: WO2019/234187
PCT Pub. Date: Dec. 12, 2019

(65) Prior Publication Data
US 2021/0246217 A1 Aug. 12, 2021

(30) Foreign Application Priority Data
Jun. 6, 2018 (EP) .................................. 18382401

(51) Int. Cl.
| C07K 16/28 | (2006.01) |
| A61K 39/00 | (2006.01) |
| A61P 35/00 | (2006.01) |
| C07K 16/30 | (2006.01) |

(52) U.S. Cl.
CPC .......... *C07K 16/2878* (2013.01); *A61P 35/00* (2018.01); *C07K 16/2863* (2013.01); *C07K 16/3007* (2013.01); *A61K 2039/505* (2013.01); *C07K 2317/31* (2013.01); *C07K 2317/75* (2013.01); *C07K 2317/92* (2013.01); *C07K 2317/94* (2013.01)

(58) Field of Classification Search
CPC ............ C07K 16/2878; C07K 16/2863; C07K 16/3007; C07K 2317/31; C07K 2317/75; C07K 2317/92; C07K 2317/94; A61P 35/00; A61K 2039/505
See application file for complete search history.

(56) References Cited

U.S. PATENT DOCUMENTS

| 11,485,790 B2 | 11/2022 | Igawa et al. |
| 2015/0139991 A1 | 5/2015 | Alvarez et al. |
| 2019/0169308 A1 | 6/2019 | Dahlen et al. |

FOREIGN PATENT DOCUMENTS

| WO | WO 94/18227 | 8/1994 |
| WO | 2012049328 A1 | 4/2012 |
| WO | WO 2017/098005 | 6/2017 |
| WO | 2017182672 A1 | 10/2017 |

OTHER PUBLICATIONS

Cuningham BC and Wells JA. (Jun. 2, 1989) Science. 244:1081-1085. (DOI: 10.1126/science.2471267).*
Pak MA, et al. (2023) PLoS ONE. 18(3):9 pages. e0282689. (https://doi.org/10.1371/journal.pone.0282689).*
Melero, I. et al., Monoclonal Antibodies against the 4-1BB T-cell activation molecule eradicate established tumors, 1997, Nature Medicine, vol. 3, No. 6, pp. 682-685.
Neil H. Segal et al., Results from an Integrated Safety Analysis of Urelumab, an Agonist Anti-CD137 Monoclonal Antibody, 2016 Clinical Cancer Research, vol. 23, No. 8, pp. 1929-1936.
Altschul et al. Gapped BLAST and PSI-BLAST: a new generation of protein database search programs, *Nucleic Acids Research*, 1997;25(17):3389-3402.
Binz et al. Engineering novel binding proteins from nonimmunoglobulin domains, *Nature Biotechnology*, 2005;23(10):1257-1268.
Chothia et al. Canonical Structures for the Hypervariable Regions of Immunoglobulins, *J. Mol. Biol.*, 1987;196:901-917.
Henikoff et al. Amino acid substitution matrices from protein blocks, *Proc. Natl. Acad. Sci.*, 1992;89:10915-10919.
Humphrey et al. Anti-synthetic peptide antibody reacting at the fusion junction of deletion-mutant epidermal growth factor receptors in human glioblastoma, *Proc. Natl. Acad. Sci.*, 1990;87:4207-4211.
James at al. Benzodiazepine Peptidomimetics: Potent Inhibitors of Ras Farnesylation in Animal Cells, *Science*, 1993;260:1937-1942.
Jones. Proteinase Mutants of *Saccharomyces cerevisiae*, *Genetics*, 1977;85:23-33.

(Continued)

*Primary Examiner* — Robert S Landsman
(74) *Attorney, Agent, or Firm* — Casimir Jones, S.C.; Tristan A. Fuierer

(57) ABSTRACT

The invention relates to tumor-targeted trimeric polypeptides based on the homotrimerization region from collagen XV or XVIII and which contain domains capable of specifically binding to and activating receptors of the TNFR family of costimulatory receptors as well as to the uses thereof in the treatment of cancer.

27 Claims, 37 Drawing Sheets
Specification includes a Sequence Listing.

(56) References Cited

OTHER PUBLICATIONS

Lefranc et al. IMGT unique numbering for immunoglobulin and T cell receptor variable domains and Ig superfamily V-like domains, *Developmental and Comparative Immunology*, 2003;27:55-77.

Niu et al. Cytokine-Mediated Disruption of Lymphocyte Trafficking, Hemopoiesis, and Induction of Lymphopenia, Anemia, and Thrombocytopenia in Anti-CD137-Treated Mice, *J. Immunol.* 2007;178:4194-4213.

Wu et al. An Analysis of the Sequences of the Variable Regions of Bence Jones Proteins and Myeloma Light Chains and their Implications for Anti- Body Complementarity, *J Exp Med*, 1970;132:211-50.

International Search Report, International Patent Application No. PCT/EP2019/064864, Aug. 14, 2019.

Blanco-Toribio et al.; "Generation and characterization of monospecific and bispecific hexavalent trimerbodies," 2013 MAbs. vol. 5(1): pp. 70-79.

Harwood et al.; "ATTACK, a novel bispecific T cell-recruiting antibody with trivalent EGFR binding and monovalent CD3 binding for cancer immunotherapy," 2018 Oncoimmunology, vol. 7(1):e1377874; https://doi.org/10.1080/2162402X.2017.1377874.

Hinner et al.; "Costimulatory T cell engagement via a novel bispecific anti-CD137/anti-HER2 protein," 2015, Journal for Immuno Therapy of Cancer, vol. 3(Suppl 2):P187; doi:10.1186/2051-1426-3-S2-P187.

Hinner et al., "Costimulatory T cell engagement by PRS-343, a 4-1BB (CD137)/HER2 bispecific, leads to tumor growth inhibition and TIL expansion in humanized mouse model," 2016, ABSTRACT.

Shuford et al.; "4-1BB Costimulatory Signals Preferentially Induce CD8+ T Cell Proliferation and Lead to Amplification In Vivo of Cytotoxic T Cell Responses," 1997, J Exp Med, vol. 186(1): pp. 47-55.

Schmitz et al.; "Structural evaluation of EGFR inhibition mechanisms for nanobodies/VHH domains," 2013, Structure vol. 21(7): pp. 1214-1224.

Compte et al.; "A tumor-targeted trimeric 4-1BB-agonistic antibody induces potent anti-tumor immunity without systemic toxicity," 2018, Nat Commun, vol. 9(1):4809; DOI: 10.1038/s41467-018-07195-w.

Bartkowiak et al.; "4-1BB agonists: multi-potent potentiators of tumor immunity," 2015, Front Oncol, vol. 5:117; doi: 10.3389/fonc.2015.00117.

Alvarez-Cienfuegos et al. "Intramolecular trimerization, a novel strategy for making multispecific antibodies with controlled orientation of the antigen binding domains," 2016, Sci Rep, vol. 6:28643; DOI: 10.1038/srep28643.

Cuesta et al.; "In Vivo Tumor Targeting and Imaging with Engineered Trivalent Antibody Fragments Containing Collagen-Derived Sequences," 2009, PLoS On, e 4(4):e5381; doi:10.1371/journal.pone.0005381.

Compte et al., An Fc-free EGFR-specific 4-1BB-agonistic Trimerbody Displays Broad Antitumor Activity in Humanized Murine Cancer Models without Toxicity, Jun. 1, 2021, Clinical Cancer Research, vol. 27, No. 11, pp. 3167-3177.

Mittler et al., Anti-4-1BB Monoclonal Antibodies Abrogate T Cell-dependent Humoral Immune Responses In Vivo through the Induction of Helper T Cell Anergy, Nov. 15, 1999, Journal of Experimental Medicine, vol. 190, No. 10, pp. 1535-1540.

Muik et al., Preclinical Characterization and Phase I Trial Results of a Bispecific Antibody Targeting PD-L1 and 4-1BB (GEN1046) in Patients with Advanced Refractory Solid Tumors, May 2022, Cancer Discovery, vol. 12, pp. 1248-1265.

Wu et al., Phase I study of the efficacy and safety of IB1319 in patients with advanced malignant tumors, 2022, Journal of Clinical Oncology, vol. 40, No. 16 Suppl: 2646.

Compte et al., An EGFR-Targeted 4-1BB-agonistic Trimerbody Does Not Induce Hepatotoxicity in Transgenic Mice With Liver Expression of Human EGFR, Frontiers in Immunology, Jan. 7, 2021, vol. 11, art. 614363.

Silva-Pilipich et al., Local delivery of optimized nanobodies targeting the PD-1/PD-L1 axis with a self-amplifying RNA viral vector induces potent antitumor responses, Cancer Letters, May 1, 2023, vol. 561, art. 216139.

* cited by examiner

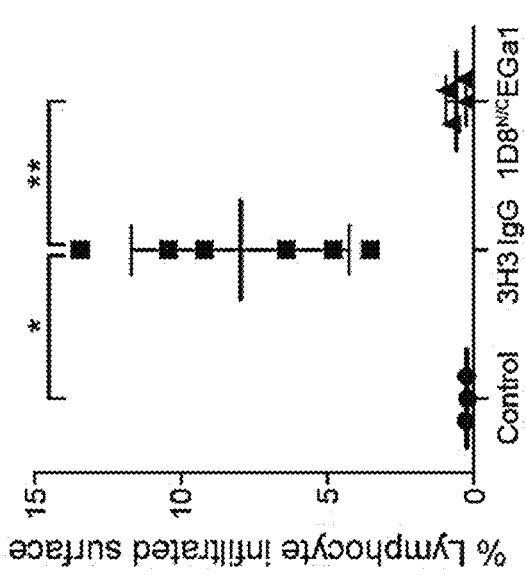
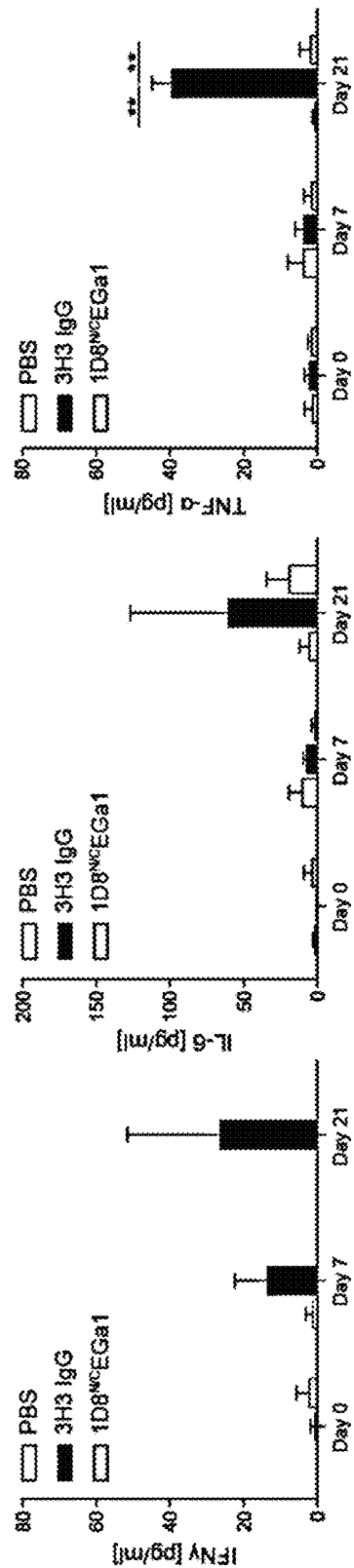
FIGURE 6C
FIGURE 6D

SEQUENCE LISTING

```
<160> NUMBER OF SEQ ID NOS: 14

<210> SEQ ID NO 1
<211> LENGTH: 59
<212> TYPE: PRT
<213> ORGANISM: Artificial Sequence
<220> FEATURE:
<223> OTHER INFORMATION: COLLAGEN XVIII TRIMERIZATION DOMAIN

<400> SEQUENCE: 1

Ser Gly Val Ala Leu Thr Ala Thr Ala Gly Ala Met Leu Gly Gly Val
1               5                   10                  15

His Gly Val Pro Gly Gly Thr Leu Ile Pro Val Ala Gly Gly Gly Gly
            20                  25                  30

Leu Thr Val Ala Val Gly Ala Gly Pro Ala Leu Val Gly Leu Gly Ala
        35                  40                  45

Ala Thr Pro Leu Pro Ala Gly Thr Ala Ala Gly
    50                  55

<210> SEQ ID NO 2
<211> LENGTH: 64
<212> TYPE: PRT
<213> ORGANISM: Artificial Sequence
<220> FEATURE:
<223> OTHER INFORMATION: Collagen XV trimerization domain

<400> SEQUENCE: 2

Val Thr Ala Pro Ser Ala Met Ala Ala Met Leu Gly Leu Ala His Leu
1               5                   10                  15

Val Ile Gly Gly Thr Pro Ile Thr Leu Ala Ala Ser Thr Gly Pro Pro
            20                  25                  30

Ile Ala Val Ala Ala Gly Thr Leu Leu Leu Gly Leu Gly Gly Leu Ile
        35                  40                  45

Pro Ile Pro Ala Ala Ser Pro Pro Pro Ala Leu Ser Ser Ala Pro
    50                  55                  60

<210> SEQ ID NO 3
<211> LENGTH: 396
<212> TYPE: PRT
<213> ORGANISM: Artificial Sequence
<220> FEATURE:
<223> OTHER INFORMATION: Ega1 (VHH)

<400> SEQUENCE: 3

Ala Thr Gly Gly Cys Thr Cys Ala Gly Gly Thr Gly Cys Ala Gly Cys
1               5                   10                  15

Thr Gly Cys Ala Gly Gly Ala Gly Thr Cys Thr Gly Gly Gly Gly Gly
            20                  25                  30

Ala Gly Gly Ala Thr Thr Gly Gly Thr Gly Cys Ala Gly Cys Cys Ala
        35                  40                  45

Gly Gly Gly Gly Gly Cys Thr Cys Gly Cys Thr Gly Ala Gly Ala Cys
    50                  55                  60

Thr Cys Thr Cys Cys Thr Gly Thr Gly Cys Ala Gly Cys Cys Thr Cys
65                  70                  75                  80
```

-continued

Thr Gly Gly Ala Cys Gly Cys Ala Cys Cys Thr Cys Ala Gly Thr
                85                  90                  95

Ala Gly Cys Thr Ala Thr Gly Cys Cys Ala Thr Gly Gly Cys Thr
            100                 105                 110

Gly Gly Thr Thr Cys Cys Gly Cys Cys Ala Gly Gly Cys Thr Cys
            115                 120                 125

Ala Gly Gly Gly Ala Ala Gly Ala Gly Cys Gly Thr Gly Ala Gly
            130                 135                 140

Thr Thr Thr Gly Thr Ala Gly Cys Ala Gly Cys Thr Ala Thr Ala
145                 150                 155                 160

Gly Gly Thr Gly Gly Ala Gly Thr Gly Gly Thr Gly Gly Thr Ala
            165                 170                 175

Cys Ala Cys Ala Thr Ala Cys Thr Ala Thr Ala Cys Ala Gly Ala Cys
            180                 185                 190

Thr Cys Cys Gly Thr Gly Ala Ala Gly Gly Cys Cys Gly Ala Thr
            195                 200                 205

Thr Cys Ala Cys Cys Ala Thr Cys Thr Cys Cys Ala Gly Ala Gly
            210                 215                 220

Cys Ala Ala Cys Gly Cys Cys Ala Ala Gly Ala Cys Thr Ala Cys Gly
225 230 235 240

Gly Thr Gly Thr Ala Thr Cys Thr Gly Cys Ala Ala Ala Thr Gly Ala
245 250 255

Ala Cys Ala Gly Cys Cys Thr Gly Ala Ala Ala Cys Cys Thr Gly Ala
260 265 270

Gly Gly Ala Cys Ala Cys Gly Gly Cys Cys Gly Thr Thr Thr Ala Thr
275 280 285

Thr Ala Cys Thr Gly Thr Gly Cys Ala Gly Cys Ala Ala Cys Ala Thr
290 295 300

Ala Cys Cys Thr Cys Thr Cys Cys Thr Cys Gly Gly Ala Cys Thr Ala
305 310 315 320

Thr Ala Gly Cys Cys Gly Cys Thr Ala Thr Gly Cys Gly Thr Thr Gly
325 330 335

Cys Cys Cys Cys Ala Ala Ala Gly Gly Cys Cys Cys Thr Thr Gly Gly
340 345 350

Ala Cys Thr Ala Thr Gly Ala Cys Thr Ala Cys Thr Gly Gly Gly Gly
355 360 365

Cys Cys Ala Gly Gly Gly Gly Ala Cys Cys Cys Ala Gly Gly Thr Cys
370 375 380

Ala Cys Cys Gly Thr Cys Thr Cys Cys Thr Cys Ala
385 390 395

<210> SEQ ID NO 4
<211> LENGTH: 130
<212> TYPE: PRT
<213> ORGANISM: Artificial Sequence
<220> FEATURE:
<223> OTHER INFORMATION: Ega1 (VHH)

<400> SEQUENCE: 4

Gln Val Gln Leu Gln Glu Ser Gly Gly Gly Leu Val Gln Pro Gly Gly
1 5 10 15

Ser Leu Arg Leu Ser Cys Ala Ala Ser Gly Arg Thr Phe Ser Ser Tyr
20 25 30

Ala Met Gly Trp Phe Arg Gln Ala Pro Gly Lys Glu Arg Glu Phe Val
35 40 45

```
Ala Ala Ile Arg Trp Ser Gly Gly Tyr Thr Tyr Tyr Thr Asp Ser Val
         50                  55                  60

Lys Gly Arg Phe Thr Ile Ser Arg Asp Asn Ala Lys Thr Thr Val Tyr
 65                  70                  75                  80

Leu Gln Met Asn Ser Leu Lys Pro Glu Asp Thr Ala Val Tyr Tyr Cys
                 85                  90                  95

Ala Ala Thr Tyr Leu Ser Ser Asp Tyr Ser Arg Tyr Ala Leu Pro Gln
             100                 105                 110

Arg Pro Leu Asp Tyr Asp Tyr Trp Gly Gln Gly Thr Gln Val Thr Val
         115                 120                 125

Ser Ser
    130

<210> SEQ ID NO 5
<211> LENGTH: 8
<212> TYPE: PRT
<213> ORGANISM: Artificial Sequence
<220> FEATURE:
<223> OTHER INFORMATION: Ega1 (VHH) CDR1

<400> SEQUENCE: 5

Gly Arg Thr Phe Ser Ser Tyr Ala
1               5

<210> SEQ ID NO 6
<211> LENGTH: 8
<212> TYPE: PRT
<213> ORGANISM: Artificial Sequence
<220> FEATURE:
<223> OTHER INFORMATION: Ega1 (VHH) CDR2

<400> SEQUENCE: 6

Ile Arg Trp Ser Gly Gly Tyr Thr
1               5

<210> SEQ ID NO 7
<211> LENGTH: 23
<212> TYPE: PRT
<213> ORGANISM: Artificial Sequence
<220> FEATURE:
<223> OTHER INFORMATION: Ega1 (VHH) CDR3

<400> SEQUENCE: 7

Ala Ala Thr Tyr Leu Ser Ser Asp Tyr Ser Arg Tyr Ala Leu Pro Gln
1               5                   10                  15

Arg Pro Leu Asp Tyr Asp Tyr
            20

<210> SEQ ID NO 8
<211> LENGTH: 8
<212> TYPE: PRT
<213> ORGANISM: Artificial Sequence
<220> FEATURE:
<223> OTHER INFORMATION: FLAG tag

<400> SEQUENCE: 8

Asp Tyr Lys Asp Asp Asp Asp Lys
1               5

<210> SEQ ID NO 9
<211> LENGTH: 8
<212> TYPE: PRT
<213> ORGANISM: Artificial Sequence
<220> FEATURE:
```

<223> OTHER INFORMATION: StrepII tag

<400> SEQUENCE: 9

Trp Ser His Pro Gln Phe Glu Lys
1               5

<210> SEQ ID NO 10
<211> LENGTH: 18
<212> TYPE: PRT
<213> ORGANISM: Artificial Sequence
<220> FEATURE:
<223> OTHER INFORMATION: Linker sequence

<400> SEQUENCE: 10

Ser Gly Ala Gly Gly Ser Gly Gly Ser Ser Gly Ser Asp Gly Ala Ser
1               5                   10                  15

Gly Ser

<210> SEQ ID NO 11
<211> LENGTH: 16
<212> TYPE: PRT
<213> ORGANISM: Artificial Sequence
<220> FEATURE:
<223> OTHER INFORMATION: Linker sequence

<400> SEQUENCE: 11

Ser Gly Ala Gly Gly Ser Gly Gly Ser Ser Gly Ser Asp Gly Ala Ser
1               5                   10                  15

<210> SEQ ID NO 12
<211> LENGTH: 61
<212> TYPE: PRT
<213> ORGANISM: Artificial Sequence
<220> FEATURE:
<223> OTHER INFORMATION: Murine TIE XVIII

<400> SEQUENCE: 12

Gly Gln Val Arg Ile Trp Ala Thr Tyr Gln Thr Met Leu Asp Lys Ile
1               5                   10                  15

Arg Glu Val Pro Glu Gly Trp Leu Ile Phe Val Ala Glu Arg Glu Glu
            20                  25                  30

Leu Tyr Val Arg Val Arg Asn Gly Phe Arg Lys Val Leu Leu Glu Ala
        35                  40                  45

Arg Thr Ala Leu Leu Arg Gly Thr Gly Asn Glu Val Ala
    50                  55                  60

<210> SEQ ID NO 13
<211> LENGTH: 21
<212> TYPE: DNA
<213> ORGANISM: Artificial Sequence
<220> FEATURE:
<223> OTHER INFORMATION: Primer FwCMV

<400> SEQUENCE: 13
cgcaaatggg cggtaggcgt g                                         21

<210> SEQ ID NO 14
<211> LENGTH: 18
<212> TYPE: DNA
<213> ORGANISM: Artificial Sequence

```
<220> FEATURE:
<223> OTHER INFORMATION: Primer RvBGH

<400> SEQUENCE: 14
tagaaggcac agtcgagg                                              18
```

TRIMERIC POLYPEPTIDE COMPLEXES COMPRISING A COLLAGEN XVIII HOMOTRIMERIZATION DOMAIN AND/OR A COLLAGEN XV HOMOTRIMERIZATION AND AN AGONIST OF A TNFR FAMILY COSTIMULATORY RECEPTOR, ENCODING POLYNUCLEOTIDE THEREOF AND METHOD OF USE THEREOF TO TREAT CANCER

CROSS-REFERENCE TO RELATED APPLICATIONS

This application is filed under the provisions of 35 U.S.C. § 371 and claims the priority of International Patent Application No. PCT/EP2019/064864 filed on 6 Jun. 2019 entitled "TRIMERIC POLYPEPTIDE COMPLEXES AND USES THEREOF" in the name of Marta COMPTE GRAU, et al., which claims priority to European Patent Application No. 18382401.0, filed on 6 Jun. 2018, both of which are hereby incorporated by reference herein in their entirety.

TECHNICAL FIELD OF THE INVENTION

The present invention relates to the field of cancer therapeutics and, more particularly, to therapeutic agents which are trimeric polypeptide complexes formed by the collagen homotrimerization domain.

BACKGROUND OF THE INVENTION

Modulating immune responses using monoclonal antibodies (mAbs) is a promising approach to cancer therapy. Antagonistic mAbs directed against checkpoint inhibitors such as CTLA-4 and PD-1/PD-L1 have been clinically approved, and agonistic mAbs targeting costimulatory receptors are undergoing clinical trials. Costimulatory receptors of the TNF-receptor superfamily (TNFRSF), such as CD40, OX40 and 4-1BB, are particularly interesting. Amongst these, 4-1BB is not constitutively expressed on resting naïve T cells, but acquired upon activation. This limits the potential deleterious side effects of the treatment.

4-1BB (CD137, TNFRSF9) has only one confirmed ligand [4-1BB-Ligand (4-1BBL), TNFSF9], which is expressed on macrophages, activated B cells, and dendritic cells. Engagement of 4-1BB by its ligand or an agonistic antibody promotes T cell proliferation, cytokine production, and cytolytic effector functions and protects lymphocytes from programmed cell death. Furthermore, engagement of 4-1BB on NK cells enhances cytokine release (including IFNγ) and antibody-dependent cellular cytotoxicity (ADCC). Indeed, treatment of mice with 4-1BB-agonistic mAbs was found to induce tumor regression of established and poorly immunogenic tumors as early as 1997. Since then, a large body of accumulated preclinical data supports the induction of 4-1BB signaling in cancer immunotherapy, both as a single agent and in combination therapies.

The effect of 4-1BB-agonistic mAbs is not spatially restricted to the tumor, and peripheral toxicities can therefore reduce the therapeutic window for 4-1BB-targeting therapies. In mice, 4-1BB mAbs have been shown to cause immune-related anomalies, notably polyclonal activation of CD8$^+$ T cells and secretion of inflammatory cytokines, which affected the function of liver, spleen and bone marrow. In clinical studies, an anti-4-1BB mAb (BMS-663513, urelumab, human IgG4) showed tolerable side effects in an initial Phase I trial, but a follow-up Phase II trial revealed severe liver toxicity in >10% of the patients that resulted in two fatalities. As a consequence, trials with urelumab were terminated. Recently, data were presented on a dose-escalation study with urelumab as monotherapy and in combination with nivolumab. The reduced dose ameliorated liver toxicity; however, the clinical activity of urelumab at the tolerated dose was limited. A comprehensive safety analysis of patients treated with urelumab confirmed a strong association between transaminitis and urelumab dose. Utomilumab (human IgG2) is another anti-4-1BB mAb in clinical trials with a superior safety profile relative to urelumab, but is a relatively less potent as a 4-1BB agonist.

Another strategy is the use of anti-4-1BB oligonucleotide aptamers instead of 4-1BBL. In animal models, systemic delivery of a 4-1BB-agonistic aptamer conjugated to a prostate-specific membrane antigen (PSMA) aptamer led to superior therapeutic effect compared to IgG-based 4-1BB-agonistic antibodies. It has also been recently reported that anchoring anti-4-1BB F(ab')2 fragments and IL-2 on the surface of liposomes induced effective anti-tumor immunity without systemic toxicity.

As it stands, costimulation by 4-1BB-agonistic mAbs is an otherwise viable therapeutic approach held back by off-tumor toxicities. This makes it necessary to design new strategies that allow effective immune stimulation, without severe side effects, for tumor-targeted treatments.

SUMMARY OF THE INVENTION

The authors of the present invention have adapted a 4-1BB-agonistic IgG to a bispecific tumor-targeted trimerbody format. This engineered antibody format, is based on the fusion of antibody-derived binding domains to the small homotrimerization region from collagen XV or XVIII, which yields trimeric antibodies called trimerbodies. This engineered antibody exhibited more potent costimulatory in vitro activity, and showed enhanced tumor homing/targeting and antitumor activity in vivo with respect to the monospecific non-targeted antibody. In addition, while treatment of naïve immunocompetent mice with the IgG-based anti-4-1BB-agonist antibody resulted in severe toxicity, as assessed by enlarged inflamed spleen and liver, severe inflammation and fibrosis in liver, spleen and pancreas, and systemic inflammatory cytokine production, treatment with EGFR or CEA-targeted 4-1BB-agonistic trimerbody lacked these immune-related side effects and therefore constituting itself as an affective therapeutic approach.

Thus, in a first aspect, the invention relates to a trimeric polypeptide complex comprising three monomer polypeptides wherein each monomer comprises:

i. a homotrimerization domain selected from the group consisting of the collagen XVIII homotrimerization domain (TIE$^{XVIII}$), the collagen XV homotrimerization domain (TIE$^{XV}$) and a functionally equivalent variant thereof and ii. an agonist of a TNFR family costimulatory receptor and wherein at least one monomer polypeptide further comprises a region which is capable of specifically binding to a tumor associated antigen.

In a second aspect, the invention relates to a polynucleotide encoding at least one of the monomer polypeptides forming part of the trimeric polypeptide as defined according to the invention.

In a third aspect, the invention relates to a vector comprising a polynucleotide according to the invention.

In a fourth aspect, the invention relates to a host cell comprising a vector of the invention.

In a fifth aspect, the invention relates to a method for producing a trimeric polypeptide complex according to the invention which comprises isolating said trimeric polypeptide from a culture comprising a host cell which carries and expresses a polynucleotide according to the invention, and optionally subjecting the trimeric polypeptide to further processing.

In a sixth aspect, the invention relates to a pharmaceutical composition comprising a trimeric polypeptide according to the invention.

In an eighth aspect, the invention relates to trimeric polypeptide complex of the invention for use in the treatment of cancer.

DETAILED DESCRIPTION OF THE INVENTION

Figure 1:
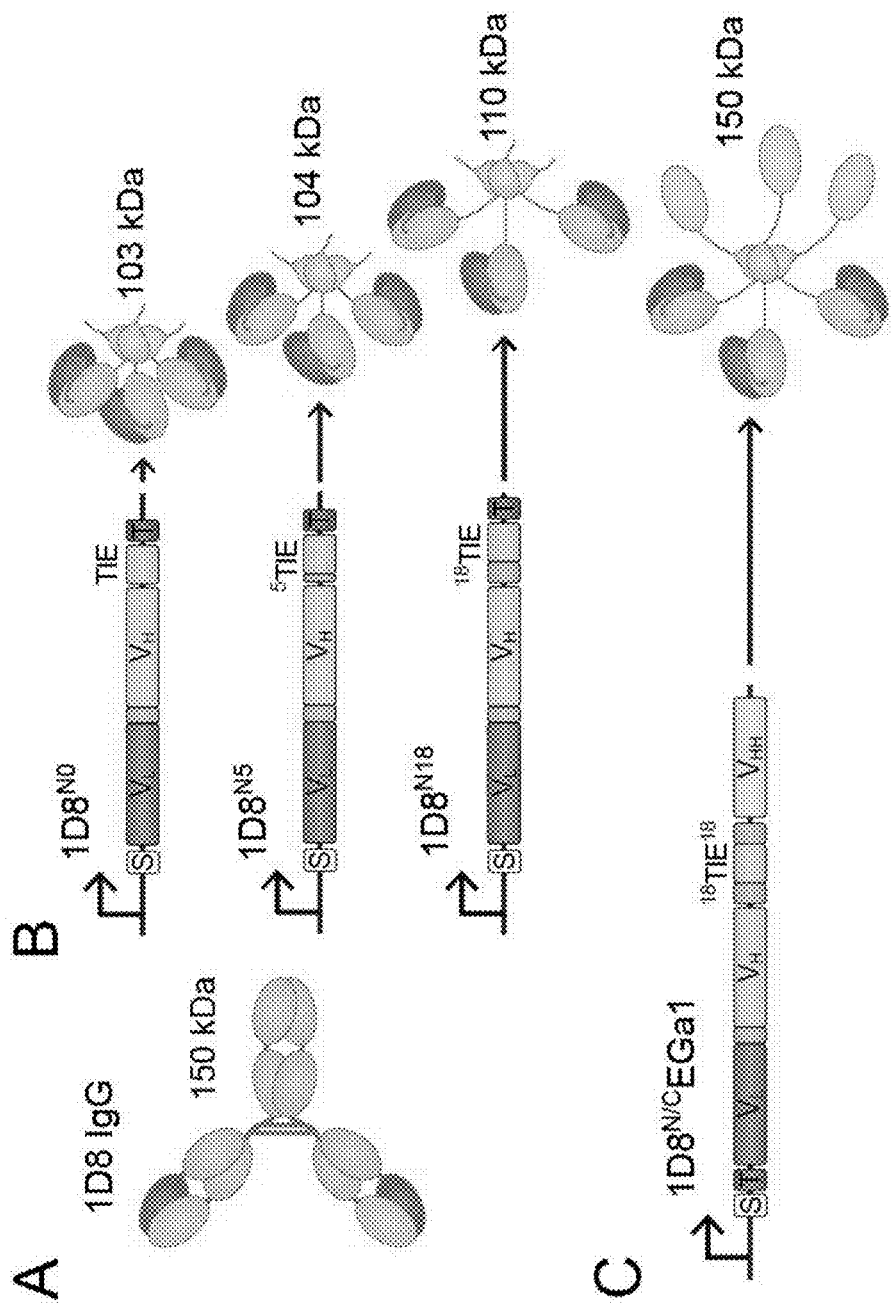
FIG. 1. Schematic diagrams showing the domain structure of the anti-4-1BB IgG (A), and the genetic (left) and domain structure (right) of monospecific (B) and bispecific trimerbodies (C). In all cases the variable regions derived from 1D8 antibody are represented in dark and light gray (designated by $V_L$ and $V_H$), the anti-EGFR $V_{HH}$ EGa1 antibody in light gray (indicated by $V_{HH}$), the structural domains (TIE, $^5$TIE $^{18}$TIE or $^{18}$TIE$^{18}$) in light gray and the linker regions also in light gray embracing the TIE structural domains. The 1D8 scFv-based N-terminal trimerbodies (1D8$^N$) gene constructs (B) contain a signal peptide from the oncostatin M (represented by "S"), and the 1D8 scFv gene ($V_L$-$V_H$) connected directly or through flexible linkers to the mouse TIE$^{XVIII}$ domain. In the bispecific 1D8$^{N/C}$EGa1 trimerbody (C) the anti-human EGFR $V_{HH}$ is fused to the C-terminus of 1D8$^{N18}$ through a flexible linker. Arrows indicate the direction of transcription. His6-myc tag (represented by "T" in the box located C-terminally to the TIE domain) and flag-strep tags (represented by "T" in the box located C-terminally to the signal peptide) were appended for immunodetection.

The inventors have developed a trimeric polypeptide complex to stimulate anti-tumoral immune response.
Trimeric Polypeptide Complex (TPC)

In a first aspect the invention relates to a trimeric polypeptide complex comprising three monomer polypeptides wherein each monomer comprises:
  i. a homotrimerization domain selected from the group consisting of the collagen XVIII homotrimerization domain (TIE$^{XVIII}$), the collagen XV homotrimerization domain (TIE$^{XV}$) and a functionally equivalent variant thereof and
  ii. an agonist of a TNFR family costimulatory receptor
and wherein at least one monomer polypeptide further comprises a region which is capable of specifically binding to a tumor associated antigen As used herein, the term "trimeric polypeptide complex" or "TPC" refers to a complex of three monomer polypeptides non-covalently bound. Each monomer polypeptide may be equal or different to each other. In a preferred embodiment, the TPC is a homotrimer, meaning that the three monomers or subunits of the complex are identical. In another preferred embodiment, the TPC is a heterotrimer, meaning that at least one of the three monomers or subunits of the complex is different to the other two. In a more preferred embodiment, the TPC is a homotrimer.
Homotrimerization Domain As used herein, the term "homotrimerization domain" refers to a region, that is responsible for the non-covalent trimerization between monomers. In a preferred embodiment, the homotrimerization domain is selected from the group consisting of the collagen XVIII homotrimerization domain (TIE$^{XVIII}$), the collagen XV homotrimerization domain (TIE$^{XV}$) and a functionally equivalent variant thereof.

As disclosed herein the monomers of collagen XVIII or collagen XV may be equal or different to each other, as long as the trimerization properties relative to those of the native collagen molecules are maintained. In a particular embodiment, at least one of the monomers is different to the other two. In a preferred embodiment, the three monomers are equal to each other, preferably three monomers of collagen XVIII or collagen XV.

In one embodiment, the collagen XVIII homotrimerization domain consists or comprises SEQ ID NO:1. In another embodiment, the collagen XV homotrimerization domain consists or comprises SEQ ID NO:2. In another embodiment, the collagen XVIII homotrimerization domain consists or comprises SEQ ID NO:12.

A "functionally equivalent variant thereof" as used herein, is intended to embrace functionally equivalent variants of a TIE$^{XVIII}$ and/or TIE$^{XV}$ of a naturally occurring collagen XVIII or collagen XV, variants which have been modified in the amino acid sequence without adversely affecting, to any substantial degree, the trimerization properties relative to those of the native collagen XVIII or collagen XV molecule. Said modifications include, the conservative (or non-conservative) substitution of one or more amino acids for other amino acids, the insertion and/or the deletion of one or more amino acids, provided that the trimerization properties of the native collagen XVIII or collagen XV protein is substantially maintained, i.e., the variant maintains the ability (capacity) of forming trimers with other peptides having the same sequence at physiological conditions.

Preferably, variants of a TIE$^{XVIII}$ and/or TIE$^{XV}$ are (i) polypeptides in which one or more amino acid residues are substituted by a preserved or non-preserved amino acid residue (preferably a preserved amino acid residue) and such substituted amino acid may be coded or not by the genetic code, (ii) polypeptides in which there is one or more modified amino acid residues, for example, residues modified by substituent bonding, (iii) polypeptides resulting from alternative processing of a similar mRNA and/or (iv) polypeptide fragments. The fragments include polypeptides generated through proteolytic cut (including multisite proteolysis) of an original sequence. The variants may be post-transnationally or chemically modified. Such variants are supposed to be apparent to those skilled in the art.

One skilled in the art will recognize that the values of identity of nucleotide sequences can be appropriately adjusted in order to determine the corresponding sequence identity of two nucleotide sequences encoding the polypeptides of the present invention, by taking into account codon degeneracy, conservative amino acid substitutions, and reading frame positioning.

In the context of the present invention "conservative amino acid changes" and "conservative amino acid substitution" are used synonymously in the invention. "Conservative amino acid substitutions" refers to the interchangeability of residues having similar side chains, and mean substitutions of one or more amino acids in a native amino acid sequence with another amino acid(s) having similar side chains, resulting in a silent change that does not alter function of the protein. Conserved substitutes for an amino acid within a native amino acid sequence can be selected from other members of the group to which the naturally occurring amino acid belongs. For example, a group of amino acids having aliphatic side chains includes glycine, alanine, valine, leucine, and isoleucine; a group of amino acids having aliphatic-hydroxyl side chains includes serine and threonine; a group of amino acids having amide-containing side chains includes asparagine and glutamine; a group of amino acids having aromatic side chains includes phenylalanine, tyrosine, and tryptophan; a group of amino acids having basic side chains includes lysine, arginine, and histidine; and a group of amino acids having sulfur-containing side chains includes cysteine and methionine. In some embodiments of the invention, preferred conservative amino acids substitutions are: valine-leucine, valine-isoleucine, phenylalanine-tyrosine, lysine-arginine, alanine-valine, aspartic acid-glutamic acid, and asparagine-glutamine. Thus, the invention refers to functionally equivalents variants of TIE$^{XVIII}$ and/or TIE$^{XV}$ and that have an amino acid sequence differing in one or more amino acids with the sequence given as the result of one or more conservative amino acid substitutions. It is well known in the art that one or more amino acids in a polypeptide sequence can be substituted with at least one other amino acid having a similar charge and polarity such that the substitution/s result in a silent change in the modified polypeptide that does not alter its function relative to the function of the non-modified sequence. The invention refers to any polypeptide sequence differing in one or more amino acids, either as a result of conserved or non-conserved substitutions, and/or either as a result of sequence insertions or deletions, relative to the sequence given by $TIE^{XVIII}$ and/or $TIE^{XV}$, as long as said further provided polypeptide sequence has the same or similar or equivalent function as $TIE^{XVIII}$ and/or $TIE^{XV}$.

By "codon degeneracy" it is meant divergence in the genetic code enabling variation of the nucleotide sequence without affecting the amino acid sequence of an encoded polypeptide. A person skilled in the art is well aware of the codon-bias exhibited by a specific host cell in using nucleotide codons to specify a given amino acid residue. Thus, for ectopic expression of a gene in a host cell, it is desirable to design or synthesize the gene in a way such that its frequency of codon usage approaches the frequency of codon usage of the host cell as described in a codon usage table.

The terms "identity", "identical" or "percent identity" in the context of two or more amino acid, or nucleotide sequences, refer to two or more sequences or subsequences that are the same or have a specified percentage of amino acid or nucleotide residues that are the same, when compared and aligned (introducing gaps, if necessary) for maximum correspondence, not considering any conservative amino acid substitutions as part of the sequence identity. The percent identity can be measured using sequence comparison software or algorithms or by visual inspection. Various algorithms and software are known in the art that can be used to obtain alignments of amino acid or nucleotide sequences.

The percentage of sequence identity may be determined by comparing two optimally aligned sequences over a comparison window. The aligned sequences may be polynucleotide sequences or polypeptide sequences. For optimal alignment of the two sequences, the portion of the polynucleotide or amino acid sequence in the comparison window may comprise insertions or deletions (i.e., gaps) as compared to the reference sequence (that does not comprise insertions or deletions). The percentage of sequence identity is calculated by determining the number of positions at which the identical nucleotide residues, or the identical amino acid residues, occurs in both compared sequences to yield the number of matched positions, then dividing the number of matched positions by the total number of positions in the window of comparison and multiplying the result by 100 to yield the percentage of sequence identity. Sequence identity between two polypeptide sequences or two polynucleotide sequences can be determined, for example, by using the Gap program in the WISCONSIN PACKAGE version 10.0-UNIX from Genetics Computer Group, Inc. based on the method of Needleman and Wunsch (J. Mol. Biol. 48:443-453, 1970) using the set of default parameters for pairwise comparison (for amino acid sequence comparison: Gap Creation Penalty=8, Gap Extension Penalty=2; for nucleotide sequence comparison: Gap Creation Penalty=50; Gap Extension Penalty=3), or using the TBLASTN program in the BLAST 2.2.1 software suite (Altschul et al., Nucleic Acids Res. 25:3389-3402), using BLOSUM62 matrix (Henikoff and Henikoff, Proc. Natl. Acad. Sci. U.S.A. 89:10915-10919, 1992) and the set of default parameters for pair-wise comparison (gap creation cost=11, gap extension cost=1).

The percentage of sequence identity between polypeptides and their corresponding functions may be determined, for example, using a variety of homology based search algorithms that are available to compare a query sequence, to a protein database, including for example, BLAST, FASTA, and Smith-Waterman. BLASTX and BLASTP algorithms may be used to provide protein function information. A number of values are examined in order to assess the confidence of the function assignment. Useful measurements include "E-value" (also shown as "hit_p"), "percent identity", "percent query coverage", and "percent hit coverage". In BLAST, the E-value, or the expectation value, represents the number of different alignments with scores equivalent to or better than the raw alignment score, S, that are expected to occur in a database search by chance. Hence, the lower the E value, the more significant the match. Since database size is an element in E-value calculations, the E-values obtained by doing a BLAST search against public databases, such as GenBank, have generally increased over time for any given query/entry match. Thus, in setting criteria for confidence of polypeptide function prediction, a "high" BLASTX match is considered as having an E-value for the top BLASTX hit of less than 1E-30; a medium BLASTX is considered as having an E-value of 1E-30 to 1E-8; and a low BLASTX is considered as having an E-value of greater than 1E-8. Percent identity refers to the percentage of identically matched amino acid residues that exist along the length of that portion of the sequences which is aligned by the BLAST algorithm. In setting criteria for confidence of polypeptide function prediction, a "high" BLAST match is considered as having percent identity for the top BLAST hit of at least 70%; a medium percent identity value is considered from 35% to 70%; and a low percent identity is considered of less than 35%. Of particular interest in protein function assignment is the use of combinations of E-values, percent identity, query coverage and hit coverage. Query coverage refers to the percent of the query sequence that is represented in the BLAST alignment, whereas hit coverage refers to the percent of the database entry that is represented in the BLAST alignment. For the purpose of defining the polypeptides functionally covered by the present invention, the function of a polypeptide is deduced from the function of a protein homolog, such as SEQ ID NO: 1, SEQ ID NO: 2 or SEQ ID NO: 12, wherein a polypeptide of the invention is one that either (1) results in hit_p<1e-30 or % identity>35% AND query_coverage>50% AND hit_coverage>50%, or (2) results in hit_p<1e-8 AND query_coverage>70% AND hit_coverage>70%.

Functionally equivalent variants of $TIE^{XVIII}$ also include sequences with a sequence identity of at least 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% with the sequence SEQ ID NO: 1 or with the SEQ ID NO: 12.

Functionally equivalent variants of $TIE^{XV}$ also include sequences with a sequence identity of at least 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% with the sequence SEQ ID NO:2.

The ability of a functionally equivalent variant to form trimers can be determined by conventional methods known by the skilled person in the art. For example, by way of a simple illustration, the ability of a functionally equivalent variant to form a trimer can be determined by using standard chromatographic techniques. Thus, the variant to be assessed is put under suitable trimerization conditions and the complex is subjected to a standard chromatographic assay under non denaturing conditions so that the eventually formed complex (trimer) is not altered. If the variant trimerizes properly, the molecular size of the complex would be three times heavier than the molecular size of a single molecule of the variant. The molecular size of the complex can be revealed by using standard methods such as analytical centrifugation, mass spectrometry, size-exclusion chromatography, sedimentation velocity, etc.

The $TIE^{XVIII}$ and/or $TIE^{XV}$ can derive from any subject, preferably from a mammal, such as a mouse, a rat, a monkey, a human, etc. In a preferred embodiment, the $TIE^{XVIII}$ is derived from human. In another preferred embodiment, the $TIE^{XV}$ is derived from human. In another preferred embodiment, the $TIE^{XVIII}$ is derived from murine collagen XVIII. In another preferred embodiment, the $TIE^{XV}$ is derived from murine collagen XV. In a more preferred embodiment, the $TIE^{XVIII}$ is the small homotrimerization domain of murine collagen XVIII.

The $TIE^{XVIII}$ and/or $TIE^{XV}$ can be used to produce, among other trimeric polypeptide complexes (TPCs), functionally active mono- and bi-specific, trivalent N-terminal TPCs, trivalent C-terminal TPCs, mono- and bi-specific, trivalent N/C-terminal TPCs; and mono- and bi-specific, hexavalent single-chain N/C-terminal TPCs.

Additionally, it can be used to produce functionally active monospecific C-terminal TPCs with a single domain ($V_{HH}$) antibody as ligand binding domain or with a growth factor (e.g., VEGF). Therefore, mono-specific or multi-specific (e.g., bi-, tri-, tetra-specific, etc.), multivalent (e.g., trivalent, tetravalent, pentavalent or hexavalent) recombinant molecules having different combinations of specificity and valency can be easily made. In a particular embodiment, the $TIE^{XVIII}$ and/or $TIE^{XV}$ are used to produce a mono-specific TCP. In a preferred embodiment, the $TIE^{XVIII}$ and/or $TIE^{XV}$ are used to produce mono- or a bi-specific TCPs.

Agonist of a TNFR Family Costimulatory Receptor

As used herein, the term "agonist of a TNFR family costimulatory receptor" refers to any chemical entity or molecule that can specifically bind to a costimulatory receptor of the resulting TNFR family and induce its stimulation.

"Specific binding" or "specifically binds" or "binds" refers to a molecule which binds to a member of the TNFR family or an epitope within the particular TNFR family member with greater affinity than for other antigens. Typically, the agonist "specifically binds" when the equilibrium dissociation constant ($K_D$) for binding is about $1\times10^{-8}$ M or less, for example about $1\times10^{-9}$M or less, about $1\times10^{-10}$ M or less, about $1\times10^{-11}$ M or less, or about $1\times10^{-12}$M or less, typically with the $K_D$ that is at least one hundred-fold less than its $K_D$ for binding to a non-specific antigen (e.g., BSA, casein). The $K_D$ may be measured using standard procedures. The agonists capable of binding to a particular member of the TNFR family or to an epitope within the particular TNFR superfamily member may, however, have cross-reactivity to other related antigens, for example to the same antigen from other species (homologs), such as human or monkey, for example *Macaca fascicularis* (cynomolgus, cyno), Pan troglodytes (chimpanzee, chimp) or Callithrix jacchus (common marmoset, marmoset). While a monospecific antibody specifically binds only to one antigen or one epitope, a bispecific antibody specifically binds to two distinct antigens or two distinct epitopes.

The agonists of a TNFR family costimulatory receptor forming part of the TPCs of the invention are capable of inducing at least one biological activity of the TNFR family member the antibody binds to that is induced by a natural ligand of the TNFR family member. Exemplary agonistic activities include induction of production of a secreted embryonic alkaline phosphatase (SEAP) expressed under the control of NFκB-inducible promoter in an in vitro assay, induction of dendritic cell (DC) differentiation assessed by increased CD80, CD83, CD86 and HLA-DR surface expression on DC, activation of B cells assessed by increased B cell proliferation or increased CD23, CD80, CD83, CD86 and HLA-DR surface expression on B cells, induction of antigen-specific T cell recall responses assessed by production of interferon-gamma (IFN-gamma) by PBMCs isolated from patients previously exposed to the antigen, and induction of $CD4^+$ or $CD8^+$ T cell proliferation. Agonistic activity (e.g., agonism) may be cross-linking dependent or independent of antibody cross-linking.

As used herein, the term "costimulate" with reference to activated immune cells includes the ability of a costimulatory molecule to provide a second, non-activating receptor mediated signal, or costimulatory signal, that induces proliferation or effector function. For example, a costimulatory signal can result in cytokine secretion, e.g., in a T cell that has received a T cell-receptor-mediated signal.

"TNFR family member" includes receptors that belong to the TNFR family. Typical examples of TNFR family members and their corresponding ligands are shown in Table 1.

TABLE 1

List of suitable members of the TNFR family members that can be targeted using the TPCs according to the invention. The right column shows the ligands for each of the TNFR family members.

| TNFR family member | Ligand(s) of the TNFR family member |
|---|---|
| Tumor necrosis factor receptor 1 (CD120a) | TNF-alpha (cachectin) |
| Tumor necrosis factor receptor 2 (CD120b) | TNF-alpha (cachectin) |
| Lymphotoxin beta receptor (CD18) | Lymphotoxin beta (TNF-C) |
| OX40 (CD134) | OX40L |
| CD40 | CD154 |
| Fas receptor (CD95) | FasL |
| Decoy receptor 3 (TR6) | FasL, LIGHT, TL1A |
| CD27 | CD70, Sival |
| CD30 | CD153 |
| 4-1BB (CD137) | 4-1BB ligand |
| Death receptor 4 (TRAILR1) | TRAIL |

TABLE 1-continued

List of suitable members of the TNFR family members that can be targeted using the TPCs according to the invention. The right column shows the ligands for each of the TNFR family members.

| TNFR family member | Ligand(s) of the TNFR family member |
| --- | --- |
| Death receptor 5 (TRAILR2) | TRAIL |
| Decoy receptor 1 (TRAILR3) | TRAIL |
| Decoy receptor 2 (TRAILR4) | TRAIL |
| RANK (CD265) | RANKL |
| Osteoprotegerin | RANKL |
| TWEAK receptor | TWEAK |
| TACI (CD267) | APRIL, BAFF, CAMLG |
| BAFF receptor (CD268) | BAFF |
| Herpesvirus entry mediator (CD270) | LIGHT |
| Nerve growth factor receptor (CD271) | NGF, BDNF, NT-3, NT-4 |
| B-cell maturation antigen (CD269) | BAFF |
| Glucocorticoid-induced TNFR-related (CD357) | GITR ligand |
| TROY (TRADE) | unknown |
| Death receptor 6 (CD358) | unknown |
| Death receptor 3 (Apo-3) | TL1A |
| Ectodysplasin A2 receptor (XEDAR) | EDA-A2 |

The term includes the receptors shown in Table 1, including naturally occurring variants of the TNFRs. The TNFRs are typically expressed as type I transmembrane proteins and contain one to six cysteine-rich domains in their extracellular domain. Signaling occurs as a TNFR trimer.

The agonist of the TNFR family costimulatory receptor can be present in one of the monomer polypeptides, in two of the monomer polypeptides or in the three monomer polypeptides of the TPC. In a preferred embodiment, the three monomer polypeptides comprise an agonist of a costimulatory receptor.

In a preferred embodiment one of the monomer polypeptides comprises an agonist of a costimulatory receptor different from the other two. In another preferred embodiment the three monomer polypeptides comprise different agonists of the same costimulatory receptor. In a more preferred embodiment, the three monomer polypeptides comprise the same agonist of a costimulatory receptor.

In one embodiment, the agonist of the TNFR family member is an agonistic antibody.

"Antibodies" is meant in a broad sense and includes immunoglobulin molecules including monoclonal antibodies including murine, human, humanized and chimeric monoclonal antibodies, antibody fragments, bispecific or multispecific antibodies, dimeric, tetrameric or multimeric antibodies, single chain antibodies, single domain antibodies, antibody mimetics and any other modified configuration of the immunoglobulin molecule that comprises an antigen binding site of the required specificity. "Full length antibody molecules" are comprised of two heavy chains (HC) and two light chains (LC) inter-connected by disulfide bonds as well as multimers thereof (e.g. IgM). Each heavy chain is comprised of a heavy chain variable region (VH) and a heavy chain constant region (comprised of domains CH1, hinge, CH2 and CH3). Each light chain is comprised of a light chain variable region (VL) and a light chain constant region (CL). The VH and the VL regions may be further subdivided into regions of hyper variability, termed complementarity determining regions (CDR), interspersed with framework regions (FR). Each VH and VL is composed of three CDRs and four FR segments, arranged from amino-to-carboxyl-terminus in the following order: FR1, CDR1, FR2, CDR2, FR3, CDR3 and FR4.

"Complementarity determining regions (CDR)" are "antigen binding sites" in an antibody. CDRs may be defined using various terms: (i) Complementarity Determining Regions (CDRs), three in the VH (HCDR1, HCDR2, HCDR3) and three in the VL (LCDR1, LCDR2, LCDR3) are based on sequence variability (Wu et al. (1970) J Exp Med 132: 211-50) (Kabat et al., Sequences of Proteins of Immunological Interest, 5th Ed. Public Health Service, National Institutes of Health, Bethesda, Md., 1991). (ii) "Hypervariable regions", "HVR", or "HV", three in the VH (H1, H2, H3) and three in the VL (L1, L2, L3) refer to the regions of an antibody variable domains which are hypervariable in structure as defined by Chothia and Lesk (Chothia et al. (1987) J Mol Biol 196: 901-17). The International ImMunoGeneTics (IMGT) database (www dot imgt dot org) provides a standardized numbering and definition of antigen-binding sites. The correspondence between CDRs, HVs and IMGT delineations is described in (Lefranc et al. (2003) Dev Comp Immunol 27: 55-77). The term "CDR", "HCDR1", "HCDR2", "HCDR3", "LCDR1", "LCDR2" and "LCDR3" as used herein includes CDRs defined by any of the methods described supra, Kabat, Chothia or IMGT, unless otherwise explicitly stated in the specification.

Immunoglobulins may be assigned to five major classes, IgA, IgD, IgE, IgG and IgM, depending on the heavy chain constant region amino acid sequence. IgA and IgG are further sub-classified as the isotypes IgA1, IgA2, IgG1, IgG2, IgG3 and IgG4. Antibody light chains of any vertebrate species may assigned to one of two clearly distinct types, namely kappa (κ) and lambda (λ), based on the amino acid sequences of their constant regions.

"Antibody fragments" refers to a portion of an immunoglobulin molecule that retains the heavy chain and/or the light chain antigen binding site, such as heavy chain complementarity determining regions (HCDR) 1, 2 and 3, light chain complementarity determining regions (LCDR) 1, 2 and 3, a heavy chain variable region (VH), or a light chain variable region (VL). Antibody fragments include well known Fab, F(ab')2, Fd and Fv fragments as well as single domain antibodies (dAb) consisting of one $V_H$ domain or one VL domain. VH and VL domains may be linked together via a synthetic linker to form various types of single chain antibody designs where the VH/VL domains may pair intramolecularly, or intermolecularly in those cases when the VH and VL domains are expressed by separate single chain antibody constructs, to form a monovalent antigen binding site, such as single chain Fv (scFv) or diabody.

"Monoclonal antibody" refers to an antibody population with single amino acid composition in each heavy and each light chain, except for possible well known alterations such as removal of C-terminal lysine from the antibody heavy chain or alterations due to post-translational modification(s) of amino acids, such as methionine oxidation or asparagine or glutamine deamidation. Monoclonal antibodies typically specifically bind one antigenic epitope, except that bispecific or multispecific monoclonal antibodies specifically bind two or more distinct antigenic epitopes. Monoclonal antibodies may have heterogeneous glycosylation within the antibody population. Monoclonal antibody may be monospecific or multispecific, or monovalent, bivalent or multivalent. A bispecific antibody is included in the term monoclonal antibody.

"Humanized antibody" refers to an antibody in which the antigen binding sites are derived from non-human species and the variable region frameworks are derived from human immunoglobulin sequences. Humanized antibody may include substitutions in the framework so that the framework may not be an exact copy of expressed human immunoglobulin or human immunoglobulin germline gene sequences.

"Human antibody" refers to an antibody having heavy and light chain variable regions in which both the framework and the antigen binding site are derived from sequences of human origin and is optimized to have minimal immune response when administered to a human subject. If the antibody contains a constant region or a portion of the constant region, the constant region also is derived from sequences of human origin.

Human antibody comprises heavy or light chain variable regions that are "derived from" sequences of human origin if the variable regions of the antibody are obtained from a system that uses human germline immunoglobulin or rearranged immunoglobulin genes. Such exemplary systems are human immunoglobulin gene libraries displayed on phage, and transgenic non-human animals such as mice or rats carrying human immunoglobulin loci as described herein. "Human antibody" may contain amino acid differences when compared to the human germline immunoglobulin or rearranged immunoglobulin genes due to differences between the systems used to obtain the antibody and human immunoglobulin loci, introduction of somatic mutations or intentional introduction of substitutions into the framework or antigen binding site, or both. Typically, "human antibody" is at least about 80 percent, 81 percent, 82 percent, 83 percent, 84 percent, 85 percent, 86 percent, 87 percent, 88 percent, 89 percent, 90 percent, 91 percent, 92 percent, 93 percent, 94 percent, 95 percent, 96 percent, 97 percent, 98 percent, 99 percent or 100 percent identical in amino acid sequence to an amino acid sequence encoded by human germline immunoglobulin or rearranged immunoglobulin genes. In some cases, "human antibody" may contain consensus framework sequences derived from human framework sequence analyses or synthetic HCDR3 incorporated into human immunoglobulin gene libraries displayed on phage.

According to the invention the costimulatory receptor is a receptor of the TNF-receptor (TNFR) family. In a particular embodiment the costimulatory receptor is a receptor that is not constitutively expressed on resting naïve T cells, but acquired upon activation. Non-limiting examples of such include: CD40, OX40, CD27, CD30, GITR and 4-1BB. In a preferred embodiment the costimulatory receptors in each monomer polypeptide is selected from: CD40, OX40, CD27, CD30, GITR and 4-1BB. In a more preferred embodiment the costimulatory receptor is 4-1BB.

In an embodiment the agonist of the TNFR family costimulatory receptor is an agonistic antibody. As it is used herein, the term "antibody" refers to a protein including at least one immunoglobulin variable region, for example, an amino acid sequence providing an immunoglobulin variable domain or a sequence of the immunoglobulin variable domain. An antibody can include, for example, a variable heavy chain (H) region (herein abbreviated as VH) and a variable light chain (L) region (herein abbreviated as VL). Typically, an antibody includes two variable heavy chain regions and two variable light chain regions. The term "antibody" encompasses antigen-binding antibody fragments (for example, single-chain antibodies, nanobodies ($V_{HH}$), Fab fragments, F(ab')2 fragments, Fd fragments, Fv fragments and dAb fragments) as well as whole antibodies, for example, intact and/or full length immunoglobulins of the IgA, IgG types (for example, IgG1, IgG2, IgG3, IgG4), IgE, IgD, IgM (as well as subtypes thereof). The variable heavy and light chain regions can additionally be subdivided into hypervariability regions, referred to as "complementarity determining regions" ("CDR"), mixed together with more conserved regions, referred to as "framework regions" (FR). The extension of FRs and CDRs has been precisely defined (see Kabat, E. A., et al. (1991) Sequences of Proteins of Immunological Interest, Fifth Edition, The United States Department of Health and Human Services, NIH Publication No. 91-3242; and Chothia, C. et al. (1987) J. Mol. Biol. 196:901-917). Kabat definitions are used in the present document. Each variable heavy and light chain region is typically made up of three CDRs and four FRs, organized from the amino end to the carboxyl end in the following order: FR1, CDR1, FR2, CDR2, FR3, CDR3, FR4. The antibody VH or VL chain can furthermore include all or part of a heavy chain or light chain constant region to thereby form a heavy chain (HC) or light chain (LC immunoglobulin, respectively. Immunoglobulin light and heavy chains can be bound by disulfide bridges. The heavy chain constant region typically includes three constant domains, CH1, CH2 and CH3. The light chain constant region typically includes a CL domain. The variable heavy and light chain region contains a binding domain interacting with an antigen. The constant regions of the antibodies typically mediate the binding of the antibody to host tissues or factors, including various cells of the immune system (for example, effector cells) and the first component (C1q) of the conventional complement system. The term antibody encompasses both antibodies formed by heavy chains and light chains and single-chain antibodies.

As it is used herein, the term "heavy chain" or "HC" encompasses both a full length heavy chain and fragments thereof. A full length heavy chain includes a variable region domain, VH, and three constant region domains, CH1, CH2 and CH3. The $V_H$ domain is at the amino terminal end of the polypeptide, and the CH3 domain is at the carboxyl terminal end.

As it is used herein, the term "light chain" encompasses a full length light chain and fragments thereof. A full length light chain includes a variable region domain, VL, and a constant region domain, CL. Like the heavy chain, the variable light chain region domain is at the amino terminal end of the polypeptide.

As it is used herein, the term "single-chain antibody" refers to a molecule modified by means of genetic engineering containing the variable light chain region and the variable heavy chain region bound by means of a suitable peptide linker, formed as a genetically fused single-chain molecule.

As it is used herein, the term "nanobody" refers to a single-domain antibody (sdAb), which is an antibody fragment consisting of a single monomeric variable antibody domain. Like a whole antibody, it is able to bind selectively to a specific antigen.

As it is used herein, the term "antibody mimetic" refers to any compound that, like antibodies, can specifically bind antigens, but that are not necessarily structurally related to antibodies. A "mimetic" of a compound includes compounds in which chemical structures of the compound necessary for functional activity have been replaced with other chemical structures which mimic the conformation of the compound. Examples of mimetics include peptidic compounds in which the peptide backbone is substituted with one or more benzodiazepine molecules (see e.g., James, G. L. et al. (1993) Science 260: 1937-1942) or oligomers that mimics peptide secondary structure through use of amide bond isosteres and/or modification of the native peptide backbone, including chain extension or heteroatom incorporation; examples of which include azapeptides, oligocarbamates, oligoureas, beta-peptides, gamma-peptides, oligo(phenylene ethynylene)s, vinylogous sulfonopeptides, poly-N-substituted glycines (peptoids) and the like. Methods for preparing peptidomimetic compounds are well known in the art and are specified, for example, in Quantitative Drug Design, C. A. Ramsden Gd., Chapter 17.2, F. Choplin Pergamon Press (1992).

As used herein, the term antibody also refers to "non-immunoglobulin agent" as binding agents other than immunoglobulins that are based on different molecular natures, topologies or scaffolds. The term scaffold is meant to describe a protein framework that can carry altered amino acids or sequence insertions that confer on protein variants different functions, usually for binding specific targets. Examples of such non-immunoglobulin agents are well known in the art, and include without limitation peptide aptamers, nucleic acid aptamers, Affibody molecules, Affilins, Affimers, Affitins, Alphabodies, Anticalins, Avimers, DARPins, Fynomers, Kunitz domain peptides Monobodies etc. and other protein scaffolds are reviewed in Binz et al., 2005 (Nat. Biotech. 23:1257-68), and are included herein by reference. The term "peptide aptamer" refers to a short variable peptide domain that is attached at both ends to a protein scaffold, and that binds to a specific target molecule. The variable loop length is typically composed of ten to twenty amino acids, and the scaffold may be any protein which has good solubility and compacity properties. The term "nucleic acid aptamer" or "DNA aptamer", as used herein, refers to a short strand of DNA that has been engineered through repeated rounds of selection to bind to specific molecular targets.

According to the invention the antibodies can be "humanized" to reduce immunogenicity in human individuals. Humanized antibodies improve safety and efficacy of monoclonal antibody therapy. One common method of humanization is to produce a monoclonal antibody in any suitable animal (e.g., mouse, rat, hamster) and replace the constant region with a human constant region, antibodies engineered in this way are termed "chimeric". Another common method is "CDR grafting" which replaces the non-human V-FRs with human V-FRs. In the CDR grafting method all residues except for the CDR region are of human origin. In certain embodiments, the antibodies described herein are humanized. In certain embodiments, the antibodies described herein are chimeric. In certain embodiments, the antibodies described herein are CDR grafted. Humanization may reduce or have little effect on the overall affinity of the antibody, or may also improve affinity for their target after humanization. In certain embodiments, humanization increases the affinity for the antibody by 10%. In certain embodiments, humanization increases the affinity for the antibody by 25%. In certain embodiments, humanization increases the affinity for the antibody by 35%. In certain embodiments, humanization increases the affinity for the antibody by 50%. In certain embodiments, humanization increases the affinity for the antibody by 60%. In certain embodiments, humanization increases the affinity for the antibody by 75%. In certain embodiments, humanization increases the affinity for the antibody by 100%. Affinity is suitably measured using surface plasmon resonance (SPR).

In a preferred embodiment the agonist antibody of the costimulatory receptor is a scFv, a nanobody or an antibody mimetic.

Region which is Capable of Specifically Binding to a Tumor Associated Antigen

The TPCs according to the present invention can be monospecific, i.e. they contain binding sites for a TNFR family costimulatory receptor but, preferably, they may also contain one or more molecules capable of binding to a tumor associated antigen present in the surface of a tumor cell. This will result in bispecific antibodies which contain a region which binds and exerts an agonist effect on the TNFR family costimulatory receptor and a region which binds to a tumor associated antigen. It will be understood that the number of monomers within the TPC containing the region which is capable of specifically binding to the tumor associated antigen can be of one, two or three. In a preferred embodiment one of the monomer polypeptides comprises a molecule which is capable of specifically binding to a tumor associated antigen. In another preferred embodiment two of the monomer polypeptides comprise a molecule which is capable of specifically binding to a tumor associated antigen. In another preferred embodiment the three monomer polypeptides comprise a molecule which is capable of specifically binding to a tumor associated antigen.

The term "specific binding" has been defined in detail above in respect of the agonists of the TNFR family members and applies equally to the region which is capable of specifically binding to a tumor associated antigen.

As used herein, the term "tumor associated antigen" or "TAA" means any antigen which can allow to match a patient's cancer condition or type with an appropriate immunotherapeutic product or regimen. The TAAs may be expressed by the cancer cell itself or they may be associated with non-cancerous components of the tumor, such as tumor-associated neovasculature or other stroma. Amongst tumor antigens expressed by tumor cells and able to act as targets for immune effector mechanisms proteins, commonly glycoproteins, peptides, carbohydrates, and glycolipids, are included. Non-limiting examples of tumor associated antigens include: AFP (Alpha (α)-fetoprotein), AIM-2 (Interferon-inducible protein absent in melanoma 2), ART-4 (Adenocarcinoma antigen recognized by T cells 4), BAGE (B antigen), BCMA, CAMEL (CTL-recognized antigen on melanoma), CD19, CD20, CD22, CD30, CD33, CD123, CEA (Carcinoembryonic antigen), DAM (Differentiation antigen melanoma), Ep-CAM (Epithelial cell adhesion molecule), ErB3, FAP, gpA33, Her2, IGF-1R, MAGE (Melanoma antigen), MART-1/Melan-A (Melanoma antigen recognized by T cells-1/melanoma antigen A), MC1R (Melanocortin 1 receptor), MET, MUC-1, NY-ESO-1 (New York esophageous 1), OA1 (Ocular albinism type 1 protein), P-Cacherin, PD-L1, PSMA (Prostate-specific membrane antigen), SART-1, -2, -3 (Squamous antigen rejecting tumor 1, 2, 3), Survivin-2B (Intron 2-retaining surviving), TRP (Tyrosinase-related protein). Antigens may be expressed at the surface of the tumor cell or they can be secreted. In a preferred embodiment, the antigen is a cell surface antigen. The presence of serum antibodies in patients against potential tumor antigens can be determined by the skilled person in the art, using for example SEREX (serological identification of antigens by recombinant expression cloning), whereby target antigens are identified by reacting the sera with cDNA libraries derived from tumor cells.

In one embodiment, the TAA is EGFR.

In another embodiment the TAA is CEA.

In one embodiment, the region which is capable of specifically binding to TAA has no agonist capacity on said TAA.

In one embodiment, the region which is capable of specifically binding to TAA is an antibody, more preferably a "single-chain antibody, a nanobody or a "non-immunoglobulin agent. The terms have been defined above in the context of the agonist of a TNFR family costimulatory receptor and are equally applicable to the region which is capable of specifically binding to a tumor associated antigen.

In a preferred embodiment the molecule which is capable of specifically binding to the TAA is positioned N-terminal or C-terminal with respect to the homotrimerization domain.

In a preferred embodiment if the molecule which is capable of specifically binding to the TNFR family costimulatory receptor is positioned N-terminal with respect to the homotrimerization domain, then the molecule which is capable of specifically binding to a tumor associated antigen is positioned C-terminal with respect to the homotrimerization domain. In another preferred embodiment if the molecule which is capable of specifically binding to the tumor associated antigen is positioned C-terminal with respect to the homotrimerization domain, then the molecule which is capable of specifically binding to the antigen TNFR family costimulatory receptor is positioned N-terminal with respect to the homotrimerization domain.

In a preferred embodiment the tumor associated antigen is the epidermal growth factor receptor (EGFR). As used herein, the term "epidermal growth factor receptor" or "EGFR" is a transmembrane protein that is a receptor for members of the epidermal growth factor family (EGF family) of extracellular protein ligands. It refers to a tyrosine kinase which regulates signaling pathways and growth and survival of cells and which shows affinity for the EGF molecule. The ErbB family of receptors consists of four closely related subtypes: ErbB1 (epidermal growth factor receptor [EGFR]), ErbB2 (HER2/neu), ErbB3 (HER3), and ErbB4 (HER4) and variants thereof (e.g. a deletion mutant EGFR as in Humphrey et al. (Proc. Natl. Acad. Sci. USA, 1990, 87:4207-4211). Non-limiting examples of molecules able to bind to EGFR include: the natural ligands epidermal growth factor (EGF), betacellulin (BTC), heparin-binding EGF-like growth factor (HB-EGF), amphiregulin (AR), epiregulin (EPR), transforming growth factor-α (TGF-α), and epigen (EPG). In one embodiment, the molecule which is capable of specifically binding to EGFR has no agonist capacity. In a preferred embodiment, the EGFR is human.

In a preferred embodiment the anti-EGFR antibody is a scFv, a nanobody or an antibody mimetic.

In another preferred embodiment the anti-EGFR antibody is the EGA1 nanobody. In a more preferred embodiment the Ega1 ($V_{HH}$) nucleotide sequence is SEQ ID NO 3. In a more preferred embodiment the Ega1($V_{HH}$) amino acid sequence is SEQ ID NO 4. In a more preferred embodiment the Ega1 CDR sequences are CDR1 (SEQ ID NO 5), CDR2 (SEQ ID NO 6) and CDR3 (SEQ ID NO 7).

In another preferred embodiment the tumor associated antigen is the carcinoembryonic antigen (CEA). As used herein the term "carcinoembryonic antigen" or "CEA", also known as CEACAM1, BGP1, BGPI, CD66a, BGP, refers to the carcinoembryonic antigen related cell adhesion molecule 1. The human gene that codifies said protein is shown in the Ensembl database under accession number ENSG00000079385.

Linker Regions Between the Homotrimerization Domain, the Agonist of a TNFR Family Costimulatory Receptor and the Optional Region Capable of Specifically Binding to a Tumor Associated Antigen.

The different elements of the monomer polypeptides forming the TPCs according to the invention may be directly linked to each other or may be connected via an amino acid spacer or linker.

In one embodiment, the agonist of the TNFR family costimulatory receptor and the homotrimerization are directly connected. In one embodiment, the homotrimerization and the region which is capable of specifically binding to the tumor associated antigen are directly connected. In another embodiment, the agonist of the TNFR family costimulatory receptor is directly connected to the homotrimerization and the homotrimerization domain is directly connected to the region which is capable of specifically binding to the tumor associated antigen.

In another embodiment, the agonist of the TNFR family costimulatory receptor and the homotrimerization domain are connected by an amino acid linker or spacer. In one embodiment, the homotrimerization domain and the region which is capable of specifically binding to the tumor associated antigen are connected by an amino acid linker or spacer. In another embodiment, the agonist of the TNFR family costimulatory receptor is connected to the homotrimerization domain via an amino acid linker and the homotrimerization domain is connected to the region which is capable of specifically binding to the tumor associated antigen by an amino acid spacer.

As disclosed herein a spacer is an insert connecting or linking peptide of suitable length and character. In general, said spacer acts as a hinge region between said domains, allowing them to move independently from one another while maintaining the three-dimensional form of the individual domains. In this sense, a preferred spacer would be a hinge region characterized by a structural ductility or flexibility allowing this movement. The length of the spacer can vary; typically, the number of amino acids in the spacer is 100 or less amino acids, preferably 50 or less amino acids, more preferably 40 or less amino acids, still more preferably, 30 or less amino acids, or even more preferably 20 or less amino acids.

Alternatively, a suitable spacer can be based on the sequence of 10 amino acid residues of the upper hinge region of murine IgG3; which has been used for the production of dimerized antibodies by means of a coiled coil (Pack P. and Pluckthun, A., 1992, Biochemistry 31:1579-1584) and can be useful as a spacer peptide according to the present invention. It can also be a corresponding sequence of the upper hinge region of human IgG3 or other human Ig subclasses (IgG1, IgG2, IgG4, IgM and IgA). The sequences of human Igs are not expected to be immunogenic in human beings. Additional spacers that can be used in the instant invention include the peptides of the amino acid sequences GAP, AAA.

In a particular embodiment, said spacer is a peptide having structural flexibility (i.e., a flexible linking peptide or "flexible linker") and comprises 2 or more amino acids selected from the group consisting of glycine, serine, alanine and threonine. In another particular embodiment, the spacer is a peptide containing repeats of amino acid residues, particularly Gly and Ser, or any other suitable repeats of amino acid residues. Virtually any flexible linker can be used as spacer according to this invention.

In a preferred embodiment, the spacer is a flexible linker. In a more preferred embodiment, the flexible linker is between 1 and 18 residues. In a still more preferred embodiment, the flexible linker is 5, 17 or 18 residues, preferably 18 residues.

In a preferred embodiment the homotrimerization domain and the agonist of a TNFR family costimulatory receptor are directly linked. In another preferred embodiment the homotrimerization domain and the agonist of a TNFR family costimulatory receptor are linked through a flexible linker. In a more preferred embodiment the flexible linker is at least 1, at least 2, at least 3, at least 4, at least 5, at least 6, at least 7, at least 8, at least 9, at least 10, at least 11, at least 12, at least 13, at least 14, at least 15, at least 16, least 17 or at least 18 residues. In a still more preferred embodiment the flexible linker is 18-residue long.

In a preferred embodiment the homotrimerization domain and the region which is capable of specifically binding to a tumor associated antigen are directly linked. In another preferred embodiment the homotrimerization domain and the region which is capable of specifically binding to a tumor associated antigen are linked through a flexible linker. In a more preferred embodiment the flexible linker is at least 1, at least 2, at least 3, at least 4, at least 5, at least 6, at least 7, at least 8, at least 9, at least 10, at least 11, at least 12, at least 13, at least 14, at least 15, at least 16, least 17 or at least 18 residues. In a still more preferred embodiment the flexible linker is 16-residue long.

In a preferred embodiment the homotrimerization domain is directly linked to either the agonist of a TNFR family costimulatory receptor or to the region which is capable of specifically binding to a tumor associated antigen. In another preferred embodiment the homotrimerization domain is directly linked to the agonist of a TNFR family costimulatory receptor and to the region which is capable of specifically binding to a tumor associated antigen. In a preferred embodiment the homotrimerization domain is directly linked to either the agonist of a TNFR family costimulatory receptor or to the region which is capable of specifically binding to a tumor associated antigen through a flexible linker. In another preferred embodiment the homotrimerization domain is directly linked to the agonist of a TNFR family costimulatory receptor and to the region which is capable of specifically binding to a tumor associated antigen through a flexible linker.

In a more preferred embodiment the flexible linker is at least 1, at least 2, at least 3, at least 4, at least 5, at least 6, at least 7, at least 8, at least 9, at least 10, at least 11, at least 12, at least 13, at least 14, at least 15, at least 16, least 17 or at least 18 residues. In a more preferred embodiment the flexible linker is 17 and/or 18 residues long. In a still more preferred embodiment the agonist of a TNFR family costimulatory receptor is linked to the homotrimerization domain through a 18-residue long linker, and/or the region which is capable of specifically binding to a tumor associated antigen is linked to the homotrimerization domain through a 16-residue long linker.

In a preferred embodiment, the 18-residue long linker is SEQ ID NO: 10. In another preferred embodiment, the 16-residue long linker is SEQ ID NO: 11.

In a preferred embodiment, at least one of the monomers of the TPC further comprises a tag suitable for detection and/or purification of the trimeric polypeptide. Non-limiting examples of tags include an affinity purification tag such as a tag peptide; illustrative, non-limitative examples of said tags include polyhistidine [poly(His)] sequences, peptide sequences capable of being recognized by antibodies that may be used to purify the resultant fusion protein by immunoaffinity chromatography, for example epitopes derived from the hemagglutinin of the fever virus, c-myc tag, Strep tag, etc. In another preferred embodiment the monomers of the TPC further comprise a tag suitable for detection and/or purification of the trimeric polypeptide.

In a particular embodiment, if each one of the three monomer polypeptides comprises one affinity purification tag, said tags being different to each other (e.g., affinity purification tags "a", "b" and "c", wherein tag "a" is recognized by binding substance A, tag "b" is recognized by binding substance B, and tag "c" is recognized by binding substance C), and it is subjected to a three-step affinity purification procedure designed to allow selective recovery of only such TPCs of the invention that exhibit affinity for the corresponding substances (A, B and C). Said affinity purification tag can be fused directly in-line or, alternatively, fused to the monomer polypeptide via a cleavable linker, i.e., a peptide segment containing an amino acid sequence that is specifically cleavable by enzymatic or chemical means (i.e., a recognition/cleavage site). In a particular embodiment, said cleavable linker comprises an amino acid sequence which is cleavable by a protease such as an enterokinase, Arg C endoprotease, Glu C endoprotease, Lys C endoprotease, factor Xa, etc.; alternatively, in another particular embodiment, said cleavable linker comprises an amino acid sequence which is cleavable by a chemical reagent, such as, for example, cyanogen bromide which cleaves methionine residues, or any other suitable chemical reagent. The cleavable linker is useful if subsequent removal of the affinity purification tags is desirable.

In a preferred embodiment the three monomer polypeptides comprise the same affinity purification tag. The tag may be located at any position of the monomer, particularly C-terminally or N-terminally to the homotrimerization domain. In a more preferred embodiment the tag is at the N-terminus of the agonist of a TNFR family costimulatory receptor. In a more preferred embodiment the tag is a His6-myc tag or a strep-Flag-tag. In a more preferred embodiment the tag is the flap tag SEQ ID NO: 8 and/or the StrepII-tag SEQ ID NO:9.

In another preferred embodiment the monomers further comprise a moiety which increases the trimeric polypeptide circulation half-life. According to the invention, the "half-life" is a period of time required for the concentration or amount of a compound in a body to be reduced to one-half of a given concentration or amount. The given concentration or amount need not be the maximum observed during the time observed, or the concentration or amount present at the beginning of an administration, since the half-life is completely independent of the concentration or amount chosen as the "starting point".

Non-limiting strategies to increase half-life profiles that are not optimal for therapeutic dosing are known by those skilled in the art and include: genetic fusion of the pharmacologically active peptide or protein to a naturally long-half-life protein or protein domain (e.g., Fc fusion, transferrin fusion, or albumin fusion); genetic fusion of the pharmacologically active peptide or protein to an inert polypeptide, e.g., XTEN (also known as recombinant PEG or "rPEG"), a homo-amino acid polymer (HAP; HAPylation), a proline-alanine-serine polymer (PAS; PASylation), or an elastin-like peptide (ELP; ELPylation); increasing the hydrodynamic radius by chemical conjugation of the pharmacologically active peptide or protein to repeat chemical moieties, e.g., to PEG (PEGylation) or hyaluronic acid; significantly increasing the negative charge of fusing the pharmacologically active peptide or protein by polysialylation; or, alternatively, fusing a negatively charged, highly sialylated peptide (e.g., carboxy-terminal peptide [CTP; of chorionic gonadotropin (CG) β-chain]), known to extend the half-life of natural proteins such as human CG β-subunit, to the molecule of interest; binding non-covalently, via attachment of a peptide or protein-binding domain to the bioactive protein, to normally long-half-life proteins such as HSA, human IgG, or transferrin; chemical conjugation of peptides or small molecules to long-half-life proteins such as human IgGs, Fc moieties, or HSA.

In a preferred embodiment, the half-life may be increased at least 1%, at least 2%, at least 3%, at least 4%, at least 5%, at least 6%, at least 7%, at least 8%, at least 9%, at least 10%, at least 20%, at least 30%, at least 40%, at least 50%, at least 60%, at least 70%, at least 80%, at least 90%, at least 95% or at least 100% in relation to a trimeric polypeptide without any moiety to increase the TPC circulation half-life.

The moiety which acts to increase the TPC circulation half-life can be present in one of the monomers of the TPC, in two of the monomers of the TPC or in the three TPC monomers. Moreover, the moiety which acts to increase the TPC circulation half-life can be present at the N-terminus of the monomer, at the C-terminus of the monomer, N-terminal with respect to the homotrimerization domain or C-terminal with respect to the homotrimerization domain.

In another preferred embodiment the moiety which increases the trimeric polypeptide circulation half-life is an albumin fragment or an albumin-binding moiety.

The term "binding moiety" refers to a domain that specifically binds an antigen or epitope independently of a different epitope or antigen binding domain. A binding moiety may be a domain antibody (dAb) or may be a domain which is a derivative of a non-immunoglobulin protein scaffold, e.g., a scaffold selected from the group consisting of CTLA-4, lipocalin, SpA, an adnectin, affibody, an avimer, GroEl, transferrin, GroES and fibronectin, which binds to a ligand other than the natural ligand In a preferred embodiment, the moiety binds serum albumin.

Polynucleotides, Vectors and Host Cells

In a second aspect the invention relates to a polynucleotide encoding at least one of the monomer polypeptides forming part of the trimeric polypeptide according to the invention.

As it is used herein, the term "polynucleotide" refers to a single-stranded or double-stranded polymer having deoxyribonucleotide or ribonucleotide bases. In a particular embodiment, the polynucleotide has ribonucleotide bases. In a preferred embodiment, the polynucleotide has deoxyribonucleotide bases. In a more preferred embodiment the polynucleotide encodes at least one, at least two, at least three, of the monomer polypeptides forming part of the trimeric polypeptide according to the invention.

In a preferred embodiment the polynucleotide further comprises a sequence encoding a signal sequence which is located 5' with respect to the sequence encoding the polypeptide and in the same open reading frame as said sequence. As it is used herein, the term "signal sequence" or "signal peptide" refers to a peptide of a relatively short length, generally between 5 and 30 amino acid residues, directing proteins synthesized in the cell towards the secretory pathway. The signal peptide usually contains a series of hydrophobic amino acids adopting a secondary alpha helix structure. Additionally, many peptides include a series of positively-charged amino acids that can contribute to the protein adopting the suitable topology for its translocation. The signal peptide tends to have at its carboxyl end a motif for recognition by a peptidase, which is capable of hydrolyzing the signal peptide giving rise to a free signal peptide and a mature protein. The signal peptide can be cleaved once the protein of interest has reached the appropriate location. Any signal peptide may be used in the present invention. In a preferred embodiment the signal sequence is the signal sequence of oncostatin M.

All the terms and embodiments previously described are equally applicable to this aspect of the invention.

In a third aspect the invention relates to a vector comprising a polynucleotide according to the invention.

As it is used herein, the term "vector" or "expression vector" refers to a replicative DNA construct used for expressing at least one polynucleotide in a cell, preferably a eukaryotic cell. The choice of expression vector will depend upon the choice of host. A wide variety of expression host/vector combinations can be employed. Useful expression vectors for eukaryotic hosts include, for example, vectors comprising expression control sequences from SV40, bovine papilloma virus, adenovirus and cytomegalovirus. Useful expression vectors for bacterial hosts include known bacterial plasmids, such as plasmids from *Escherichia coli*, including pCR 1, pBR322, pMB9 and their derivatives, wider host range plasmids, such as M13 and filamentous single-stranded DNA phages. These vectors may contain an additional independent cassette to express a selectable marker that will be used to initially selecting clones that have incorporated the exogenous DNA during the transformation protocol. The expression vector preferably contains an origin of replication. The expression vector can also contain one or more multiple cloning sites.

The expression vector may also contain an origin of replication in prokaryotes, necessary for vector propagation in bacteria. Additionally, the expression vector can also contain a selection gene for bacteria, for example, a gene encoding a protein conferring resistance to an antibiotic, for example, ampicillin, kanamycin, chloramphenicol, etc. The expression vector can also contain one or more multiple cloning sites. A multiple cloning site is a polynucleotide sequence comprising one or more unique restriction sites. Non-limiting examples of the restriction sites include EcoRI, SacI, KpnI, SmaI, XmaI, BamHI, XbaI, HincII, PstI, SphI, HindIII, AvaI, or any combination thereof.

The polynucleotide or polynucleotides expressed in the vector of the invention as well as the RNA or DNA constructs necessary for preparing the expression vector of the invention can be obtained by means of conventional molecular biology methods included in general laboratory manuals, for example, in "Molecular cloning: a laboratory manual" (Joseph Sambrook, David W. Russel Eds. 2001, 3rd ed. Cold Spring Harbor, New York) or in "Current protocols in molecular biology" (F. M. Ausubel, R. Brent, R. E. Kingston, D. D. Moore, J. A. Smith, J. G. Seidman and K. Struhl Eds, vol. 2. Greene Publishing Associates and Wiley Interscience, New York, N. Y. Updated in September 2006).

All the terms and embodiments previously described are equally applicable to this aspect of the invention.

In another aspect the invention relates to a host cell comprising a vector as described previously.

The term "host cell" is used such that it refers not only to the particular subject cell, but to the progeny or potential progeny of such a cell. Because certain modifications may occur in succeeding generations due to either mutation or environmental influences, such progeny may not, in fact, be identical to the parent cell, but are still included within the scope of the term as used herein. A host cell can be any prokaryotic (e.g., *E. coli*) or eukaryotic cell (e.g., yeast, insect or plant cells), that can be prepared by traditional genetic engineering techniques which comprise inserting the nucleic acid of the invention into a suitable expression vector, transforming a suitable host cell with the vector, and culturing the host cell under conditions allowing expression of the polypeptide part of the monomer polypeptide which constitutes the TPC of the invention. The nucleic acid of the invention may be placed under the control of a suitable promoter which may be inducible or a constitutive promoter. Depending on the expression system, the polypeptide may be recovered from the extracellular phase, the periplasm or from the cytoplasm of the host cell.

Suitable vector systems and host cells are well-known in the art as evidenced by the vast amount of literature and materials available to the skilled person. Since the present invention also relates to the use of the nucleic acid of the invention in the construction of vectors and in host cells, the following provides a general discussion relating to such use and the particular considerations in practicing this aspect of the invention.

In general, prokaryotes are preferred for the initial cloning of the nucleic acid of the invention and constructing the vector of the invention. For example, in addition to the particular strains mentioned in the more specific disclosure below, one may mention by way of example, strains such as *E. coli* K12 strain 294 (ATCC No. 31446), *E. coli* B, and *E. coli* X 1776 (ATCC No. 31537). These examples are, of course, intended to be illustrative rather than limiting.

Prokaryotes can be also utilized for expression, since efficient purification and protein refolding strategies are available. The aforementioned strains, as well as *E. coli* W3110 (F-, lambda-, prototrophic, ATCC No. 273325), bacilli such as *Bacillus subtilis*, or other enterobacteriaceae such as *Salmonella typhimurium* or *Serratia marcesans*, and various *Pseudomonas* species may be used.

In general, plasmid vectors containing replicon and control sequences which are derived from species compatible with the host cell are used in connection with these hosts. The vector ordinarily carries a replication site, as well as marking sequences which are capable of providing phenotypic selection in transformed cells. For example, *E. coli* is typically transformed using pBR322, a plasmid derived from an *E. coli* species. The pBR322 plasmid contains genes for ampicillin and tetracycline resistance and thus provides easy means for identifying transformed cells. The pBR322 plasmid, or other microbial plasmid or phage must also contain, or be modified to contain, promoters which can be used by the microorganism for expression.

Those promoters most commonly used in recombinant DNA construction include the B-lactamase (penicillinase) and lactose promoter systems and a tryptophan (trp) promoter system (EP 36776). While these are the most commonly used, other microbial promoters have been discovered and utilized, and details concerning their nucleotide sequences have been published, enabling a skilled worker to ligate them functionally with plasmid vectors. Certain genes from prokaryotes may be expressed efficiently in *E. coli* from their own promoter sequences, precluding the need for addition of another promoter by artificial means.

In addition to prokaryotes, eukaryotic microbes, such as yeast cultures may also be used. *Saccharomyces cerevisiae*, or common baker's yeast is the most commonly used among eukaryotic microorganisms, although a number of other strains are commonly available. For expression in *Saccharomyces*, the plasmid YRp7, for example, is commonly used. This plasmid already contains the trpl gene which provides a selection marker for a mutant strain of yeast lacking the ability to grow in tryptophan for example ATCC No. 44076 or PEP4-1 (Jones, 1977, Genetics, 85:23-33). The presence of the trpl lesion as a characteristic of the yeast host cell genome then provides an effective environment for detecting transformation by growth in the absence of tryptophan.

Suitable promoting sequences in yeast vectors include the promoters for 3-phosphoglycerate kinase or other glycolytic enzymes, such as enolase, glyceraldehyde-3-phosphate dehydrogenase, hexokinase, pyruvate decarboxylase, phosphofructokinase, glucose-6-phosphate isomerase, 3-phosphoglycerate mutase, pyruvate kinase, triosephosphate isomerase, phosphoglucose isomerase, and glucokinase. In constructing suitable expression plasmids, the termination sequences associated with these genes are also ligated into the expression vector 3' of the sequence desired to be expressed to provide polyadenylation of the mRNA and termination.

Other promoters, which have the additional advantage of transcription controlled by growth conditions are the promoter region for alcohol dehydrogenase-2, isocytochrome C, acid phosphatase, degradative enzymes associated with nitrogen metabolism, and the aforementioned glyceraldehyde-3-phosphate dehydrogenase, and enzymes responsible for maltose and galactose utilization. Any plasmid vector containing a yeast-compatible promoter, origin of replication and termination sequences is suitable.

In addition to microorganisms, cultures of cells derived from multicellular organisms may also be used as hosts. In principle, any such cell culture is workable, whether from vertebrate or invertebrate culture. However, interest has been greatest in vertebrate cells, and propagation of vertebrate in culture (tissue culture) has become a routine procedure in recent years. Examples of such useful host cell lines are VERO and HeLa cells, Chinese hamster ovary (CHO) cell lines, and W138, BHK, COS-7, Human Embryonic Kidney (HEK) 293 and MDCK cell lines. In addition, the baculovirus-insect cell expression system which is widely used to produce recombinant proteins and antibodies.

Expression vectors for such cells ordinarily include (if necessary) an origin of replication, a promoter located in front of the gene to be expressed, along with any necessary ribosome binding sites, RNA splice sites, polyadenylation site, and transcriptional terminator sequences.

For use in mammalian cells, the control functions on the expression vectors are often provided by viral material; for example, commonly used promoters are derived from polyoma, Adenovirus 2, cytomegalovirus (CMV) and most frequently Simian Virus 40 (SV40). The early and late promoters of SV40 virus are particularly useful because both are obtained easily from the virus as a fragment which also contains the SV40 viral origin of replication. Smaller or larger SV40 fragments may also be used, provided there is included the approximately 250 bp sequence extending from the HindIII site toward the BglI site located in the viral origin of replication. Further, it is also possible, and often desirable, to utilize promoter or control sequences normally associated with the desired gene sequence, provided such control sequences are compatible with the host cell systems.

An origin of replication may be provided either by construction of the vector to include an exogenous origin, such as may be derived from SV40 or other viral (e.g., polyoma, adeno, etc.) or may be provided by the host cell chromosomal replication mechanism. If the vector is integrated into the host cell chromosome, the latter is often sufficient.

Upon production of the monomer polypeptide which constitutes the TPC of the invention, it may be necessary to process the polypeptides further, e.g. by introducing non-proteinaceous functions in the polypeptide, by subjecting the material to suitable refolding conditions (e.g. by using the generally applicable strategies suggested in WO 94/18227), or by cleaving off undesired peptide moieties of the monomer (e.g. expression enhancing peptide fragments which are undesired in the end product).

In the light of the above discussion, the methods for recombinantly producing said TPC of the invention or said monomer polypeptide which constitutes the TPC of the invention are also a part of the invention, as are the vectors carrying and/or being capable of replicating the nucleic acid of the invention in a host cell or in a cell-line. According to the invention the expression vector can be, e.g., a virus, a plasmid, a cosmid, a minichromosome, or a phage.

Another aspect of the invention are transformed cells (i.e., the host cell of the invention), useful in the above-described methods, carrying and capable of replicating the nucleic acid of the invention; the host cell can be a microorganism such as a bacterium, a yeast, or a protozoan, or a cell derived from a multicellular organism such as a fungus, an insect cell, a plant cell, or a mammalian cell. The cells may also be transfected.

Yet another aspect of the invention relates to a stable cell line producing the monomer polypeptide which constitutes the TPC of the invention or the polypeptide part thereof, and preferably the cell line carries and expresses a nucleic acid of the invention. Especially interesting are cells derived from the mammalian cell lines HEK and CHO.

All the terms and embodiments previously described are equally applicable to this aspect of the invention.
Method for Producing a Trimeric Polypeptide In another aspect the invention relates to a method for producing a trimeric polypeptide according to the invention which comprises isolating said trimeric polypeptide from a culture comprising a host cell which carries and expresses a polynucleotide according to the invention, and optionally subjecting the trimeric polypeptide to further processing.

The TPC of the invention may be prepared by methods generally known in the art, based, for example, techniques of recombinant protein production. Hence the invention also relates to a method of preparing the TPC of the invention, the method comprising isolating the TPC of the invention from a culture comprising a host cell which carries and expresses a nucleic acid fragment which encodes at least one of the monomer polypeptides of the TPC of the invention, and, optionally, subjecting the TPC of the invention to further processing.

When the TPC of the invention is a homotrimer, the method for recombinantly producing said homotrimer comprises inserting the nucleic acid of the invention into a suitable expression vector, transforming a suitable host cell with the vector, and culturing the host cell under conditions allowing expression of the monomer polypeptide according to the invention and trimerization thereof. When the TPC of the invention is a heterotrimer, said heterotrimer may comprise (i) only one monomer polypeptide different from the other two monomer polypeptides, this two monomer polypeptides being identical each other, or, alternatively, (ii) three different monomer polypeptides.

All the terms and embodiments previously described are equally applicable to this aspect of the invention.
Pharmaceutical Compositions In another aspect the invention relates to a pharmaceutical composition comprising a trimeric polypeptide according to the invention.

The TPC according to the present invention can be part of a pharmaceutical composition containing a vehicle suitable for the administration thereof to a subject, such that the TPC will be administered to a subject in a pharmaceutical dosage form suitable to that end and will include at least one pharmaceutically acceptable vehicle. Therefore, in a particular embodiment, the TPC, will be part of a pharmaceutical composition comprising, in addition to TPC as an active ingredient, at least one vehicle, preferably a pharmaceutically acceptable vehicle. The term "vehicle" generally includes any diluent or excipient with which an active ingredient is administered. Preferably, said vehicle is a pharmaceutically acceptable vehicle for the administration thereof to a subject, i.e., it is a vehicle (e.g., an excipient) approved by a regulatory agency, for example, the European Medicines Agency (EMA), the United States Food & Drug Administration (FDA), etc., or are included in a generally recognized pharmacopeia (e.g., the European Pharmacopeia, the United States Pharmacopeia, etc.) for use in animals, and more particularly in human beings.

The TPC can be dissolved for administration in any suitable medium. Non-limiting illustrative examples of media in which the active ingredient can be dissolved, suspended, or with which they can form emulsions, include: water, ethanol, water-ethanol or water-propylene glycol mixtures, etc., oils, including oils derived from petroleum, animal oils, vegetable oils, or synthetic oils, such as peanut oil, soybean oil, mineral oil, sesame oil, etc., organic solvents such as: acetone, methyl alcohol, ethyl alcohol, ethylene glycol, propylene glycol, glycerin, diethyl ester, chloroform, benzene, toluene, xylene, ethylbenzene, pentane, hexane, cyclohexane, tetrahydrofuran, carbon tetrachloride, chloroform, methylene chloride, trichloroethylene, perchloroethylene, dimethylsulfoxide (DMSO).

Likewise, solid form preparations of the pharmaceutical composition intended for being converted, right before use, into liquid form preparations for oral or parenteral administration, are included. Liquid forms of this type include solutions, suspensions, and emulsions. A review of the different pharmaceutical dosage forms of active ingredients, of the vehicles to be used, and of the manufacturing methods thereof can be found, for example, in the Tratado de Farmacia Galdnica, C. Fauli i Trillo, Luzán 5, S. A. de Ediciones, 1993 and in Remington's Pharmaceutical Sciences (A. R. Gennaro, Ed.), 20$^{th}$ edition, Williams & Wilkins PA, USA (2000).

In a non-limiting manner, the administration routes for the TPC include, among others, non-invasive pharmacological administration routes, such as the oral, gastroenteric, nasal, or sublingual route, and invasive administration routes, such as the parenteral route. In a particular embodiment, the TPC is administered in a pharmaceutical dosage form by means of a parenteral route (e.g., intradermal, intramuscular, intraperitoneal, intravenous, subcutaneous, intrathecal, etc.). "Administration by means of a parenteral route" is understood as that administration route consisting of administering the compounds of interest by means of an injection, therefore requiring the use of a syringe and needle. There are different types of parenteral puncture according to the tissue the needle reaches: intramuscular (the compound is injected into the muscle tissue), intravenous (the compound is injected into the vein), subcutaneous (injected under the skin), and intradermal (injected between the layers of skin). The intrathecal route is used for administering into the central nervous system drugs which do not penetrate the blood-brain barrier well, such that the drug is administered into the space surrounding the spinal cord (intrathecal space). In a preferred embodiment, the administration is an intradermal, intramuscular, intraperitoneal, intravenous, subcutaneous, or intrathecal administration.

Therapeutic Uses of the TPCs

In another aspect, the TPC according to the invention is used for the treatment of cancer. As it is used herein, the term "treatment" refers to any type of therapy that has the purpose of terminating, improving, or reducing the susceptibility to suffering cancer. Therefore, "treatment", "treating", and the equivalent terms thereof refer to obtaining a pharmacologically or physiologically desired effect, covering any treatment of cancer in a mammal, including human beings. The effect can be prophylactic in terms of providing complete or partial prevention of a disorder and/or adverse effect attributed thereto. In other words, "treatment" includes (1) inhibiting the disease, for example stopping its development, (2) interrupting or ending the disorder or at least the symptoms associated therewith, so the patient would no longer suffer the disease or its symptoms, for example, causing the regression of the disease or its symptoms by means of the restoration or repair of a lost, absent, or defective function, or stimulating an inefficient process, or (3) mitigating, alleviating, or improving the disease, or the symptoms associated therewith, where mitigating is used in a in a broad sense to refer to at least a reduction in the magnitude of a parameter or symptom, such as inflammation, pain, respiratory difficulty, or inability to move independently.

As disclosed herein, the terms "cancer" and "tumor" relate to the physiological condition in mammals characterized by unregulated cell growth. Examples of cancers include, but are not limited to, cancer of the adrenal gland, bone, brain, breast, bronchi, colon and/or rectum, gallbladder, gastrointestinal tract, head and neck, kidneys, larynx, liver, lung, neural tissue, pancreas, prostate, parathyroid, skin, stomach, and thyroid. Other examples of cancers include, adenocarcinoma, adenoma, basal cell carcinoma, cervical dysplasia and in situ carcinoma, Ewing's sarcoma, epidermoid carcinomas, giant cell tumor, glioblastoma multiforma, hairy-cell tumor, intestinal ganglioneuroma, hyperplastic corneal nerve tumor, islet cell carcinoma, Kaposi's sarcoma, leiomyoma, leukemias, lymphomas, malignant carcinoid, malignant melanomas, malignant hypercalcemia, marfanoid habitus tumor, medullary carcinoma, metastatic skin carcinoma, mucosal neuroma, myelodisplastic syndrome, myeloma, mycosis fungoides, neuroblastoma, osteosarcoma, osteogenic and other sarcoma, ovarian tumor, pheochromocytoma, polycythermia vera, primary brain tumor, small-cell lung tumor, squamous cell carcinoma of both ulcerating and papillary type, seminoma, soft tissue sarcoma, retinoblastoma, rhabdomyosarcoma, renal cell tumor or renal cell carcinoma, veticulum cell sarcoma, and Wilm's tumor. Examples of cancers also include astrocytoma, a gastrointestinal stromal tumor (GIST), a glioma or glioblastoma, renal cell carcinoma (RCC), hepatocellular carcinoma (HCC), and a pancreatic neuroendocrine cancer.

The trimeric polypeptide complexes according to the invention are useful for the treatment of any cancer or tumor, such as, without limitation, breast, heart, lung, small intestine, colon, splenic, kidney, bladder, head, neck, ovarian, prostate, brain, pancreatic, skin, bone, bone marrow, blood, thymic, uterine, testicular and liver tumors.

In various embodiments, the patient's cancer treated is a metastatic cancer or a refractory and/or relapsed cancer that is refractory to first, second, or third line treatments. In another embodiment, the treatment is a first, a second, or a third line treatment. As used herein, the phrase "first line" or "second line" or "third line" refers to the order of treatment received by a patient. First line treatment regimens are treatments given first, whereas second or third line treatment are given after the first line therapy or after the second line treatment, respectively. Therefore, first line treatment is the first treatment for a disease or condition. In patients with cancer, primary treatment can be surgery, chemotherapy, radiation therapy, or a combination of these therapies. First line treatment is also referred to those skilled in the art as primary therapy or primary treatment. Typically, a patient is given a subsequent chemotherapy regimen because the patient did not show a positive clinical or only showed a sub-clinical response to the first line therapy, or the first line treatment has stopped. In this context, "chemotherapy" is used in its broadest sense to incorporate not only classic cytotoxic chemotherapy but also molecularly targeted therapies and immunotherapies.

In a preferred embodiment, the cancer is positive for the tumor associated antigen which is specifically recognized by the molecule capable of specifically binding to a tumor associated antigen present in the trimeric polypeptide. In a more preferred embodiment, the cancer is EGFR-positive.

The term "positive", as used herein to refer to a TAA, indicates that the "amount" or "level" of the TAA in the tumor or cancer is higher than that observed in a non-positive tumor or normal cell. The expression level can be measured by methods known to one skilled in the art and also disclosed herein. The term "level of expression" or "expression level" generally refers to the amount of a biomarker in a biological sample. "Expression" generally refers to the process by which information (e.g., gene-encoded and/or epigenetic information) is converted into the structures present and operating in the cell. Therefore, as used herein, "expression" may refer to transcription into a polynucleotide, translation into a polypeptide, or even polynucleotide and/or polypeptide modifications (e.g., posttranslational modification of a polypeptide). Fragments of the transcribed polynucleotide, the translated polypeptide, or polynucleotide and/or polypeptide modifications (e.g., post-translational modification of a polypeptide) shall also be regarded as expressed whether they originate from a transcript generated by alternative splicing or a degraded transcript, or from a post-translational processing of the polypeptide, e.g., by proteolysis. "Expressed genes" include those that are transcribed into a polynucleotide as mRNA and then translated into a polypeptide, and also those that are transcribed into RNA but not translated into a polypeptide (for example, transfer and ribosomal RNAs).

"Increased expression", "increased expression level", "increased levels", "elevated expression", "elevated expression levels" or "elevated levels" are used interchangeably to refer to an increased expression or increased levels of a biomarker in an individual relative to a control, such as an individual or individuals who do not have the disease or disorder (e.g., cancer), an internal control (e.g., a housekeeping biomarker), or a median expression level of the biomarker in samples from a group/population of patients.

In a more preferred embodiment, the cancer is colorectal cancer, lung cancer, breast cancer, pancreatic cancer, renal cancer, head and neck cancer, gastric cancer, esophageal cancer, gynaecologic cancer, prostate cancer, urothelial cancer, a neurological cancer and a haematological cancer. In another preferred embodiment, the gynaecologic cancer is ovarian, cervical and/or endometrial cancer; the neurological cancer is glioblastoma multiforme; the haematological cancer is acute myelogenous leukaemia.

All the terms and embodiments previously described are equally applicable to this aspect of the invention.

The invention will be described by way of the following examples which are to be considered as merely illustrative and not limitative of the scope of the invention.

EXAMPLES

Materials and Methods

Antibodies and Reagents

The monoclonal antibodies (mAbs) used included: mouse $IgG_1$ anti-c-myc (clone 9E10, Abcam®, Cambridge; UK), mouse $IgG_1$ anti-FLAG (clone M2, Sigma-Aldrich®, St. Louis, MO, USA), mouse $IgG_1$ anti-His6 (clone BMG-His-1, Roche Life Science, Penzberg, Germany), mouse $IgG_1$ anti-Strep (clone Strep-tag II) (IBA Lifesciences, Gottingen, Germany), hamster $IgG_1$ anti-mouse CD3 (clone 145-2C11, Immunostep, Salamanca, Spain), biotin-conjugated hamster $IgG_1$ anti-mouse CD3 (clone 145-2C11, Biolegend®, San Diego, CA, USA), rat $IgG_{2a}$ anti-mouse 4-1BB (clone 3H3, BioXCell®, NH, USA), rat $IgG_{2a}$ anti-mouse 4-1BB (clone 1D8) and rat $IgG_{2a}$ isotype control were kindly provided by Dr. M. Jure-Kunkel (Bristol-Myers Squibb®). Lawrenceville, NJ, USA), rabbit IgG anti-human phosphor-EGFR (Tyr1068) (clone D7A5, Cell Signaling Technology Inc., Leiden, The Netherlands), rabbit IgG anti-c-myc (clone A-14, Santa Cruz Biotechnology, Dallas, TX, USA) and mouse $IgG_1$ anti β-actin (clone 8226, Abcam®). Chimeric mouse/human $IgG_1$ anti-human EGFR cetuximab was purchased from Merck KGaA, (Darmstadt, Germany) and mouse/human $IgG_1$ anti-human CD20 rituximab from F. Hoffmann-La Roche Ltd. (Basel, Switzerland). Fluorescein isothiocyanate (FITC)-conjugated rat $IgG_{2a}$ anti-mouse CD8 (clone 53-6.7), allophycocyanin (APC)-conjugated rat IgG anti-mouse CD4 (clone GK1.5) were from BD Pharmingen (BD Biosciences, San Jose, CA, USA). The phycoerythrin (PE)-conjugated mAbs used were: rat $IgG_{2a}$ anti-mouse CD4 (clone RM4-5) from BD Pharmingen, and hamster $IgG_2$ anti-mouse CD137 (clone 17B5) from Biolegend®. The polyclonal antibodies used included: horseradish peroxidase (HRP)-conjugated goat anti-mouse IgG (Fc specific, Sigma-Aldrich®), PE-conjugated goat anti-mouse IgG F(ab')$_2$ fragment (Fc specific, Jackson Immuno Research, Ely, UK), PE-conjugated goat anti-human IgG F(ab')$_2$ fragment (H&L) and PE-conjugated goat anti rat IgG F(ab')$_2$ fragment (H&L) (Abcam®), DyLight800-conjugated goat anti-mouse IgG (H&L) (Rockland Immunochemicals, Limerick, PA, USA), IRDye800-conjugated donkey anti-rabbit IgG (H&L) and IRdye700-conjugated donkey anti-mouse IgG (H&L) (LI-COR® Biosciences, Lincoln, NE, USA). Alexa 647-conjugated donkey anti-rat IgG (H+L) and donkey anti-rabbit IgG (H+L) were from Molecular Probes (Thermo Fisher Scientific®, Waltham, M A, USA). Recombinant mouse TNFSF9 (4-1BBL) was from BioLegend®, the mouse 4-1BB:hFc chimera (m4-1BB) was from R&D Systems (Minneapolis, MN, USA), and the human EGFR: hFc chimera (hEGFR) was from Abcam®. Bovine serum albumin (BSA) was from Sigma-Aldrich®.

Cells and Culture Conditions

HEK293 (human embryo kidney epithelia cell, CRL-1573), NIH/3T3 (mouse embryo fibroblast, CRL-1658), and A431 (human epidermoid carcinoma, CRL-1555) cells were grown in Dulbecco's modified Eagle's medium (DMEM) (Lonza®, Walkersville, MD, USA) supplemented with 10% heat-inactivated fetal bovine serum (FBS) (Sigma-Aldrich®), 2 mM L-glutamine, 100 U/ml penicillin and 100 µg/ml streptomycin (Thermo Fisher Scientific®), referred as DMEM complete medium (DCM). All the cell lines were obtained from the American Type Culture Collection (Rockville, MD, USA). HEK293 cells expressing m4-1BB (HEK239$^{m4-1BB}$) were cultured in DCM supplemented with 500 µg/ml G418 (Thermo Fisher Scientific®). Mouse NIH/3T3 cells expressing human EGFR (3T3$^{hEGFR}$) were kindly provided by Dr. A. Villalobo (IIBm, CSIC-UAM, Madrid, Spain). Mouse CT26 cells (colon carcinoma cells, CRL-2638) infected with p-BABE-puro-hEGFR expressing human EGFR (CT26$^{hEGFR}$) or infected with the empty vector retrovirus (CT26$^{mock}$) were kindly provided by Dr. M. Rescigno (Department of Experimental Oncology, European Institute of Oncology, Milan, Italy). All cell lines were cultured in DCM. The cell lines were routinely screened for the absence of *mycoplasma* contamination by PCR using the *Mycoplasma* Plus™ Primer Set (Stratagene, Cedar Creek, TX, USA).

Mice

C57BL/6, BALB/c, Hsd:ICR (CD-1) and Hsd:athymic Nude-Foxn1 nu female mice were purchased from Harlan Iberica (Envigo, Barcelona, Spain). Animals were housed under sterile conditions when necessary at a constant temperature of 20-22° C. and relative humidity (45-65%) under daily cycles of light/darkness (12 hours). Manipulation was performed in laminar flow hood, when was necessary, and sterilized water and food were available ad libitum. Animal protocols were approved by the respective Ethical Committee of Animal Experimentation of the participant institutions: Instituto Investigación Sanitaria Puerta de Hierro-Segovia de Arana (Hospital Universitario Puerta de Hierro Majadahonda, Madrid, Spain), Intituto de Investigaciones Biomédicas "Alberto Sols" (IIBm) (CSIC-UAM, Madrid) and Laboratory Animal Applied Research Platform (Parc Cientific, Barcelona, Spain). Procedures were additionally approved by the Animal Welfare Division of the Environmental Affairs Council of the Autonomous Government of Madrid (PROEX numbers 66/14, 430/15, 264/16) and by the ethical committee of the Catalonian authorities (Procedure number 9912).

Construction of Expression Vectors

The DNA fragment encoding the 1D8 scFv[5] was PCR amplified with primers SfiI-1D8-Fw and NotI-1D8-Rv and ClaI/BamHI restriction sites were synthetically introduced. The ClaI/NotI PCR fragment was ligated into ClaI/NotI digested backbone pCR3.1-L36-NC1 resulting in pCR3.1-1D8-TIE expression vector. To obtain the plasmidspCR3.1-1D8-TIE$^0$ and pCR3.1-1D8-TIE$^5$, two synthetic genes encoding the 1D8scFv gene fused directly or by a 5-mer flexible linker to the N-terminus of the mouse TIE$^{XVIII}$ domain were synthesized by Geneart® AG (Regensburg, Germany) and subcloned as PstI/XbaI into the vector pCR3.1-1D8-TIE[18]. To generate the bispecific trimerbody-expressing vector, the BamHI/XbaI DNA fragment, containing the anti-EGFR EGa1 $V_{HH}$ gene, from plasmid pCR3.1-EGa1-TIE[7] was ligated into the BamHI/XbaI digested backbone of plasmid pCR3.1-1D8-TIE[18], to obtain the pCR3.1-1D8$^{N18}$-TIE-$^{C18}$EGa1-myc/His expression vector. In order to introduce a N-terminal Flag-StrepII tag to the previously described plasmid, the HindIII/NotI cleaved DNA fragment from pCR3.1-FLAG-StrepII-1D8-TIE[18]-iRGD was ligated into the HindIII/NotI digested backbone of plasmid pCR3.1-1D8$^{N18}$-TIE-$^{C18}$EGa1-myc/His to obtain the pCR3.1-FLAG-StrepII-1D8$^{N18/C18}$EGa1-myc/His expression vector. The C-terminal myc/His tag-sequence was removed by PCR with a pair of primers LEGA-1 and Stop-XbaI-Rev to generate the final vector pCR3.1-FLAG-StrepII-1D8$^{N18/C18}$EGa1. The sequences were verified using primers Fw-CMV and Rv-BGH.

To construct the plasmid pCR3.1-1D8$^{N5}$TIE[18]CEA.1, a synthetic gene encoding the C-terminal part of the 1D8 scFv gene fused by a 5-mer linker to the N-terminus of the human TIE$^{XVIII}$ domain a by 18-mer linker to the CEA-specific CEA.1 VHH gene was synthesized by Geneart® AG (Regensburg, Germany) and subcloned as PstI/XbaI into the vector pCR3.1-1D8$^{N18}$. The vector pCR3.1-CEA.1-TIE$^{N17}$ encoding the CEA specific CEA.1 VHH-based N-terminal trimerbody CEA.1$^{N17}$ has been previously described. The sequences were verified using primers FwCMV (5'-CGCAAATGGGCGGTAGGCGTG-3') (SEQ ID NO:13) and RvBGH (5'-TAGAAGGCACAGTCGAGG-3) (SEQ ID NO:14)

Expression and Purification of Recombinant Antibodies

HEK293 cells were transfected with the appropriated expression vectors by calcium phosphate precipitation method and selected in DCM with 500 μg/mL G418 to generate the stable cell lines, HEK293-1D8$^{N0}$, HEK293-1D8$^{N5}$, HEK293-1D8$^{N18}$ and HEK293-1D8$^{N/C}$EGa1. Supernatants of transfected cells were analyzed for protein expression by ELISA and Western blotting. Conditioned media from stable transfected HEK293-1D8$^{N0}$, HEK293-1D8$^{N5}$, and HEK293-1D8$^{N18}$ cells were dialyzed against PBS (pH 7.4) and loaded onto a HisTrap HP 1 mL column (GE Healthcare®, Uppsala, Sweden) using an AKTA Prime plus system (GE Healthcare®). Otherwise, conditioned media from HEK293-1D8$^{N/C}$EGa1 cells was collected and purified using (Twin-) Strep-tag purification system (IBA Lifesciences). The purified antibodies were dialyzed overnight at 4° C. against PBS+150 mM NaCl (pH 7.0), analyzed by SDS-PAGE under reducing conditions and stored at 4° C. Purified antibodies were tested for endotoxin levels by Pierce's limulus amebocyte lysate (LAL) chromogenic endotoxin quantitation kit, following the manufacturer's specifications (Thermo Fisher Scientific®).

Western Blotting

Protein samples were separated under reducing conditions on 10-20% Tris-glycine gels and transferred onto nitrocellulose membranes (Thermo Fisher Scientific®) and probed with either anti-c-myc or anti-FLAG mAbs, followed by incubation with DyLight800-conjugated goat anti-mouse IgG. Visualization and quantitative analysis of protein bands were performed with the Odyssey© infrared imaging system (LI-COR® Biosciences, Lincoln, NE, USA).

ELISA

Both m4-1BB (3 μg/ml) or hEGFR (5 μg/ml) were immobilized on Maxisorp ELISA plates (NUNC Brand Products, Roskilde, Denmark) overnight at 4° C. After washing and blocking with 200 μl PBS-5% BSA, 100 μl of conditioned media or purified protein solution at 1 μg/ml were added and incubated for 1 hour at room temperature. The wells were washed for three times with PBS0.05% Tween-20, and 100 μl of anti-c-myc mAb or anti-FLAG mAb were added for 1 hour incubation at room temperature. The plate was washed as above described and 100 μl of HRP-conjugated goat anti-mouse IgG were added to each well. Afterwards, the plate was washed and developed using OPD (Sigma-Aldrich®). For competition ELISA, m4-1BB (3 μg/ml) was immobilized overnight at 4° C. After washing and blocking, recombinant m4-1BBL was added at desired concentration to the wells for 1 hour. Afterwards, purified antibody solution was serially diluted in blocking buffer, added to the wells and incubated for 1 hour at room temperature. Following standard washing steps, anti-FLAG mAb solution was added for 1 hour. After washing HRP-conjugated goat anti-mouse IgG was added and developed using OPD.

Flow Cytometry

Binding of m4-1BBL, 1D8$^{N0}$, 1D8$^{N5}$, 1D8$^{N18}$, and 1D8$^{N/C}$EGa1 to cells expressing m4-1BB (HEK293$^{m4-1BB}$) or hEGFR (3T3$^{hEGFR}$ and CT26$^{hEGFR}$) was analyzed by flow cytometry. Briefly, 2.5×10$^5$ cells were incubated for 1 hour on ice with purified antibodies, washed and incubated for 30 minutes with anti-His, anti-c-myc or anti-FLAG mAbs on ice and detected with a PE-conjugated goat F(ab')$_2$ anti-mouse IgG antibody. The 1D8 IgG and cetuximab were used as controls on FACS studies, using appropriate dilutions of PE-conjugated goat F(ab')$_2$ anti-mouse IgG and PE-conjugated goat F(ab')$_2$ anti-human IgG, respectively. Wild type HEK293, NIH/3T3 cells and CT26$^{mock}$ cells were used as negative controls. Samples were analyzed with a MACSQuant Analyzer 10 flow cytometer (Miltenyi Biotec® GmbH, Bergisch Gladbach, Germany) and data were evaluated using the FCS Express V3 software (De Novo Software, Glendale, CA, USA). Mouse CD8a$^+$ T cells were isolated from spleens and purified using the EasySep™ Mouse CD8a$^+$T Cell Isolation Kit from Stem Cell Technologies (Grenoble, France). Mouse CD8a$^+$T cells were activated for 48 hours with 5 μg/mL concanavalin-A (Sigma-Aldrich®). Afterwards, single cell suspension was preincubated with 50 μg/mL human γ-globulin (Grifols® International, Barcelona, Spain) for 10 minutes, and 10$^5$ cell aliquots were incubated with a combination of anti-mouse APC-conjugated, FITC-conjugated and PE-conjugated antibodies specific for different surface markers for 20 minutes. For competition studies (1D8 IgG vs. 1D8$^{N5}$ or 1D8$^{N18}$) concanavalin-A-activated mouse T cells (2×10$^5$ cells/condition) were blocked with human γ-globulin for 5 minutes. Then, samples were incubated with 10 μg/ml 1D8 IgG for 20 minutes on ice and washed with PBS thereafter, while the other samples were left untreated on ice. Then, cells were incubated with 2 μg/ml of either 1D8 IgG, 1D8$^{N18}$, 1D8$^{N5}$ or rat IgG$_{2a}$ for 20 minutes on ice and washed. Next, cells that were incubated with myc-tagged 1D8$^{N18}$ or 1D8$^{N5}$ and one untreated control sample were incubated with rabbit IgG anti-c-myc mAb for 20 min on ice and washed thereafter. Finally, cells were incubated with either Alexa 647-labeled donkey anti-rat IgG or donkey anti-rabbit IgG together with FITC-conjugated rat IgG$_{2a}$ anti-mouse CD8 mAb for 20 minutes on ice. Samples were analyzed with a FACSCanto™ II and FACSort flow cytometers (BD Biosciences) using the FACSDiva® and CellQuest® softwares (BD Biosciences). To generate a population of HEK293 cells homogeneously expressing high levels of 4-1BB (HEK293$^{m4-1BB}$-S), HEK293$^{m4-1BB}$ cells were stained with PE-anti-mouse CD137 mAb and sorted using a FACSAria™ II (BD Bioscience).

Mass Spectrometry

A 2 μl protein sample was desalted using ZipTip® C4 micro-columns (Merck Millipore, Billerica, MA, USA) and eluted with 0.5 μl SA (sinapinic acid, 10 mg/ml in [70:30]

Acetonitrile: Trifluoroacetic acid 0.1%) matrix onto a GroundSteel massive 384 target (Bruker® Daltonics, Billerica, MA, USA). An Autoflex III MALDI-TOF/TOF spectrometer (Bruker® Daltonics) was used in linear mode with the following settings: 5000-40000 Th window, linear positive mode, ion source 1:20 kV, ion source 2:18.5 kV, lens: 9 kV, pulsed ion extraction of 120 ns, high gating ion suppression up to 1000 Mr. Mass calibration was performed externally with protein 1 standard calibration mixture (Bruker® Daltonics). Data acquisition, peak peaking and subsequent spectra analysis was performed using FlexControl 3.0 and FlexAnalysis 3.0 software (Bruker® Daltonics).

Size Exclusion Chromatography-Multiangle Laser Light Scattering (SEC-MALS)

Static light scattering experiments were performed at room temperature using a Superdex 200 Increase 10/300 GL column (GE Healthcare®) attached in-line to a DAWN-HELEOS light scattering detector and an Optilab rEX differential refractive index detector (Wyatt Technology®, Santa Barbara, CA, USA). The column has an exclusion volume of 8.6 mL, and no absorbance (no aggregated protein) was observed in any of the injections. The column was equilibrated with running buffer (PBS+150 mM NaCl, 0.1 µm filtered) and the SEC-MALS system was calibrated with a sample of BSA at 1 g/L in the same buffer. Then 100 µL samples of the two antibodies $1D8^{N18}$ and $1D8^{N/C}EGa1$ at 1 g/L in the running buffer were injected into the column at a flow rate of 0.5 mL/minute. Data acquisition and analysis were performed using ASTRA® software (Wyatt Technology®). The reported molar mass corresponds to the center of the chromatography peaks. After separation of the monomeric species by SEC a second injection in the SEC-MALS system was done at 0.26 g/L. Based on numerous measurements on BSA samples at 1 g/L under the same or similar conditions it was estimated that the experimental error in the molar mass is around 5%.

Circular Dichroism

Circular dichroism measurements were performed with a Jasco J-810 spectropolarimeter (JASCO®, Tokyo, Japan). The spectra were recorded on protein samples at 0.2 g/L in PBS using 0.2 cm path length quartz cuvettes at 25° C. Thermal denaturation curves from 10 to 95° C. were recorded on the same protein samples and cuvette by increasing temperature at a rate of 1° C./minute and measuring the change in ellipticity at 218 nm.

Small-Angle X-Ray Scattering (SAXS)

SAXS experiments were performed at the beamline B21 of the Diamond Light Source (Didcot, UK). The proteins were concentrated and prepared at 4° C. prior data collection. Samples of 40 µl of $1D8^{N18}$ and $1D8^{N/C}EGa1$ at concentrations of 3 and 6 mg/mL were delivered at 4° C. via an in-line Agilent 1200 HPLC system in a Shodex Kw-403 column, using a running buffer composed by 50 mM Tris pH 7.5+150 mM NaCl. The continuously eluting samples were exposed for 300 s in 10 s acquisition blocks using an X-ray wavelength of 1 Å, and a sample to detector (Pilatus 2M) distance of 3.9 m. The data covered a momentum transfer range of $0.032 < q < 3.695$ Å$^{-1}$. The frames recorded immediately before elution of the sample were subtracted from the protein scattering profiles. The Scåtter software package (www dot bioisis dot net) was used to analyze data, buffer-subtraction, scaling, merging and checking possible radiation damage of the samples. The data set corresponding to $1D8^{N18}$ at 3 mg/mL could not be further analyzed due to aggregation. The $R_g$ values were calculated with the Guinier approximation assuming that at very small angles $q < 1.3/R_g$. The maximum particle distribution, $D_{max}$, and the distance distribution were calculated from the scattering pattern with GNOM, and shape estimation was carried out with DAMMIF/DAMMIN, all these programs included in the ATSAS package. Interactively generated PDB-based models were made for the two antibodies based in templates obtained with the program RaptorX (22814390). Real-space scattering profiles of the models were computed with the program FoXS.

Kinetic Measurements Using Biolayer Interferometry

The avidities of the interactions between immobilized m4-1BB and analyte 1D8 IgG, $1D8^{N18}$, $1D8^{N5}$, and $1D8^{N0}$ were investigated on an Octet RED96 system (Fortebio®, Menlo Park, CA, USA). Mouse 4-1BB was immobilized by conventional amine reactive coupling onto AR2G biosensors (Fortebio®). Immobilization was performed using 10 µg/mL of m4-1BB in 10 mM acetate buffer at pH 6, over 20 minutes, to a signal of 1.8±0.4 nm. The kinetics experiment for each antibody used four unregenerated m4-1BB-coated biosensors, two of which were associated with 4 nM of antibody in kinetics buffer (PBS+0.1% BSA and 0.05% Tween 20), and two with 2 nM. Association was run for one hour, followed by three hours of dissociation in analyte-free kinetics buffer. The acquired sensorgrams were globally fit to a 1:1 model using the Octet Data analysis software. Kinetics experiments were performed at 37° C. while shaken at 1000 rpm. The avidity of the interaction between immobilized hEGFR and analyte $1D8^{N/C}EGa1$ was investigated similarly. The hEGFR was immobilized by amine reactive coupling using 3 µg/mL of hEGFR in 10 mM acetate buffer at pH 5. Association and dissociation were both measured for two hours. To demonstrate the ability of $1D8^{N/C}EGa1$ to bind both of its antigens in tandem m4-1BB was immobilized onto AR2G biosensors as was just described, and 4 nM of $1D8^{N/C}EGa1$ or $1D8^{N18}$ were then allowed to associate with two biosensors each for one hour. The biosensors were briefly moved into kinetics buffer for 10 minutes, after which one biosensor loaded with each antibody was moved into 10 nM hEGFR for an hour while the other biosensor remained in kinetics buffer. Finally, all biosensors were moved into kinetics buffer for one hour.

The ability of $1D8^{N/C}CEA.1$ to bind biosensor-immobilized m4-1BB and hCEA in solution at the same time was investigated using biolayer interferometry (BLI) on an Octet RED96 system (Fortebio®, Menlo Park, CA, USA). AR2G biosensors (Fortebio®) were activated using s-NHS and EDC, and then coated with 10 µg/mL m4-1BB in 10 mM sodium acetate at pH 6 for 20 minutes, followed by quenching with ethanolamine. After 10 minutes of equilibration in kinetics buffer (PBS with 0.1% BSA and 0.05% Tween20), the coated biosensors were incubated in kinetics buffer containing 4 nM of $1D8^{N18}$, $1D8^{N/C}CEA.1$, or only kinetics buffer for one hour. The biosensors were then transferred into a solution of 50 nM hCEA in kinetics buffer or kinetics buffer for two hours, followed by a final incubation in kinetics buffer for one hour. Raw sensor data was exported and smoothed by Savitky-Golay filtering. Similarly, the kinetics of the interaction between m4-1BB and the trimerbody were investigated by using m4-1BB-coated biosensors, incubating with 2 or 4 nM of $1D8^{N/C}CEA.1$ in kinetics buffer for one hour, and then monitoring dissociation in kinetics buffer for 3 hours. The data were fit to a 1:1 binding model using the Octet Analysis software.

Cell Adhesion Assay 96-well microtiter plates (Corning Costar, Cambridge, MA, USA) were coated overnight at 4° C. with (2 µg/well) hCEA or (1 µg/well) laminin-111 (Lm111) extracted from the Engelbreth-Holm-Swarm mouse tumor (Sigma-Aldrich®). After washing and blocking with 200 µl 3% BSA-DMEM for 1 hour at 37° C., appropriated dilutions of purified 1D8$^{N18}$ or 1D8N/CCEA.1 were added for 1 hour at 4° C. After washing 5×104 HEK293or HEK239m4-1BB cells were loaded per well in serum-free medium and incubated for 30 minutes in humidified 5% $CO_2$ atmosphere at 37° C. After washing 100 µl of substrate CellTiter-Glo (Promega®, Madison, WI, USA) were added per well, and the bioluminescence measured using a Tecan® Infinite F200 plate reading luminometer (Tecan® Group Ltd., Zurich, Switzerland). Results are expressed as a mean±SD (n=3) from 1 of at least 3 separate experiments. Data are reported as the fold change in adhesion relative to BSA.

Serum Stability

Purified 1D8$^{N18}$ and 1D8$^{N/C}$EGa1 were incubated in human serum at 37° C., for at least 7 days. The binding activity of the sample at 0 hours was set as 100% in order to calculate the time corresponding to percentage decay in binding activity.

T Cell Costimulation Assays

Goat anti-hamster IgG was pre-coated overnight in 96-well plates (5 µg/ml), and after blocking with 200 µl of RPMI (Lonza®) supplemented with heat-inactivated 10% FBS, 2 mM L-glutamine, 100 U/ml penicillin, 100 µg/ml streptomycin and 50 µM 2-mercaptoethanol (Thermo Fisher Scientific®) referred as RPMI complete medium (RCM), anti-mouse CD3 mAb (1 µg/ml) was added and incubated at 37° C. for 1 hour. Then purified mouse CD8a$^+$T cells (2.5×10$^5$/well) in RCM and purified antibodies at the indicated concentrations were added. As a control, purified mouse CD8a$^+$ T cells were cultured alone with the immobilized anti-CD3 mAb. After 48 hours, supernatants were collected and assayed for cytokine release (IFNγ) by ELISA, performed according to the manufacturer's instructions (Diaclone, Besançon, France). Cell proliferation was assessed after 48 hours using the CellTiter-Glo luminescent assay (Promega®, Madison, USA). Bioluminescence was measured using a Tecan® Infinite F200 plate-reading luminometer (Tecan® Trading AG, Switzerland). Results are expressed as a mean±SD from 1 of at least 3 separate experiments. Data are reported as x-fold change costimulation relative to the values obtained from anti-CD3-stimulated cells.

Antigen-Specific T Cell Costimulation Assays

For the studies with purified hEGFR, 96-well plates were pre-coated with goat anti-hamster IgG (5 µg/ml) and hEGFR (5 µg/well) overnight at 4° C. After blocking with 200 µl of RCM, anti-mouse CD3 mAb (1 µg/ml) was added and incubated at 37° C. for 1 hour before adding purified mouse CD8a$^+$T cells (2.5×10$^5$/well) and the purified costimulatory antibodies, at the indicated concentrations. As a control, CD8a$^+$ T cells were cultured alone in the absence of costimulatory antibodies. For the costimulation studies with cells wild-type NIH/3T3 or 3T3$^{hEGFR}$ target cells were seeded overnight (2.5×10$^4$/well) in 96-well plates. Next day, target cells were pre-incubated for 30 minutes on ice with purified antibodies at the indicated concentrations. Purified mouse CD8a$^+$ T cells were activated with biotin-conjugated anti-mouse CD3 mAb (100 ng/ml) cross-linked with streptavidin (Sigma-Aldrich®) (1:5 molar ratio) and added at 10:1 effector/target ratio (E/T). As a control, mouse CD8a$^+$ T cells were cultured alone with plastic immobilized anti-CD3 mAb. Both assays were analyzed after 48 hours for IFNγ secretion and cell proliferation, as previously described. Results are expressed as a mean±SD from 1 of at least 3 separate experiments.

Goat anti-hamster IgG (Jackson ImmunoResearch) and hCEA were pre-coated (5 µg/ml) overnight at 4° C. in 96-well plates. After blocking, 1 µg/ml anti-CD3e mAb (clone 145-2C11; Immunostep, Salamanca, Spain) was added and incubated at 37° C. for 1 hour. Purified CD8a+ T cells (CD8a+T Cell Isolation Kit, mouse, Miltenyi Biotec®, GmbH) from spleens of C57BL/6 mice were added (2×105/well) in complete RPMI+50 µM 2-mercaptoethanol with purified antibodies at 6.67 nM. As a control, purified mouse CD8a+ T cells were cultured alone with the immobilized anti-CD3e mAb. After 72 hours, cell proliferation was assessed with the CellTiter-Glo luminescent assay (Promega®) using a Tecan® Infinite F200 plate-reading luminometer, and supernatants were collected and assayed for IFNγ secretion by ELISA (Diaclone, Besançon, France). Results are expressed as a mean±SD (n=3) from 1 of at least 3 separate experiments. Data are reported as fold change costimulation relative to the values obtained from anti-CD3e stimulated cells.

Viability Assays

For the viability assays, purified mouse CD8a$^+$T cells (10$^5$/well) were cultured in 96-well plates with different stimuli as described above. At 24, 48 and 72 hours cells were collected, washed twice with cold PBS and then resuspended in Annexin V binding buffer (Immunostep) and incubated with FITC-conjugated Annexin V (Immunostep) and 7-Aminoactinomycin D (7-AAD) (BD Biosciences) for 15 minutes at room temperature in the dark. Samples were then analyzed with a MACSQuant Analyzer 10 flow cytometer. Data are representative of at least three independent experiments and values are expressed in mean±SD.

Inhibition of EGFR-Mediated Cell Proliferation

A431 cells (2×10$^3$/well) were seeded in DCM in 96-well plates. After 24 hours, medium was replaced by DMEM supplemented with 1% FCS containing equimolar concentrations (0.19-50 nM) of purified antibodies: cetuximab, rituximab, 1D8$^{N/C}$EGa1 or 1D8 IgG. Cells were then incubated for 72 hours and viability was assessed using the CellTiter-Glo luminescent assay. Bioluminescence was measured using a Tecan® Infinite F200 plate-reading luminometer. Experiments were performed in triplicates.

Inhibition of EGFR signaling A431 cells were maintained in DCM for 24 hours and prior to antibody treatment, cells were starved overnight in DMEM supplemented with 1% FCS. Before growth factor stimulation, cells were incubated for 4 hours in serum-free DMEM in presence of equimolar concentrations (0.1 µM) of cetuximab, rituximab, 1D8$^{N/C}$EGa1 or 1D8 IgG, followed by incubation with 25 ng/mL of human EGF (Miltenyi Biotec® GmbH) for 5 minutes. After stimulation, cells were lysed in Laemmli-lysis buffer (Bio-Rad, Hercules, CA, USA) for 10 minutes on ice and collected by scraping. Samples were separated under reducing conditions on 4-12% Tris-glycine gels and transferred to nitrocellulose membrane using iBlot Dry Blotting System (Thermo Fisher Scientific®). Membranes were incubated overnight with the rabbit anti-human phosphor-EGFR (Tyr1068) mAb (clone D7A5) followed by incubation with an IRDye800-conjugated donkey anti-rabbit antibody. Simultaneously, anti-R-actin mouse mAb was added as a loading control, followed by IRDye700-conjugated donkey anti-mouse IgG. Visualization and quantitative analysis of protein bands were carried out with the Odyssey infrared imaging system.

Antibody Labeling

Purified 1D8 IgG, 1D8$^{N18}$ and 4-1BBL were labeled with Mix-n-Stain CF488A antibody labeling kit, and purified 3H3 IgG and 1D8$^{N/C}$EGa1 were labeled with Mix-n-Stain CF647 antibody labeling kit according to the manufacturer's recommendations (Biotium®, Fremont, CA, USA). The degree of labeling (DOL) was determined from the absorption spectrum of the labeled antibody (1.5/1 and 2.7/1 dye/protein in the case of CF488A- and CF647-labeled proteins respectively) (Implen NanoPhotometer, Munich, Germany). The functionality of CF488A- and CF647-labeled antibodies was verified by flow cytometry and the structural integrity analyzed by SDS-PAGE under non-reducing conditions.

Live cell receptor clustering imaging and molecular diffusion quantification HEK293$^{m4-1BB}$-S cells were plated onto 35-mm poly-L-lysine pre-coated dishes at a 50% confluence, and after overnight culture the dishes were assembled in 35-mm diameter chambers (Ibidi® GmbH, Martinsried, Germany) with 600 μl of DCM and set onto a Leica SP8 3x SMD microscope (Leica Microsystems, Wetzlar, Germany) under 37° C. and 5% $CO_2$ conditions. The excitation wavelength used was 488 nm from a white light laser (NKT Photonics A/S, Birkerød, Denmark) with very low power 2-5%, and the detection was from 500-550 nm. CF488A-labeled 1D8 IgG, 1D8$^{N18}$, or 4-1BBL were extemporaneously added to the cells at a final concentration of 100 ng/ml, and raster imaging correlation spectroscopy (RICS) was performed. Characterization of the microscope point spread function, i.e., the focal volume where the fluorescent dyes diffuse in and out, was done employing 2 μg/mL soluble purified EGFP (Biovision, Milpitas, CA, USA), as described. The series of images recorded for RICS, were of 256×256 pixels, with a pixel size of 80 nm, and employing 2 μs dwell time. RICS analysis and diffusion coefficient quantification was done employing the SIM FCS 4 software (G-SOFT Inc., Champaign, IL, USA). Every time trace from the time series was careful observed to avoid possible artifacts due to dramatic photobleaching, which otherwise would affect the diffusion coefficient quantification. By these means it was avoid employing detrending algorithms that sometimes can bias the analysis. RICS analysis was performed using a moving average (background subtraction) of 10 to discard possible artifacts arising from cellular motion and slow-moving particles passing through. The obtained 2D autocorrelation map was fitted to get the diffusion surface map that was represented in 3D. For the different regions of interest (ROI) analyses within the same cell, the corresponding region was drawn employing a square region of 64×64 pixels. Selected regions were defined as where there was presence or absence of receptor clustering. For statistical purposes each condition was studied on minimum 5 different cells, and in each cell a minimum of 3 different ROIs were analysed. Brightness and contrast of the fluorescence and differential interference contrast were optimized with ImageJ software (imagej dot nih dot gov/ij/). Diffusion values were represented in a whiskers and box plot using OriginPro® (OriginLab®, Northampton, MA, USA).

Pharmacokinetics Study

Female CD-1 mice (n=24/group) received a single intravenous (i.v.) dose of 1D8$^{N18}$ or 1D8$^{N/C}$EGa1 (1 mg/kg). Blood samples from 3 mice per group were collected at different time points after administration (5, 15, 30 minutes and 1, 3, 6, 24, 48 hours). Serum was obtained after centrifugation (5000 rpm, 10 minutes, 4° C.) and stored at −20° C. Sera were analyzed for antibody concentration by ELISA against immobilized m4-1BB, as described above. Pharmacokinetic parameters were calculated using Prism software (GraphPad Software, San Diego, CA, USA).

Molecular Imaging in Tumor-Bearing Mice

The human EGFR-expressing A431 cells (1×10$^6$) were implanted subcutaneously (s.c.) in 105 μl of DMEM+42% Matrigel (BD Biosciences) into the dorsal space of 6-week-old female Hsd:athymic Nude-Foxn1nu mice. Tumor growth was monitored two times a week, by measuring the diameter of the tumors with a caliper and tumor volumes were calculated according to the formula: Volume=(D×d2/2), where D is the longest axis of the tumor and d is the shortest of a prolate ellipse. Body weight of the animals was monitored along the assay. When tumor volume reached about 0.180 cm$^3$, mice were randomly allocated to different treatment groups (n=3/group) and injected in the tail vein with 100 μl of PBS or 100 μl of CF647-labeled antibody solution (1 mg/ml) in PBS. Mice were imaged under anesthesia (2.5% isoflurane) at 24 hours under the IVIS Spectrum CT in vivo imaging system (Xenogen) (Waltham, MA, USA) at indicated wavelengths and were analyzed using the Living Image 3.2 software (PerkinElmer®, Waltham, MA, USA). The fluorescence images were analyzed by identifying 3 ROIs from representative areas, within the tumor and from surrounding regions (normal tissue). The tumor-to-normal tissue (T/N) ratio was calculated by dividing the mean values of the identified ROIs. Fluorescence intensity of all the images are reported as photons per second per centimeter squared per steradian (p/s/cm$^2$/sr).

Therapeutic Studies

CT26$^{hEGFR}$ tumor cells (1.5×10$^6$ per animal) were implanted s.c. in 100 μl of PBS+30% Matrigel into the dorsal space of 6-week-old female BALB/c mice. Tumor growth was monitored by caliper measurements three times a week, and when tumors reached approximately 0.4 cm in diameter (usually from 7 to 10 days), mice were randomly allocated to different treatment groups (n=5 or 6/group) and treated every other day with three i.p. injections of PBS, anti-4-1BB antibodies (1D8 IgG, 3H3 IgG, 1D8$^{N18}$, 1D8$^{N/C}$EGa1) or control antibody (rat IgG$_{2a}$ isotype, MFE-23$^{N18}$) at 4 mg/Kg. Mice were euthanized when tumor size reached a diameter of 1.5 cm any dimension, when tumors ulcerated or at any sign of mouse distress. To study the long-lasting systemic immune-mediated response, surviving mice (n=5) were re-challenged with CT26$^{mock}$ cells (1.5×10$^6$) in the contralateral left flank 50 days following treatment with 3H3 IgG or 1D8$^{N/C}$EGa1. Tumor growth was monitored by caliper measurements three times a week. Cured and naïve mice were followed for an additional 85 days after reinoculation unless either the primary or rechallenge tumor reached a diameter of 1.5 cm in any dimension or got ulcerated after which the mice euthanized.

Toxicity Studies

For the analysis of liver toxicity, three-month-old female C57BL/6 mice received a weekly i.p. dose of 3H3 IgG or 1D8$^{N/C}$EGa1 (6 mg/kg) for three weeks. Mice were anesthetized and bled on days 0, 7, 14 and 21. To obtain mouse serum, blood was incubated in BD microtainer SST tubes (BD Biosciences), followed by centrifugation. Serum was stored at −20° C. until use. One week after the last dose of antibodies mice were euthanized and liver, spleens, lungs and pancreas were surgically removed weighted and fixed in 10% paraformaldehyde for 48 hours. Then fixed tissues were washed and embedded in paraffin. Tissue sections (5 μm) were stained with hematoxylin and eosin (H&E) or with sirius red (Sigma-Aldrich®) for collagen staining. Lymphocyte infiltration in liver was quantified using ImageJ software.

Luminex® Assay

Blood was collected from treated mice via retro-orbital bleeding on indicated days and levels of inflammatory cytokines (IFNγ, IL-6, TNFα) in serum samples were determined by a Luminex® assay using a Luminex® Milliplex Magnetic Bead Kit (Merck Millipore, Billerica, MA, USA).

Statistical Analysis

All the experiments were done in triplicates and the statistical analysis was performed using Prism software (GraphPad Software). Significant differences (P value) were discriminated by applying a two-tailed, unpaired Student's t test assuming a normal distribution with *P≤0.05, P≤0.01, *P≤0.001. Values are presented as mean±SD. Survival curves were created using the method of Kaplan-Meier and two or more survival curves were analyzed using the long-rank test.

Results

Figure 7:
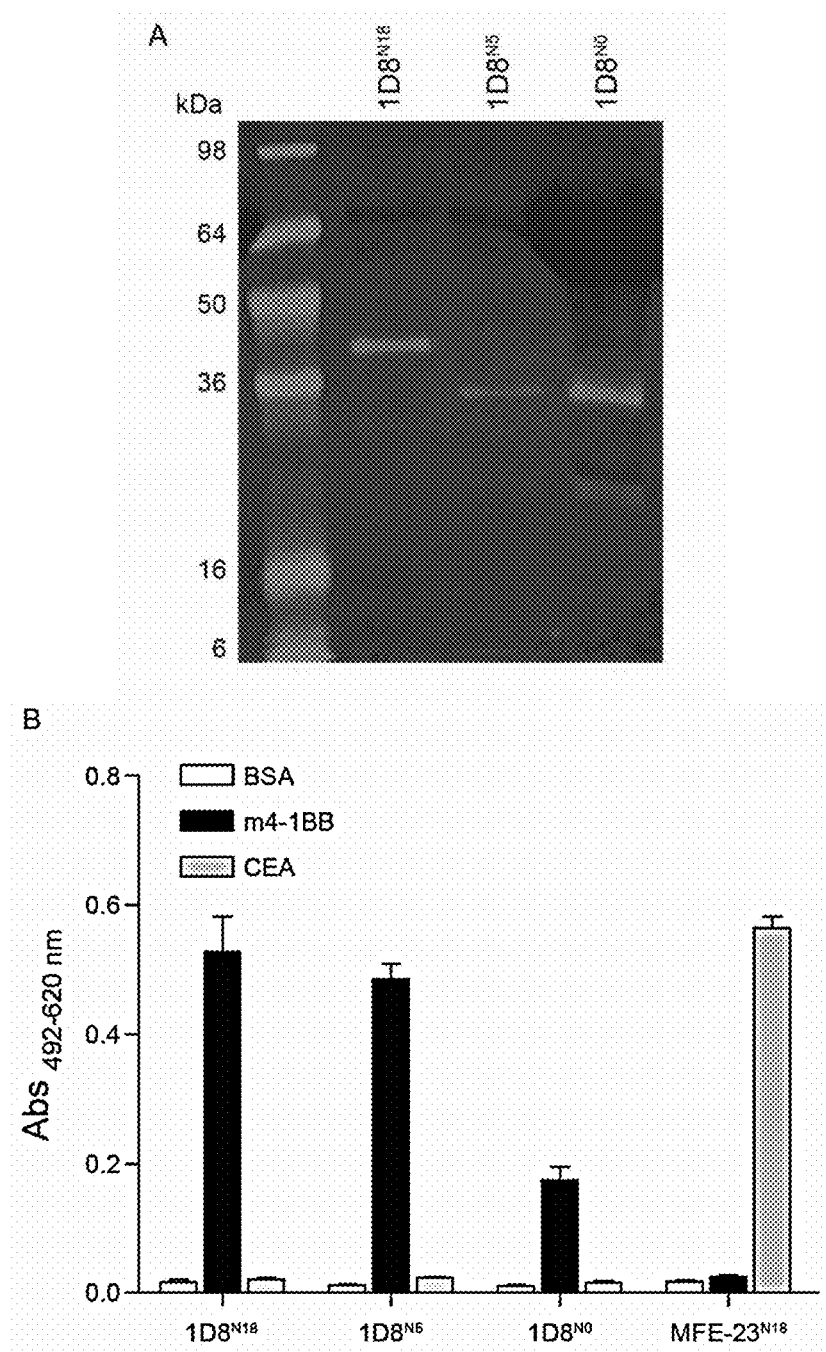
FIG. 7. (A) The presence of secreted 1D8$^{N18}$, 1D8$^{N5}$ and 1D8$^{N0}$ trimerbodies in the conditioned media from transfected HEK-293 cells was demonstrated by western blot analysis. Migration of molecular mass markers is indicated (kDa). (B) The functionality of secreted 1D8$^{N18}$, 1D8$^{N5}$, 1D8$^{N0}$ and MFE-23$^{N18}$ trimerbodies was demonstrated by ELISA against plastic immobilized m4-1BB and human CEA.

Design of 4-1BB-Agonistic Trimerbodies Using the scFv derived from the rat IgG$_{2a}$, anti-4-1BB 1D8 mAb (Shuford W W, *J. Exp. Med.* 1997; 186:47-55) (FIG. 1A), a panel of 1D8 scFv-based N-terminal trimerbodies (1D8$^N$) was designed. Three candidates were generated with varied lengths of the flexible linker connecting the 1D8 scFv to a murine collagen XVIII-derived homotrimerization (TIE$^{XVIII}$) domain: 1D8$^{N0}$ has no linker, while 1D8$^{N5}$ and 1D8$^{N18}$ have 5- and 18-residue-long linkers, respectively (FIG. 1B). All three constructs were expressed by transfected HEK293 cells at similar levels to MFE-23$^{N18}$, a benchmark N-terminal trimerbody based on the anti-CEA MFE-23 scFv (Cuesta A M, et al. *PLoS. One.* 2009; 4:e5381). In western blot analysis under reducing conditions, the 1D8$^N$ trimerbodies were single-chain-type molecules with a migration pattern consistent with the molecular weights calculated from their amino acid sequences (34.4, 34.7, and 36.8 kDa, in the order of increasing linker length) (FIG. 7A). Additionally, they specifically recognized murine 4-1BB in fusion with human Fc (m4-1BB) immobilized on plastic, as determined by ELISA (FIG. 7B).

Figure 2:
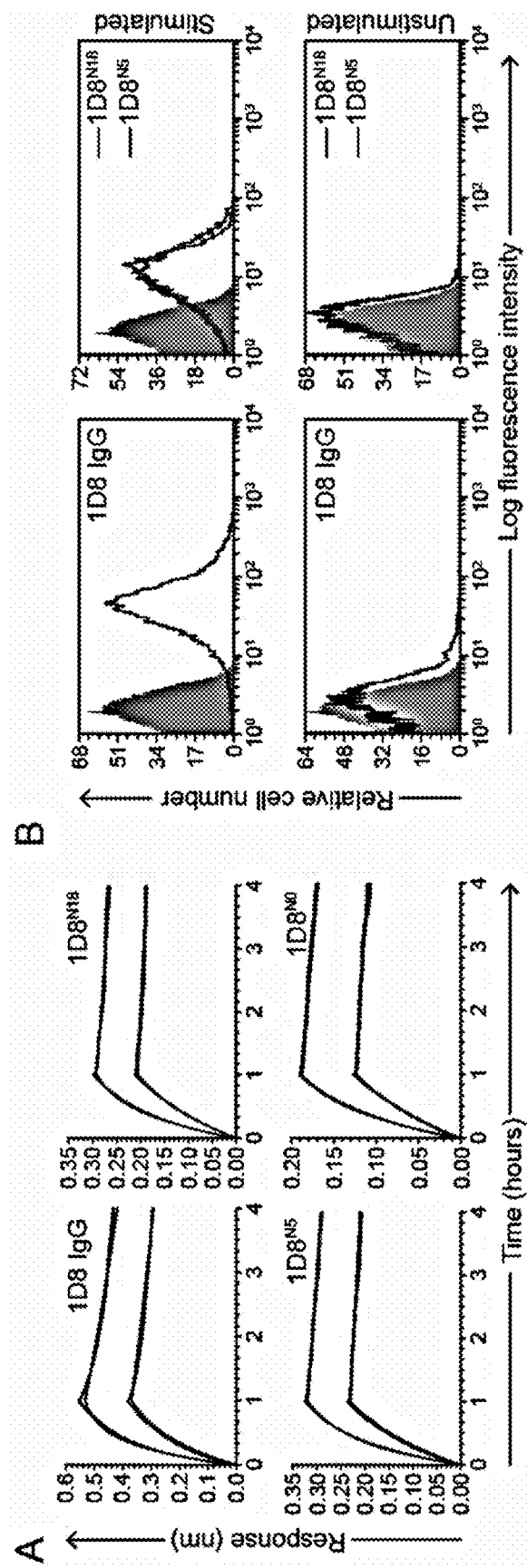
FIG. 2. Characterization of anti-4-1BB trimerbodies. (A) Sensorgrams (black curves) and fitting curves for 1D8 antibodies, obtained by biolayer interferometry. Biosensors were immobilized with m4-1BB and associated with 2 and 4 nM of analyte antibody. Duplicate biosensors (not shown) showed highly similar responses and contributed to the fitting curves. (B) The binding to 4-1BB on the cell surface of stimulated mouse CD8a$^+$ T cells measured by FACS. (C-E) Costimulatory activity of anti-4-1BB antibodies. Mouse CD8a$^+$ T cells were stimulated with immobilized anti-CD3 mAb in the presence of m4-1BBL, 1D8$^{N5}$, 1D8$^{N18}$ or 1D8 IgG, and proliferation (C), and secretion of IFNγ (D) were measured after 48 hours, and cell viability (E) after 72 hours. Data are reported as fold change relative to the values obtained from anti-CD3 mAb stimulated CD8a$^+$ T cells. Rat IgG$_{2a}$ and MFE-23$^{N18}$ were used as controls. Results are expressed as a mean±SD (n=3) from 1 of at least 3 separate experiments. Significance was measured by unpaired Student's t test; *P≤0.05, **P≤0.01. (F) RICS analyses performed in living HEK293 $^{m4-1BB}$-S cells at regions containing clusters formed upon 1D8 IgG or 1D8$^{N18}$ addition, and at regions where clusters where not present (insert and zoomed-in region ii, and i, respectively). Representative maximum intensity projection maps showing the RICS analyzed regions of interest. Values in the zoomed-in regions show the diffusion coefficient of bound antibody. The color heat map indicates in blueish tones the lower intensity, and in redder tones the higher intensity. (G) To the right-hand side of the inserts, the statistical analysis of the is represented in form of a whisker and box plot obtained from 5-7 independent live cell experiments and 3-5 different regions of interest per cell (N-CR, non-clustered region; CR, clustered region).
Figure 2:
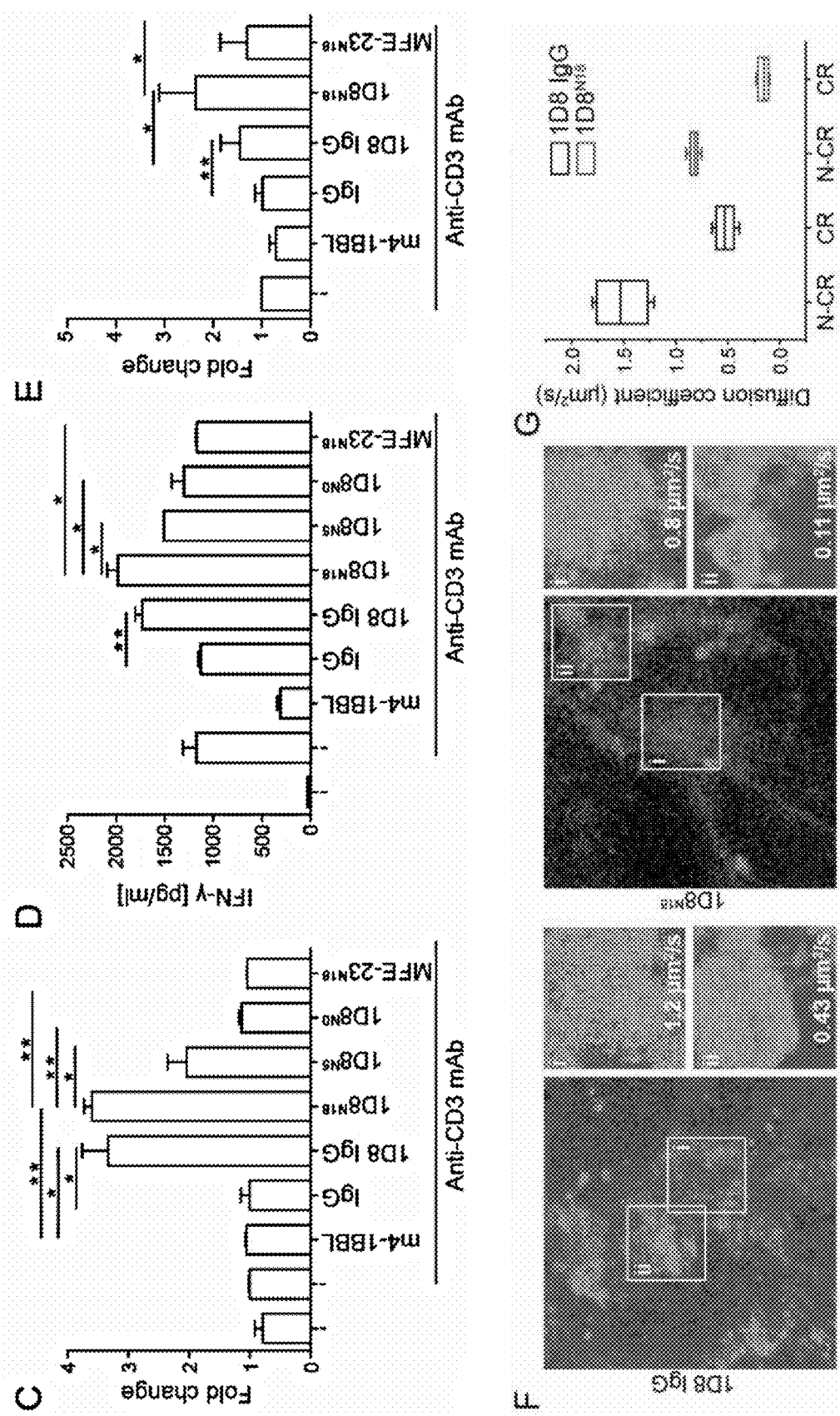
Figure 8B:
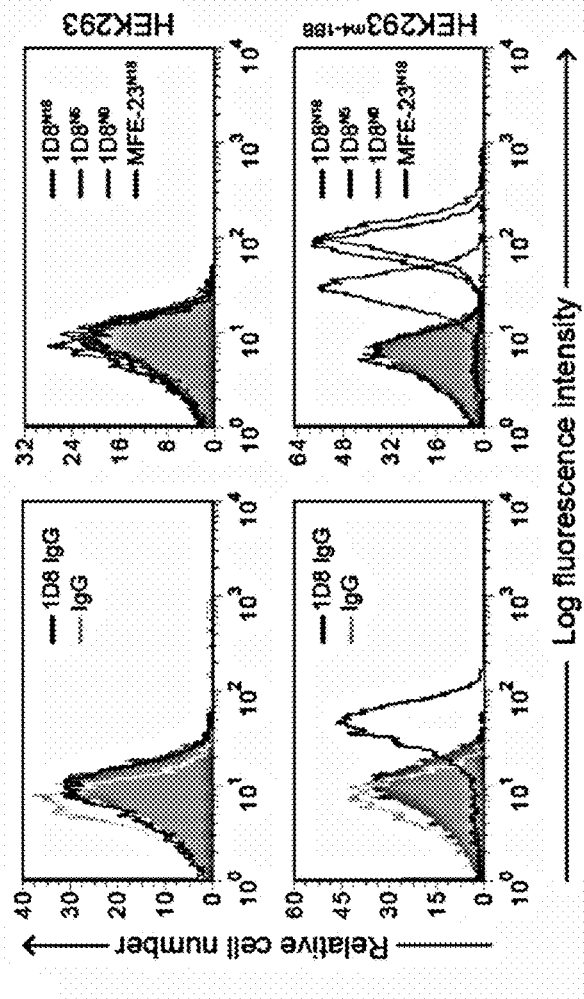
FIG. 8. (A) Reducing SDS-PAGE of the purified 1D8$^{N18}$, 1D8$^{N5}$ and 1D8$^{N0}$ and the 1D8 IgG. (B) Functional characterization of the 1D8$^{N18}$, 1D8$^{N5}$ and 1D8$^{N0}$ by FACS on m4-1BB-negative HEK293 cells and on m4-1BB-positive HEK293$^{m4-1BB}$ cells. The 1D8 IgG and the MFE-23$^{N18}$ were used as controls. The y-axis shows the number of cells and the x-axis represents the intensity of fluorescence, expressed on a logarithmic scale. One representative experiment out of three independent experiments is shown. (C) 1D8 IgG outcompete binding of 1D8$^{N5}$ and 1D8$^{N18}$ to activated T cells. CD3$^+$ T cells were gated and binding of 1D8$^{N5}$, 1D8$^{N18}$ and 1D8 IgG to CD137 (4-1BB) was determined by FACS. Blockage of 1D8$^{N5}$ and 1D8$^{N18}$ binding by preincubation with 1D8 IgG is shown. T cell staining with anti-CD8 mAb was also performed to discriminate between CD4 and CD8 T cells.
Figure 8A:
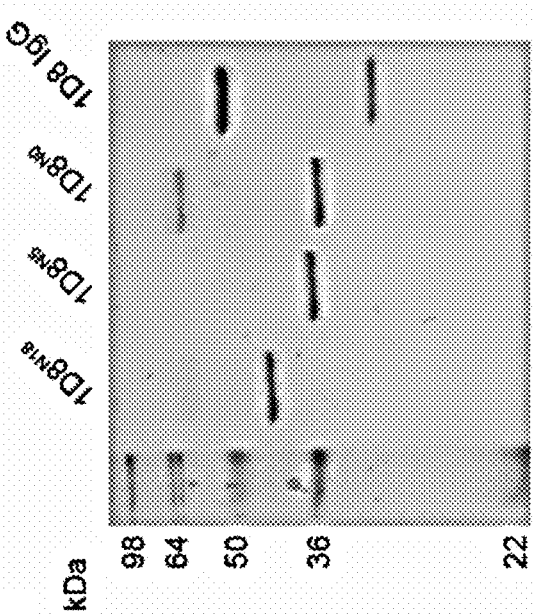
Figure 8C:
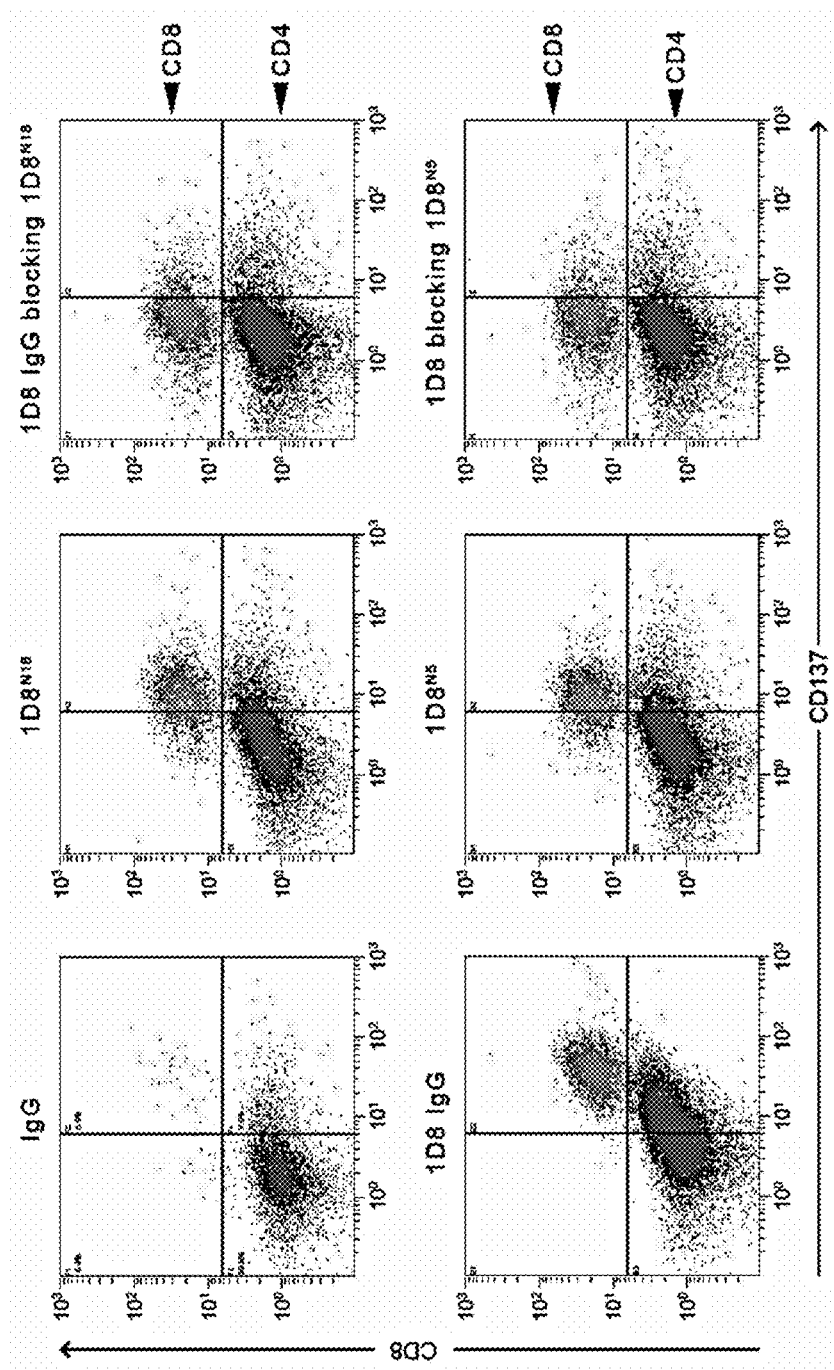

The three 4-1BB-specific trimerbodies were produced in stably transfected HEK293 cells and purified by IMAC, with a yield of roughly 1 mg/L of conditioned medium (FIG. 8A). Their binding kinetics were then studied using BLI. While all 1D8 antibodies showed low picomolar-range K$_D$ towards m4-1BB immobilized on biosensors, the 1D8$^N$ trimerbodies were found to dissociate at approximately half the rate of the parental 1D8 mAb (FIG. 2A). This indicates that the 1D8$^N$ trimerbodies are in fact functionally trivalent, and therefore have a higher functional affinity than the bivalent 1D8 IgG. Furthermore, 1D8$^{N18}$, 1D8$^{N5}$, and 1D8$^{N0}$ showed extremely similar kinetic rate constants, indicating that none of the linker length variations structurally compromise the 1D8 scFv or sterically hinder its access to antigen. The ability of 1D8$^N$ trimerbodies to detect 4-1BB in a cellular context was studied by flow cytometry. All 1D8$^N$ trimerbodies bound to HEK293 cells transfected to express murine 4-1BB on their cell surface (HEK293$^{m4-1BB}$), but not to untransfected HEK293 cells (FIG. 8B). The binding of 1D8$^{N0}$ to HEK293$^{m4-1BB}$ cells was less efficient than that of the 1D8$^{N5}$ and 1D8$^{N18}$ (FIG. 8B). 1D8$^{N5}$, 1D8$^{N18}$, and 1D8 IgG all bound to activated mouse CD8+T cells, but did not bind the unstimulated T cells (FIG. 2B). The binding of 1D8$^{N5}$ and 1D8$^{N18}$ was competitively inhibited by 1D8 IgG (FIG. 8C). These results show that the 1D8$^N$ trimerbodies retain the ability to bind to endogenous murine 4-1BB.

Figure 9:
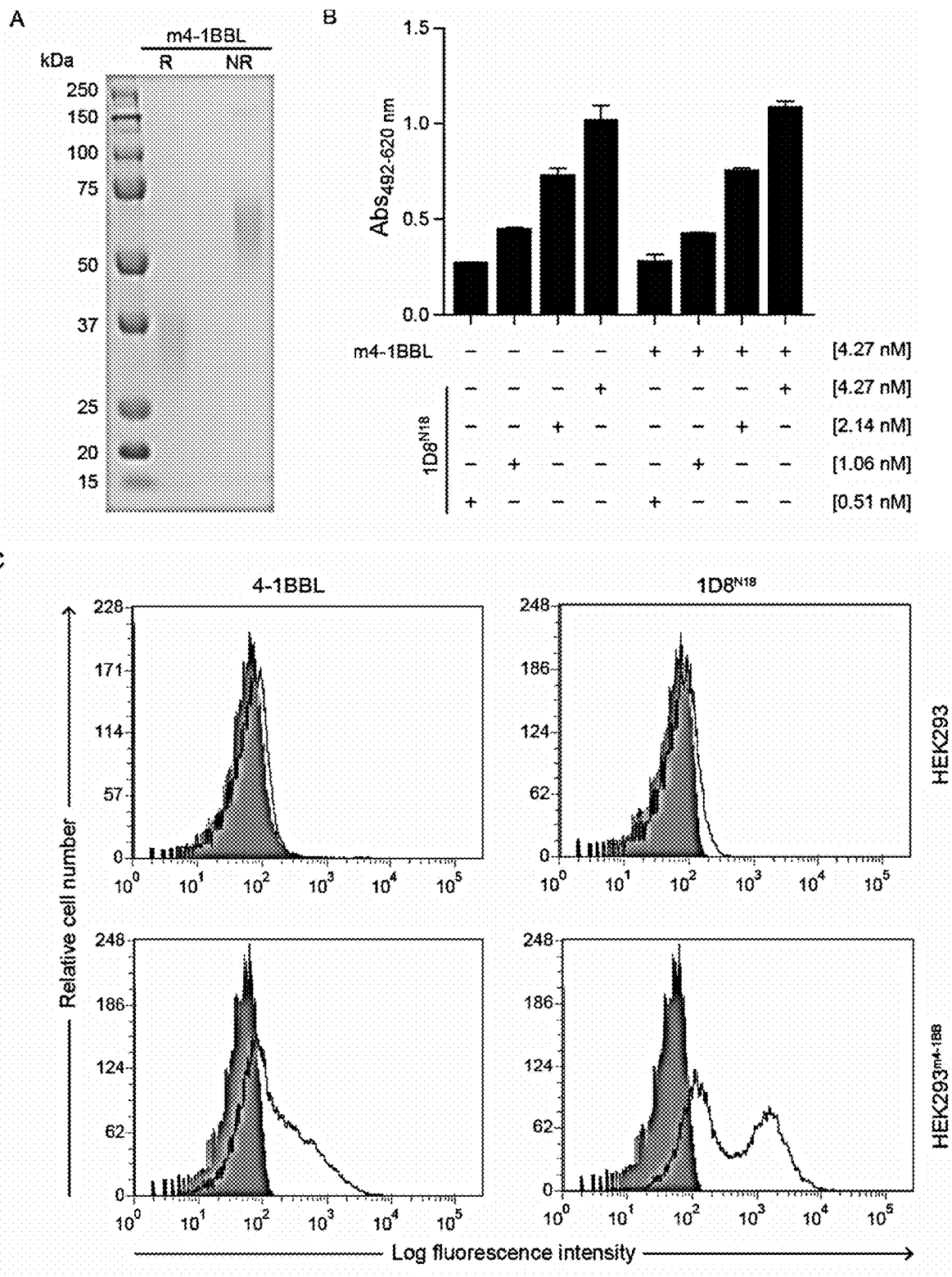
FIG. 9. (A) Coomassie-stained SDS-PAGE of purified recombinant mouse 4-1BBL in both reducing and non-reducing conditions. (B) Functional characterization of the m4-1BBL by FACS. The 1D8$^{N18}$ was used as control. The y-axis shows the number of cells and the x-axis represents the intensity of fluorescence, expressed on a logarithmic scale. One representative experiment out of three independent experiments is shown. (C) The functional ability of m4-1BBL to blockbinding of 1D8$^{N18}$ trimerbody to immobilized m4-1BB was measured in a competitive ELISA with fixed concentration of m4-1BBL and serial dilutions of 1D8$^{N18}$. The data shown are expressed as mean±SD of one representative experiment from a total of three.
Figure 10:
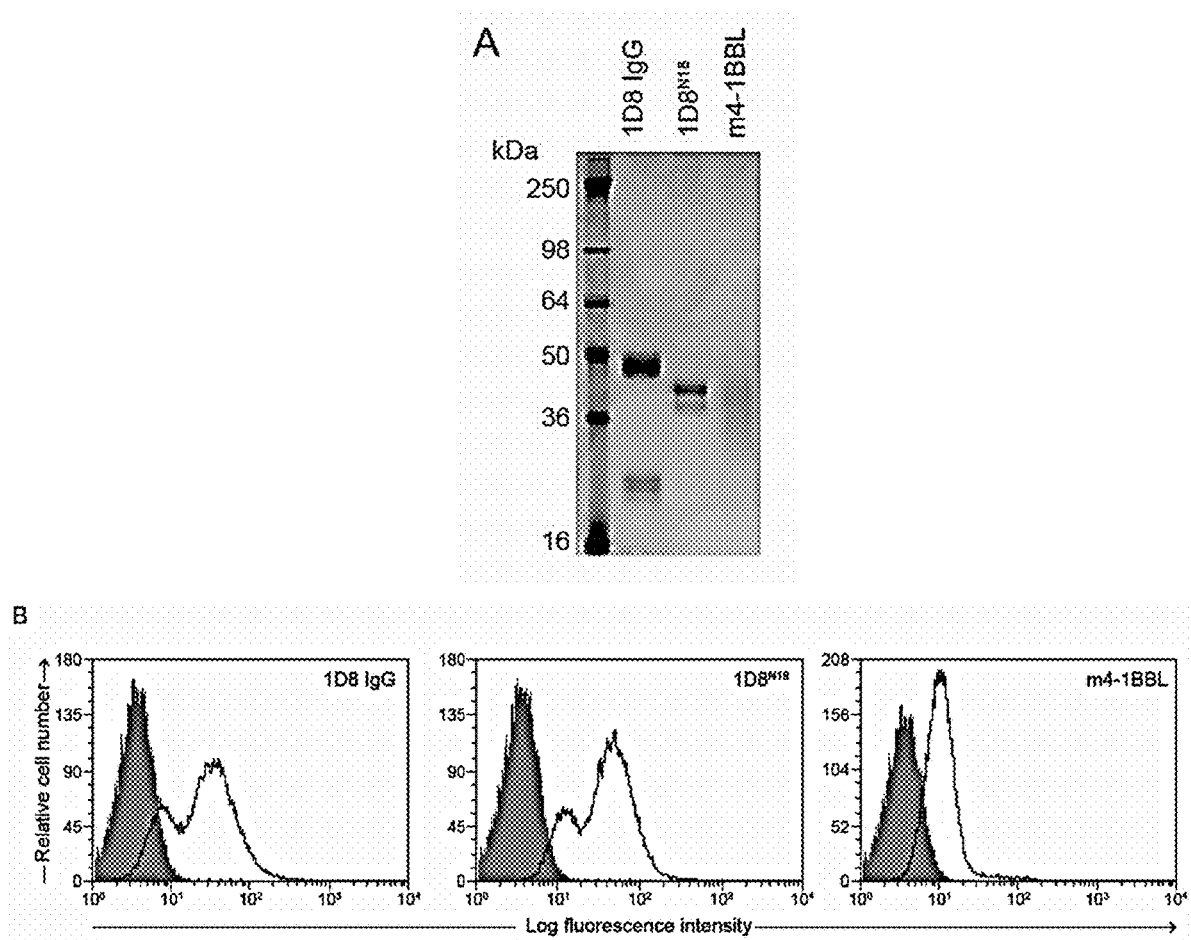
FIG. 10. Characterization of CF488A-labeled antibodies. (A) Coomassie-stained SDS-PAGE of CF488A-labeled 1D8 IgG, 1D8N$^{18}$ and m4-1BBL in reducing conditions. (B) Functional characterization of CF488A-labeled 1D8 IgG, 1D8N$^{18}$ and m4-1BBL by FACS on HEK293$^{m4-1BB}$ cells. The y-axis shows the number of cells and the x-axis represents the intensity of fluorescence, expressed on a logarithmic scale. One representative experiment out of three independent experiments is shown.
Figure 11:
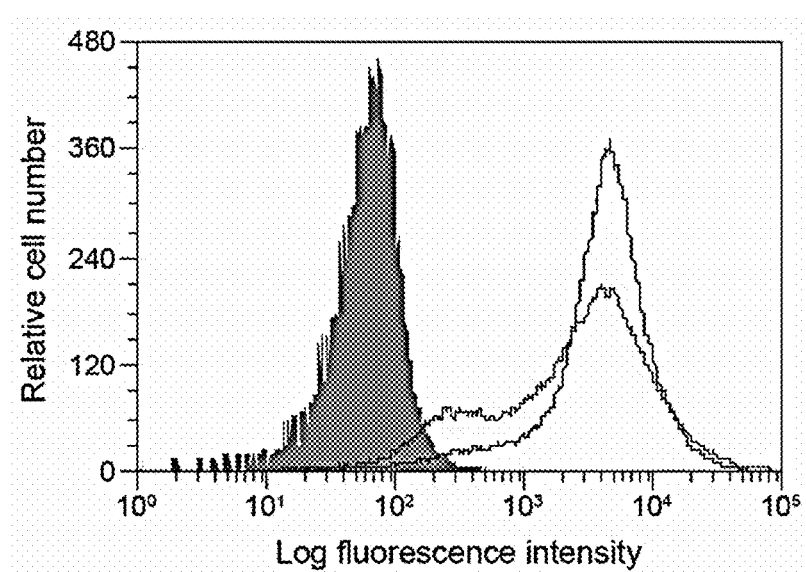
FIG. 11. FACS analysis of HEK-293 cells expressing m4-1BB. Expression profile of original HEK293$^{m4-1BB}$ cells (pre-sorting) is shown in blue line, and sorted HEK293 cells expressing homogeneous levels of 4-1BB(HEK293$^{m4-1BB}$-S) is shown in black line. Cells incubated with PE-conjugated isotype control antibodies are shown as grey-filled histogram. The y-axis shows the number of cells and the x-axis represents the intensity of fluorescence, expressed on a logarithmic scale. One representative experiment out of three independent experiments is shown.
Figure 12:
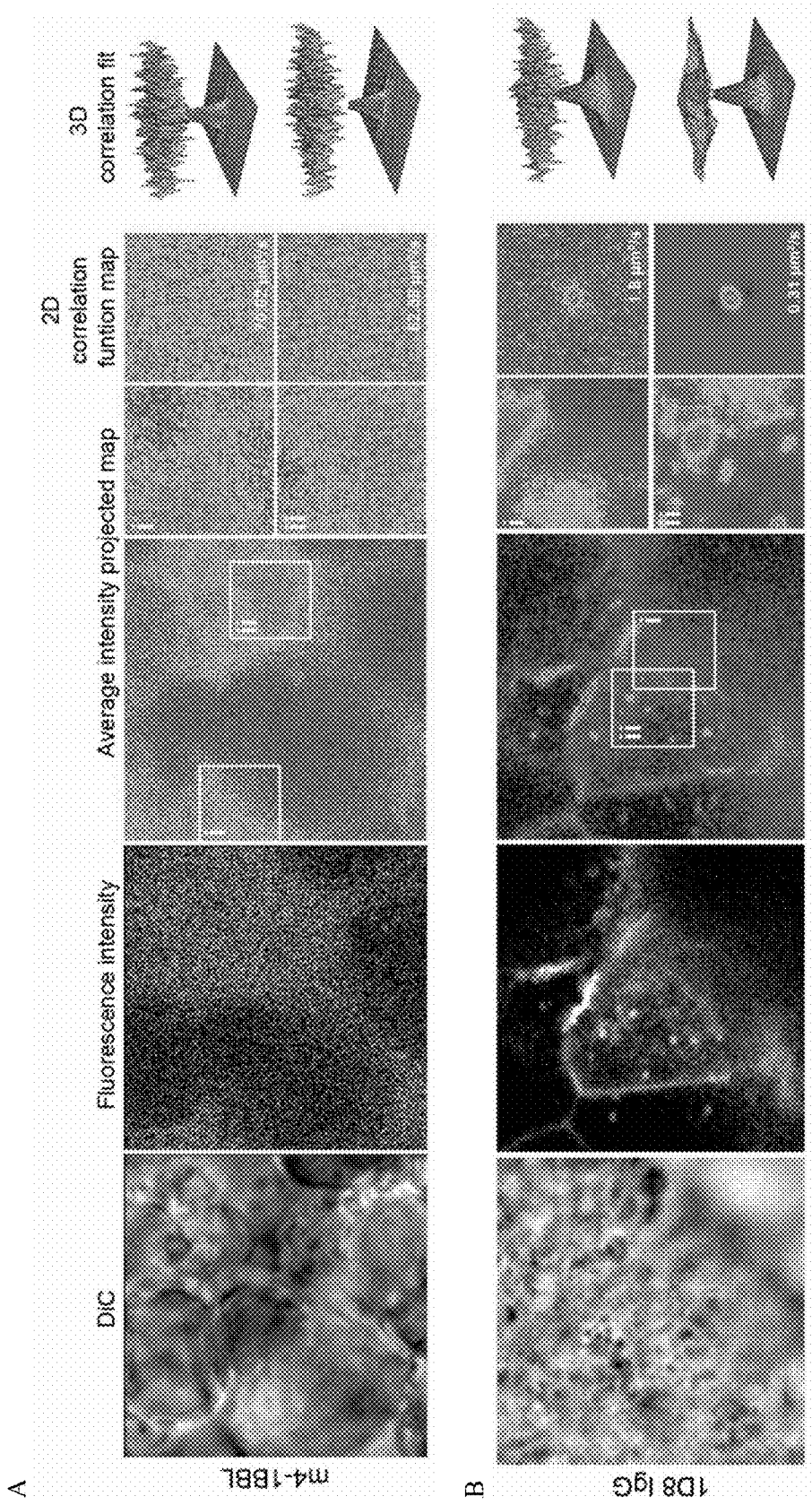
FIG. 12. Receptor diffusion coefficient in the plasma membrane is much lower upon clustering by 1D8$^{N18}$ trimerbody binding. RICS analyses show the molecular mobility at the plasma membrane of HEK-293$^{m4-1BB}$-S cells, after 100 ng/ml addition of either recombinant m4-1BBL (A), 1D8 IgG (B), or 1D8$^{N18}$ (C). From left to right: differential interference contrast images (DIC); fluorescence intensity images of the plasma membrane region investigated; average intensity projected map of the exact same region, showing 2 white solid squared highlighted regions (i and ii; where i region showed less or non-clustering than region ii); zoomed-out regions of interest i and ii; 2D autocorrelation function map and the respective diffusion coefficient obtained from the fitting; 3D correlation fit surface plot of the resulted fitting. Analyses were performed over 150 frames (~5 min, 2 seconds per frame). For scale purposes, the pixel size is 80.4 nm and the full frame image is 256×256 pixels, while the zoomed in regions are 64×64 pixels.
Figure 12:
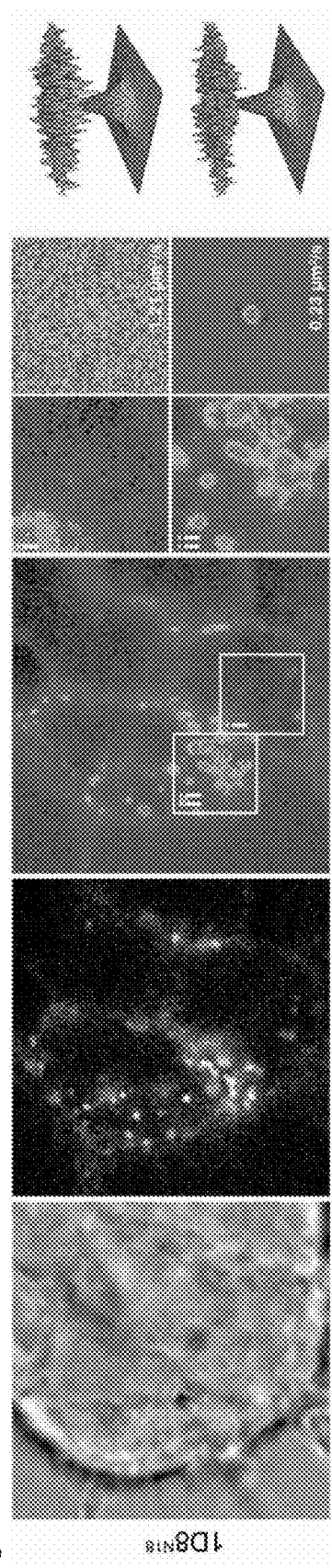

Next the costimulatory capability of the 1D8$^N$ trimerbodies by testing their effect on the proliferation, IFNγ secretion, and viability of mouse CD8a$^+$ T cells in the presence of a suboptimal dose of anti-CD3 mAb was investigated. 1D8 IgG and 1D8$^{N18}$ increased proliferation and IFNγ similarly to each other, and were significantly more potent than 1D8$^{N5}$ and 1D8$^{N0}$ (FIGS. 2C and D). After 72 hours a statistically significant increased viability of CD8+ T cells stimulated with 1D8 IgG and 1D8$^{N18}$ was observed. Furthermore, 1D8$^{N18}$ was significantly more potent than 1D8 IgG (FIG. 2E). The recombinant soluble mouse 4-1BBL (m4-1BBL) was essentially inactive (FIG. 2C-E). The m4-1BBL migrates at approximately 40 kDa in reducing conditions and at approximately 70 kDa in non-reducing conditions, compatible with a trimer (FIG. 9A). The binding to m4-1BB expressed on the cell surface was less efficient than the 1D8$^{N18}$ (FIG. 9B), and competition ELISA demonstrated that m4-1BBL and 1D8$^{N18}$ recognize different regions of the m4-1BB (FIG. 9C). Next, it was investigated the spatiotemporal distribution and dynamics of the interactions between cell surface m4-1BB and CF488A-labeled m4-1BBL, 1D8 IgG or 1D8$^{N18}$ (FIG. 10) in living HEK293$^{m4-1BB}$-S cells displaying homogenous expression of the receptor (FIG. 11). Employing RICS, it was observed and quantified receptor clustering and its molecular mobility upon binding. It was observed that m4-1BBL does not induce receptor clustering, but rather internalization of the receptor into the cytoplasm (≈70 μm$^2$/sec) (FIG. 12A). In contrast, both 1D8 IgG and 1D8$^{N18}$ induce cluster formation, reducing the lateral mobility drastically at the plasma membrane upon binding, from ≈1.5 to 0.35, and from ≈1.0 to 0.15 μm$^2$/sec, respectively (FIGS. 2F and 12B and C). 1D8$^{N18}$ formed larger and more numerous membrane clusters, which consequently impeded the lateral diffusion to a greater degree, which indicates more effective and extensive crosslinking (FIG. 2G).

Figure 13:
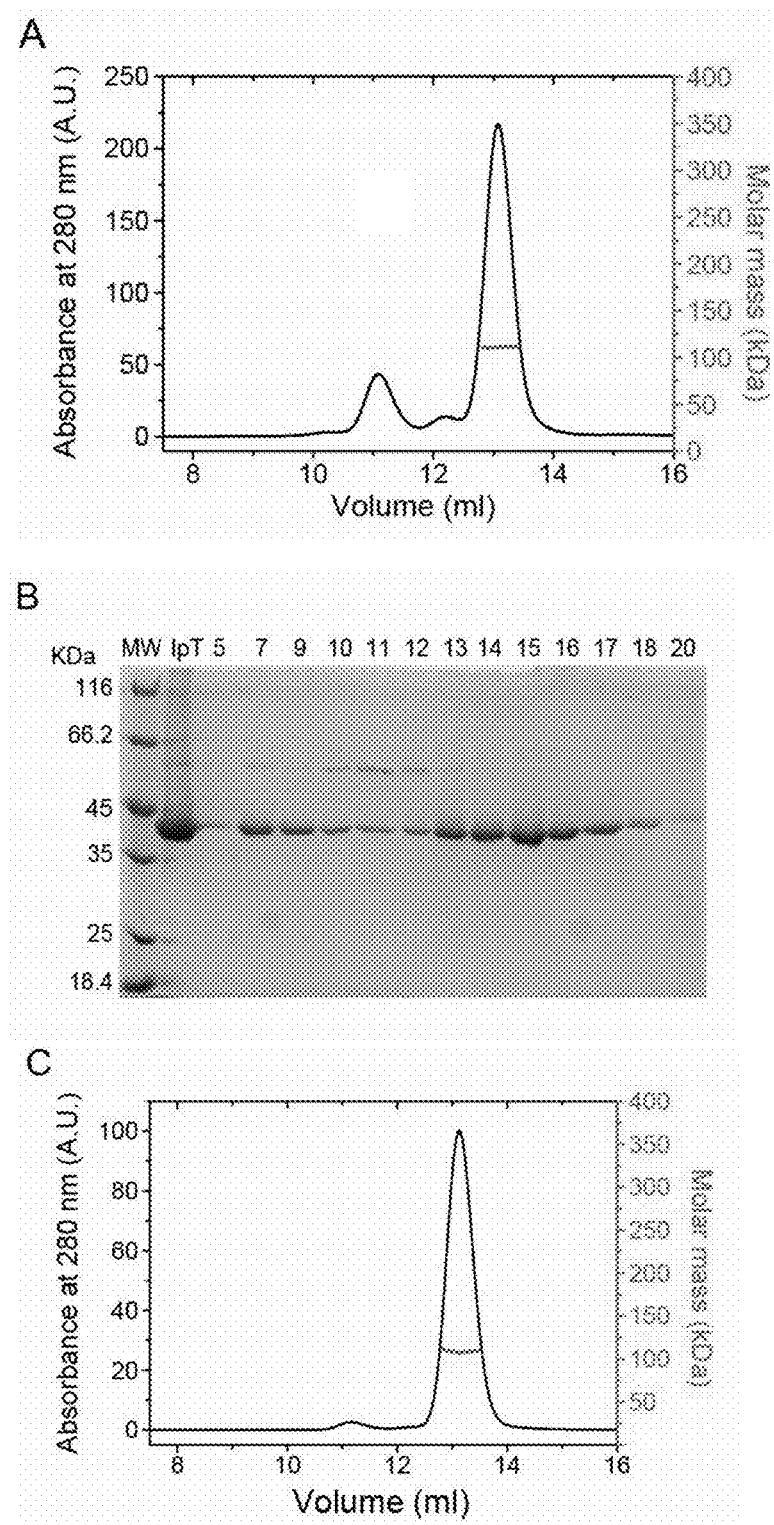
FIG. 13. Structural characterization of the 1D8$^{N18}$trimerbody. (A) SEC-MALS. The black line corresponds to the UV absorbance (left axis) and the red line to the measured molar mass (right axis). From left to right the peaks correspond to hexamers (16% of the total intensity), an unknown minor impurity (3%), and trimers (81%). (B) SDS-PAGE analysis of the separation of 1D8$^{N18}$ hexamers and trimers by semipreparative SEC. MW are the molecular weight markers, IpT is the material injected in the column, and the numbers correspond to the chromatogram fractions. (C) SEC-MALS analysis of fraction 14 of the 1D8$^{N18}$ SEC chromatogram analyzed in B. The left axis corresponds to the UV absorbance and the right axis to the measured molar mass. The peak corresponding to the trimer accounts for 97% of the total intensity.

As 1D8$^{N18}$ was superior in co-stimulating T cells in vitro than 1D8 IgG, 1D8$^{N5}$, and 1D8$^{N0}$, it was chosen to focus on it in subsequent studies. SEC-MALS was used to investigate the oligomeric state of 1D8$^{N18}$. It eluted as a major symmetric peak with a mass of 112 kDa (FIG. 13A), close to the predicted 110.1 kDa of 1D8$^{N18}$ without signal sequence (Mass Spectrometry by MALDI confirmed its absence). Two minor peaks were also detected, the smallest being a protein impurity, as seen by SDS-PAGE (FIG. 13B). The other peak migrates in SDS-PAGE as 1D8$^{N18}$, but has a native mass of 244 kDa, probably corresponding to trimer-dimers. The two species can be separated by SEC, but reinjection of the major peak gives another minor trimer-dimer peak (FIG. 13C), indicating an equilibrium where the trimeric species are predominant (85 and 97% at 1.0 and 0.26 g/L, respectively).

Design of an EGFR-Targeted 4-1BB-Agonist Trimerbody

Figure 14:
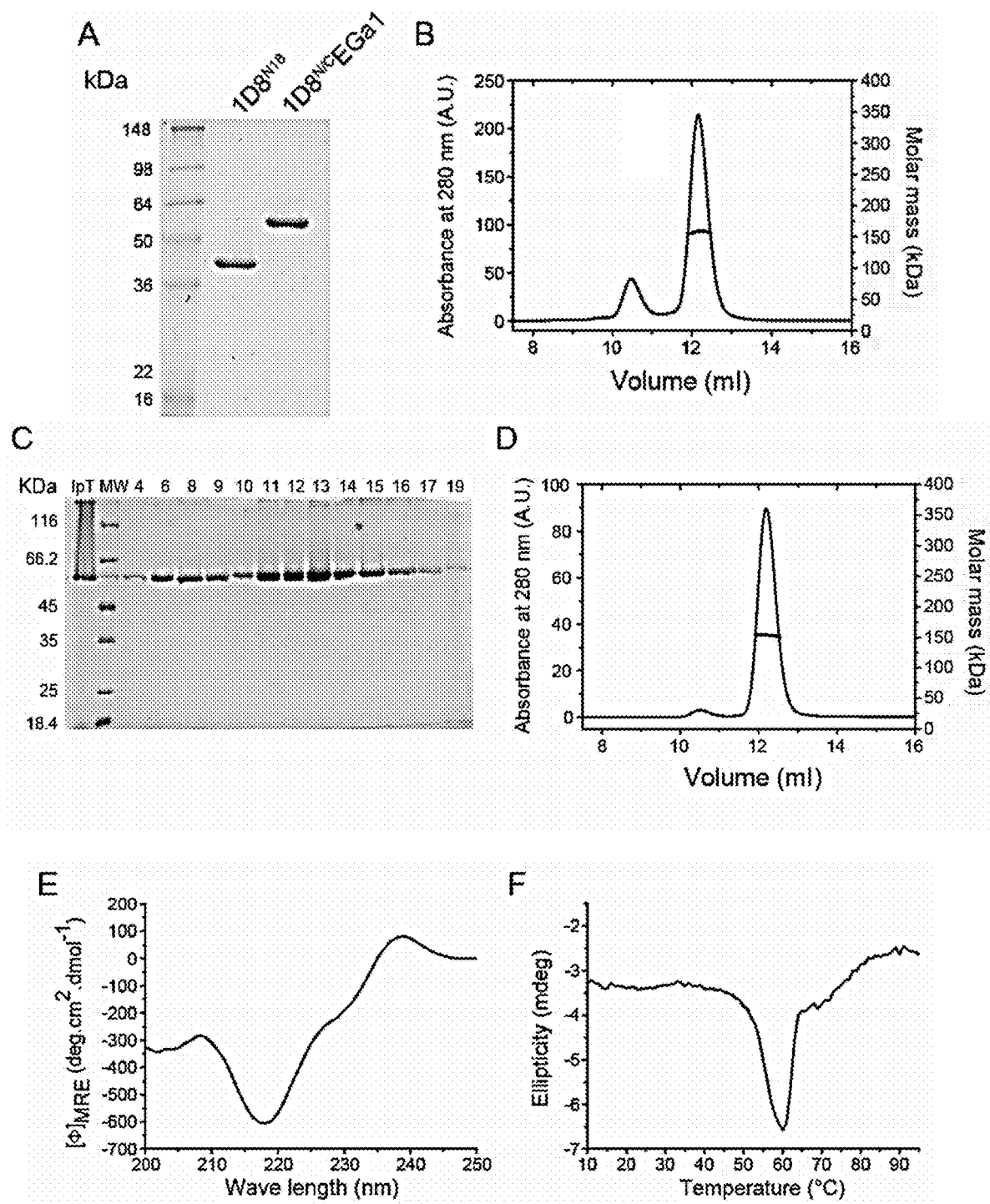
FIG. 14. Structural characterization of the 1D8$^{N/C}$EGa1 trimerbody. (A) Reducing SDS-PAGE of purified 1D8$^{N18}$ and 1D8$^{N/C}$EGa1. (B) SEC-MALS analysis 1D8$^{N/C}$EGa1 with the indicated molecular masses measured at the center of the chromatography peaks. The left axis corresponds to the UV absorbance and the right axis to the measured molar mass. From left to right the peaks correspond to hexamers (16% of the total intensity), and trimers (84%). (C) SDS-PAGE analysis of the separation of 1D8$^{N/C}$EGa1 hexamers and trimers by semipreparative SEC. MW are the molecular weight markers, IpT the material injected in the column, and the numbers correspond to the chromatogram fractions. (D) SEC-MALS analysis of fraction 12 of the 1D8$^{N/C}$EGa1 SEC chromatogram analyzed in B. The left axis corresponds to the UV absorbance and the right axis to the measured molar mass. The peak corresponding to the trimer accounts for 97% of the total intensity. Circular dichroism spectrum (E) and (irreversible) thermal denaturation (F) of 1D8$^{N/C}$EGa1 measured by the change in circular dicroism ellipticity at 218 nm.

Afterwards a bispecific trimerbody was made by fusing the anti-human EGFR single-domain antibody (V$_{HH}$; clone EGa1) (Schmitz K R, et al. *Structure*. 2013; 21:1214-1224) to the C-terminus of 1D8$^{N18}$ through a 17-residue-long linker giving the 1D8$^{N/C}$EGa1 trimerbody (FIG. 1C). The construct was designed with a strep-Flag-tag at the N-terminus of the 1D8 scFv. The 1D8$^{N/C}$EGa1 was produced in stably transfected HEK293 cells (5 mg/L), followed by Strep-Tactin® affinity chromatography. SDS-PAGE analysis, under reducing conditions, of the purified protein revealed a single band with a molecular mass of 55.6 kDa consistent with the calculated from its amino acid sequence (52.9 kDa without the signal sequence; FIG. 14A). The oligomeric state of the purified 1D8$^{N/C}$EGa1 was examined by SEC-MALS measurements. The sample eluted as a major symmetric peak with a mass of 160 kDa, close to the calculated mass for a trimer without the signal sequence (158.7 kDa), and a minor peak with a mass of 309 kDa (FIG. 14B), which is indistinguishable from 1D8$^{N/C}$EGa1 by SDS- PAGE (FIG. 14C). These results again indicate the formation of a minor population of dimers of trimers, as seen for $1D8^{N18}$. The two oligomeric species can be separated by SEC, and reinjection of the isolated major peak of trimers yields only a very minor peak at the elution volume of the trimer-dimers (FIG. 14D). $1D8^{N/C}EGa1$ performed very similarly to $1D8^{N18}$ in CD and cooperative thermal denaturation studies (FIG. 14E-F). SAXS showed that $1D8^{N/C}EGa1$ contains the same trimerized $TIE^{XVIII}$ core seen for $1D8^{N18}$.

Figure 3A:
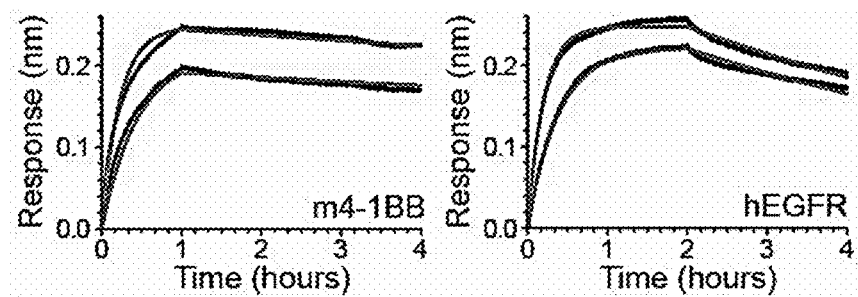
FIG. 3. Characterization of the EGFR-targeted 4-1BB-agonist trimerbody. (A) Sensorgrams (black curves) and the results of fitting to a 1:1 model (red curves) obtained using biolayer interferometry for the interaction of 1D8$^{N/C}$EGa1 (2 and 4 nM) with immobilized m4-1BB, and the interaction of 1D8$^{N/C}$EGa1 (0.5 and 1 nM) with immobilized hEGFR. Association and dissociation were each measured for two hours. (B) Simultaneous binding to both m4-1BB and hEGFR was demonstrated for 1D8$^{N/C}$EGa1, but not 1D8$^{N18}$. Biosensors were coated with m4-1BB, after which 4 nM of 1D8$^{N/C}$EGa1 (black curves) or 1D8$^{N18}$ (blue curves) were added. After allowing the trimerbodies to associate with m4-1BB for one hour, the biosensors were then moved into wells containing buffer only or 10 nM hEGFR. (C) The binding of anti-4-1BB antibodies to m4-1BB on the cell surface of stimulated mouse CD8a$^+$ T cells measured by FACS. Purified mouse CD8a$^+$ T cells were plated with immobilized anti-CD3 mAb and hEGFR or BSA and stimulated for 48 hours in the presence of 1D8$^{N18}$, 1D8$^{N/C}$EGa1 or 1D8 IgG. Proliferation was measured with Cell Titer-Glo luminescent assay (D) and IFNγ secretion was determined by ELISA (E). EGFR-negative 3T3 cells or EGFR-positive 3T3$^{hEGFR}$ cells were cocultured with mouse CD8a$^+$ T cells in the presence of anti-CD3 mAb and 1D8$^{N18}$, 1D8$^{N/C}$EGa1 or 1D8 IgG, and IFNγ secretion analyzed after 48 hours (F), and cell viability after 72 hours (G). Data are represented as fold change relative to the values obtained from anti-CD3 mAb stimulated cells. Rat IgG$_{2a}$ and MFE-23$^{N18}$ were used as negative controls. Results are expressed as a mean±SD (n=3) from 1 of at least 3 separate experiments. Significance was measured by unpaired Student's t test; *P≤0.05, P≤0.01, *P≤0.001.
Figure 3B:
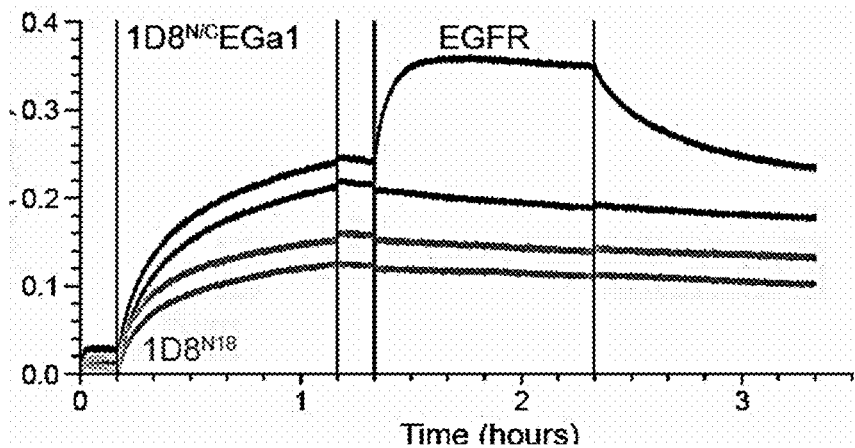
Figure 3C:
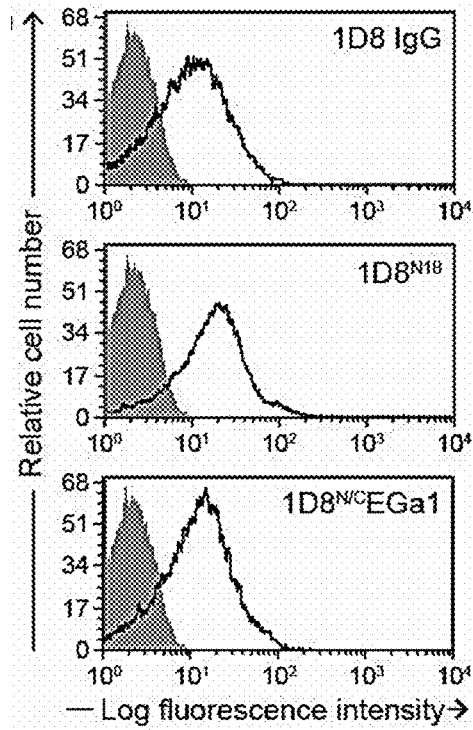
Figure 15:
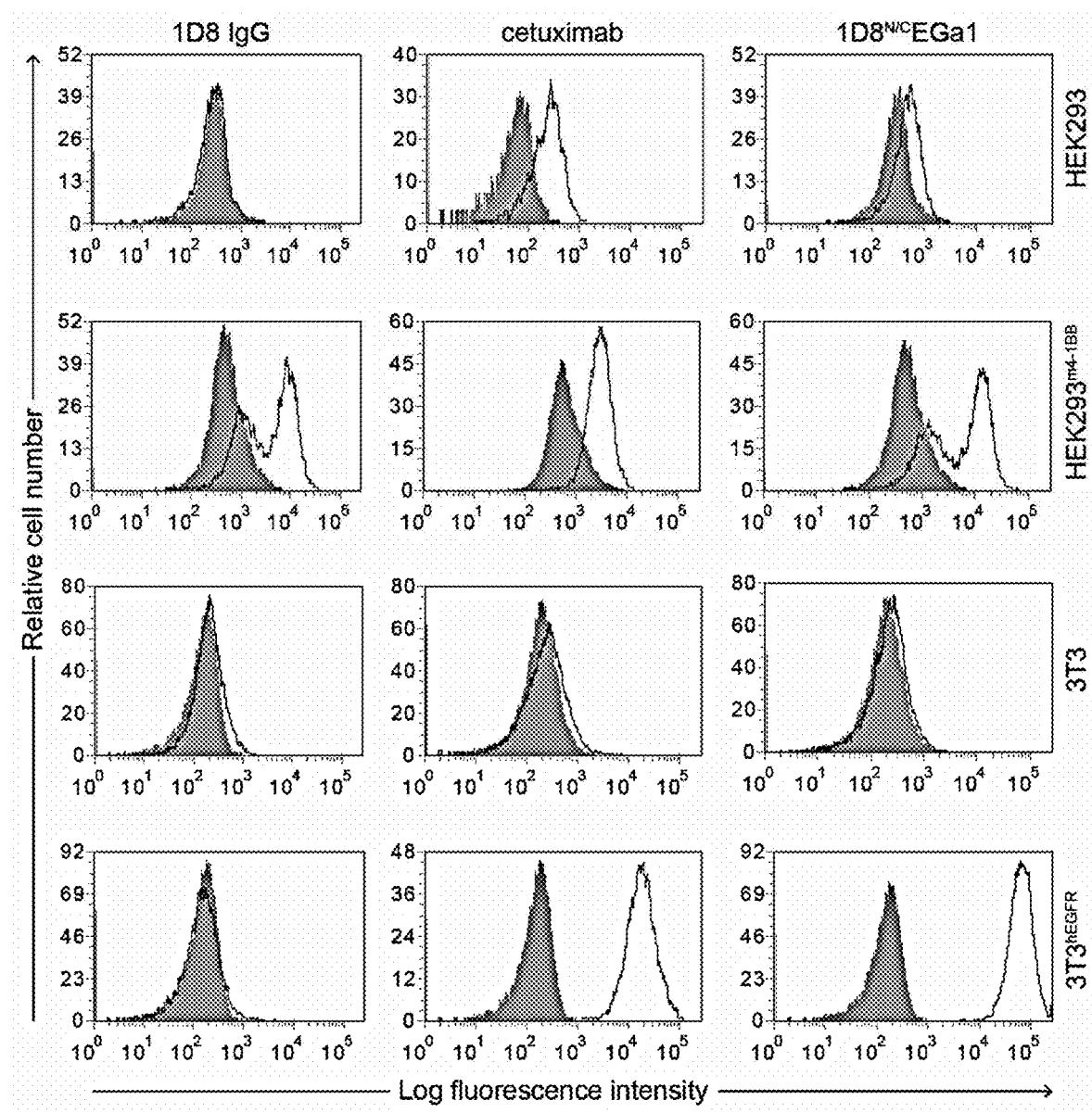
FIG. 15. Functional characterization of the 1D8$^{N/C}$EGa1 trimerbody by FACS. The 1D8 IgG and cetuximab were used as controls. The y-axis shows the relative number of cells and the x-axis represents the intensity of fluorescence, expressed on a logarithmic scale. One representative experiment out of three independent experiments is shown.
Figure 16:
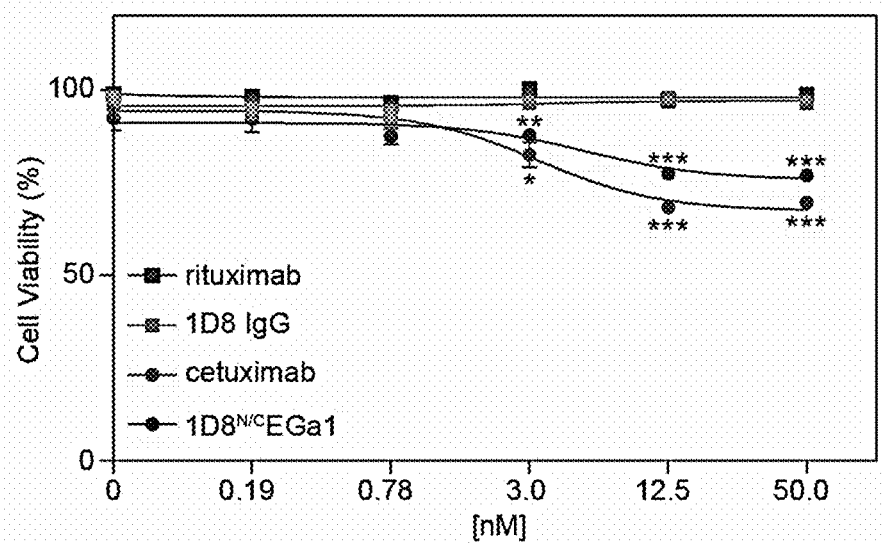
FIG. 16. Effect of $1D8^{N/C}EGa1$ trimerbody on EGFR-mediated signaling. (A) Inhibition of A431 cell proliferation. The cells were treated with the indicated doses of $1D8^{N/C}EGa1$, 1D8 IgG, cetuximab (positive control) or rituximab (negative control). Viable cells were measured in triplicates after 72 hours of treatment and plotted relative to untreated controls. Results are expressed as a mean±SD (n=3). Significance was measured by unpaired Student's t test; *P≤0.05, P≤0.01, *P≤0.001 (green asterisks, comparison of $1D8^{N/C}EGa1$ with rituximab; in red, comparison of cetuximab with rituximab). (B) Inhibition of EGFR phosphorylation. Cells were pre-incubated with 50 nM of each antibody 4 hours prior to stimulation for 5 minutes with EGF or vehicle. Phosphorylation status of EGFR was assessed by Western Blotting.
Figure 16:
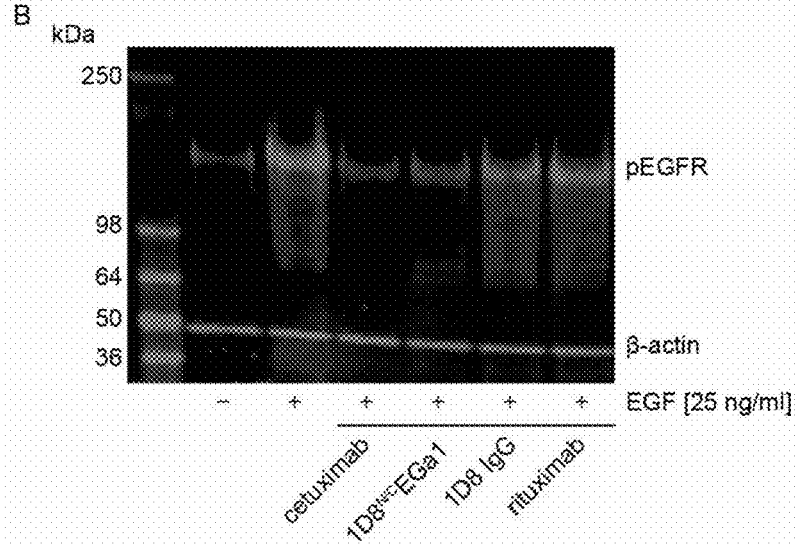

The functionality of the $1D8^{N/C}EGa1$ was demonstrated by BLI. The $1D8^{N/C}EGa1$ trimerbody has kinetic rate constants that are very similar to the $1D8^N$ trimerbodies in its interaction with immobilized m4-1BB (FIG. 3A). The binding kinetics of $1D8^{N/C}EGa1$ to immobilized human EGFR-Fc chimera (hEGFR) were also investigated by BLI, and the interaction was found to also have a low picomolar $K_D$ (FIG. 3A). Previous comparison of $EGa1V_{HH}$ and EGa1-derived N-trimerbody ($EGa1^N$) kinetics showed a low nanomolar $K_D$ for the EGa1 $V_{HH}$ and a low picomolar $K_D$ for $EGa1^N$. These kinetics are easily distinguishable, and $1D8^{N/C}EGa1$ showed comparable kinetics to $EGa1^N$, indicating that it trivalently binds hEGFR. The $1D8^{N/C}EGa1$ was found to be capable of binding immobilized m4-1BB and hEGFR simultaneously (FIG. 3B). This further demonstrates the bispecificity of $1D8^{N/C}EGa1$ and shows a lack of steric hindrance between its interactions with hEGFR and m-4-1BB. The ability of $1D8^{N/C}EGa1$ to detect its antigens as cell surface proteins was studied by flow cytometry. The $1D8^{N/C}EGa1$ trimerbody bound to HEK293 (EGFR+), to $HEK293^{m4-1BB}$ cells and to mouse 3T3 cells expressing human EGFR ($3T3^{hEGFR}$) but not to wild-type 3T3 cells (FIG. 15). Furthermore, $1D8^{N/C}EGa1$ bound to activated mouse $CD8a^+$ T cells as efficiently as the $1D8^{N18}$ (FIG. 3C). To further assess the multivalent binding of $1D8^{N/C}EGa1$, its capacity to inhibit proliferation and EGFR phosphorylation in A431 cells was studied. $1D8^{N/C}EGa1$ and cetuximab, an EGF-competitive inhibitor, but neither the anti-human CD20 rituximab nor 1D8 IgG, inhibited A431 proliferation, in a dose-dependent manner (FIG. 16A), and EGFR phosphorylation (FIG. 16B).

Figure 3D:
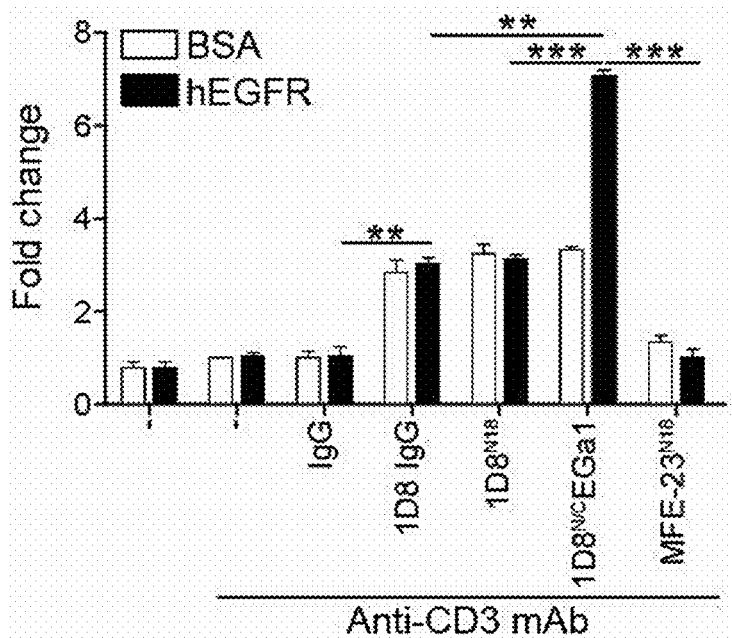
Figure 3E:
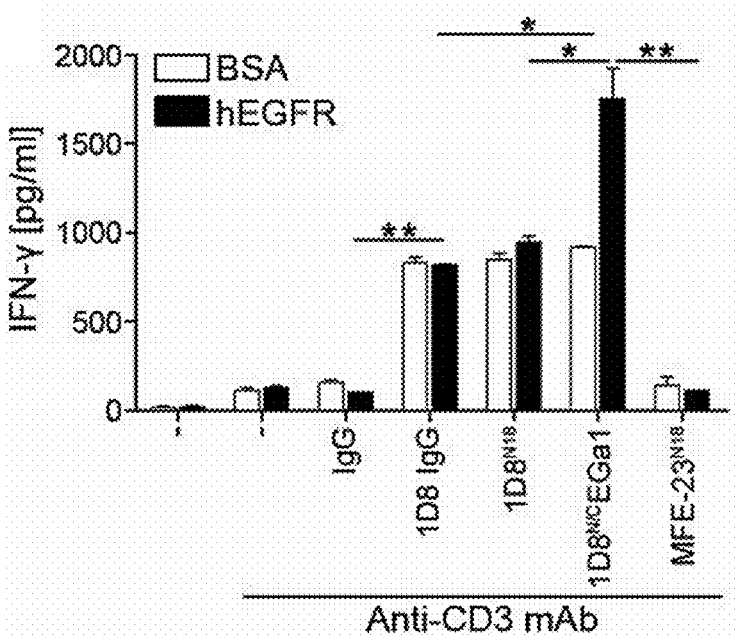
Figure 3F:
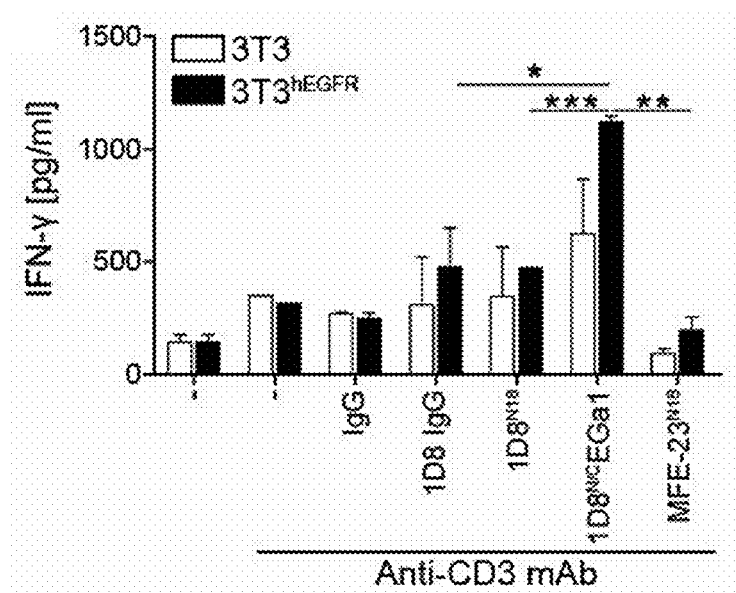
Figure 3G:
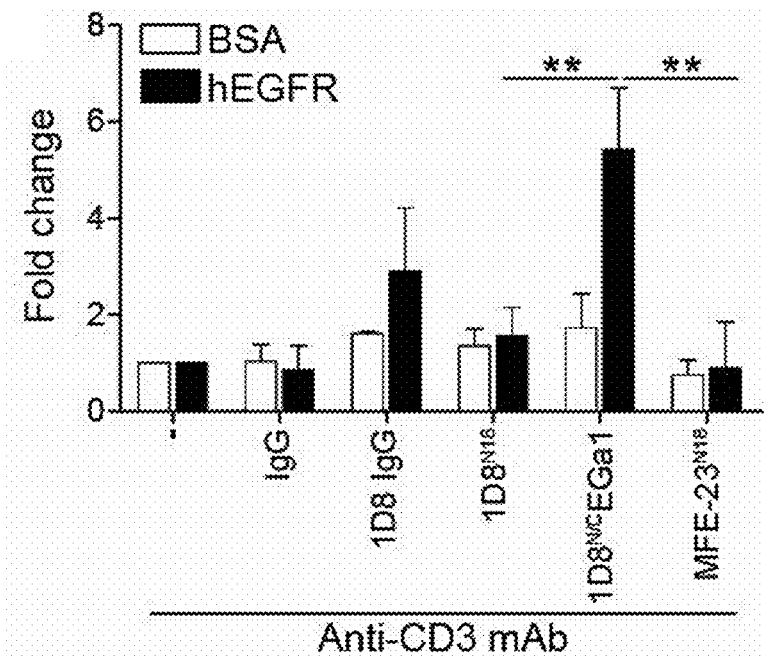

Next it was determined whether $1D8^{N/C}EGa1$ retained the baseline costimulatory capacity seen for $1D8^{N18}$, and whether this was improved by the crosslinking provided through EGa1's binding to EGFR. $CD8a^+$ T cells were stimulated with immobilized anti-CD3 mAb and the panel of costimulatory agents in solution, in the presence or absence of plastic-immobilized hEGFR. The $1D8^{N/C}EGa1$ had a costimulatory effect similar to $1D8^{N18}$ in the absence of hEGFR, but this was greatly enhanced when hEGFR was included (FIGS. 3D and E). This effect was then confirmed by co-culture assays using EGFR-negative and EGFR-positive target cells. The IFNγ levels were significantly higher when $CD8a^+$ T cells were cultured with $3T3^{hEGFR}$ in the presence of the $1D8^{N/C}EGa1$, as compared to the non-targeted 1D8 molecules (FIG. 3F). Next the effect EGFR-targeted 4-1BB costimulation on cell viability was investigated (FIG. 3G). After 72 hours a statistically significant increased viability of $CD8a^+$ T cells costimulated with $1D8^{N/C}EGa1$ in the presence of plastic-immobilized hEGFR was observed, compared to cells costimulated with 1D8 IgG and $1D8^{N18}$ (FIG. 3G).

Figure 4:
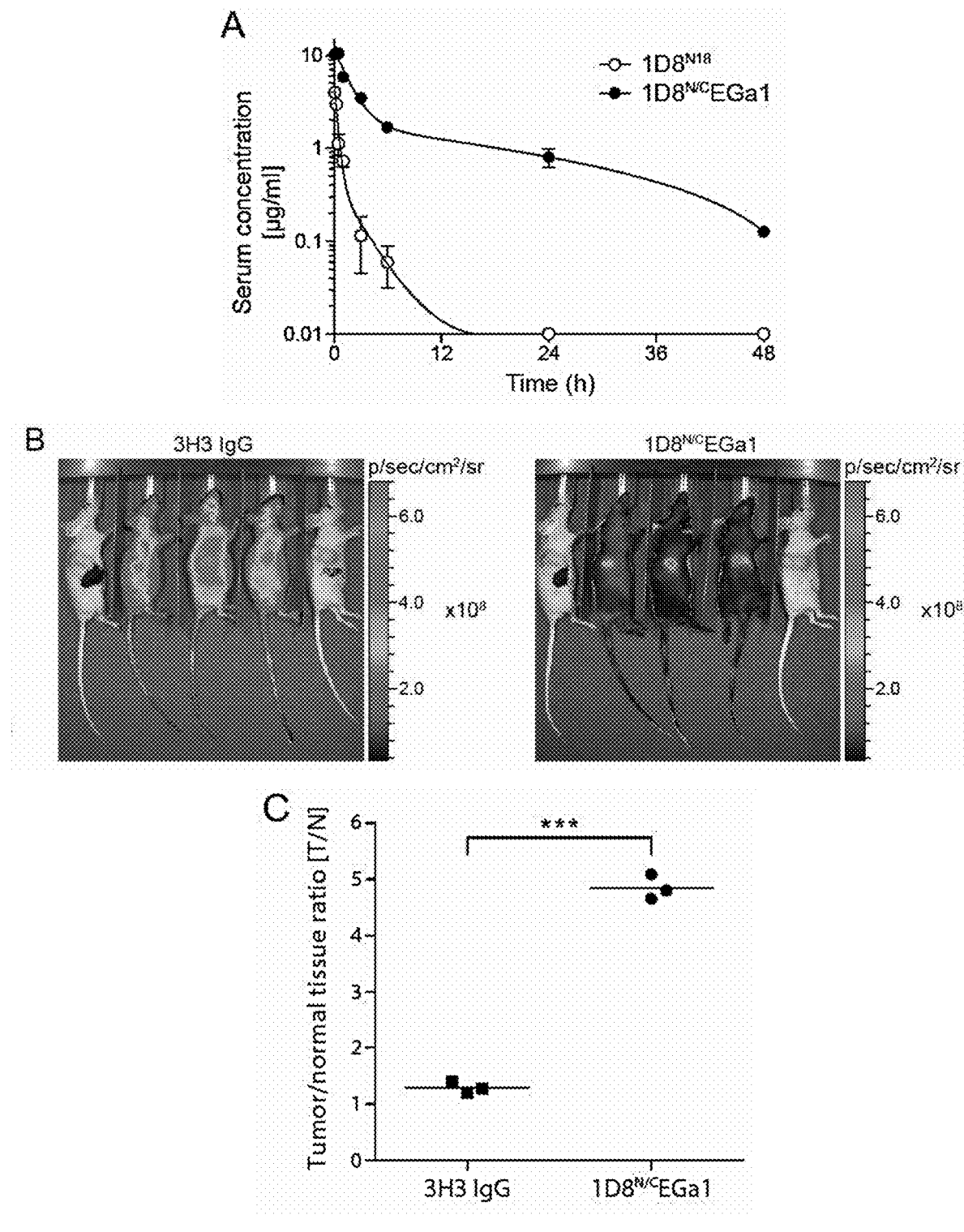
FIG. 4. Pharmacokinetic properties and tumor imaging of the EGFR-targeted 4-1BB-agonistic trimerbody. (A) Pharmacokinetic study after a single i.v. dose of 1D8$^{N18}$ or 1D8$^{N/C}$EGa1 (1 mg/Kg) in CD1-mice. Blood samples were collected at different time points and sera were analyzed for trimerbody concentration by ELISA. Data are presented as mean±SD (n=3 per time point). (B) In vivo fluorescence imaging of A431 tumor-bearing nude mice 24 hours after i.v. injection of PBS or 100 μg of CF647-labeled 3H3 IgG or 1D8$^{N/C}$EGa1. (C) Tumor to normal tissue (T/N) ratios were calculated for all the images. Regions of interest were drawn in the tumors and in normal tissues to measure the fluorescence intensity as photons per second per centimeter squared per steradian (p/s/cm$^2$/sr). Significance was measured by unpaired Student's t test; ***P≤0.001.
Figure 17:
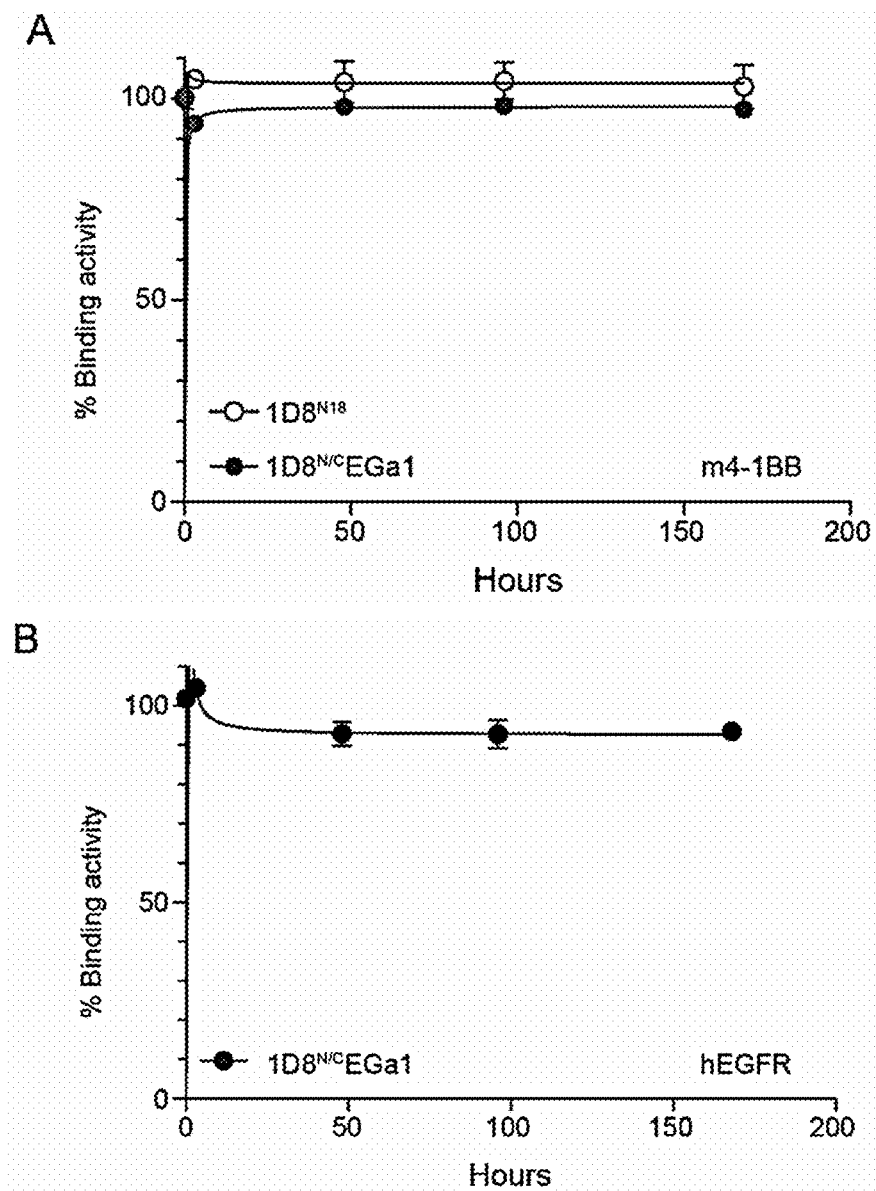
FIG. 17. Serum stability of purified $1D8^{N18}$ and $1D8^{N/C}EGa1$ trimerbodies. ELISA against plastic immobilized m4-1BB (A) or hEGFR (B) was performed after incubation at 37° C. for different time periods in human serum.
Figure 18:
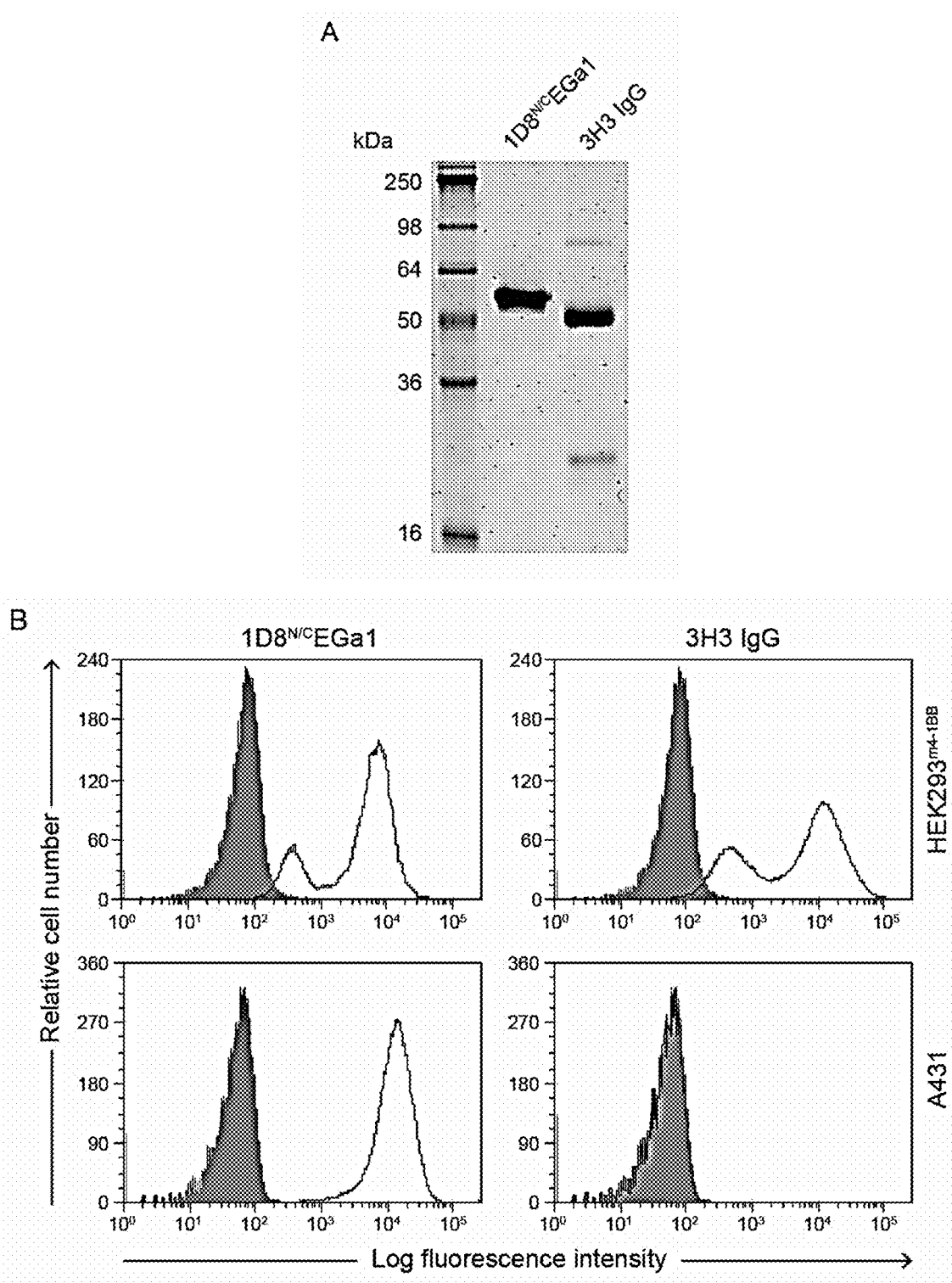
FIG. 18. $1D8^{N/C}EGa1$ trimerbody labeling for tumor localization studies (A) Coomassie stained SDS-PAGE gel in reducing conditions of CF647-labeled $1D8^{N/C}EGa1$ and 3H3 IgG. (B) Functional characterization of CF647-labeled $1D8^{N/C}EGa1$ and 3H3 IgG by FACS on HEK293$^{m4-1BB}$ and A341 cells. The y-axis shows the number of cells and the x-axis represents the intensity of fluorescence, expressed on a logarithmic scale. One representative experiment out of three independent experiments is shown.

The EGFR-Targeted 4-1BB-Agonistic Trimerbody Selectively Accumulated in EGFR-Positive Tumors In Vivo First, the serum stability of $1D8^{N18}$ and $1D8^{N/C}EGa1$ was studied, and no significant loss of 4-1BB- or EGFR-binding activity was detected after 7 days in mouse serum at 37° C. (FIGS. 17A and B). Pharmacokinetic studies were then performed in CD1 mice, which received a single intravenous injection of $1D8^{N18}$ or $1D8^{N/C}EGa1$. The plasma concentrations of active protein were determined by ELISA with immobilized m4-1BB. $1D8^{N/C}EGa1$ showed a prolonged circulation as compared to $1D8^{N18}$, with a circulatory half-life of 16.15 hours as opposed to 1.3 hours (FIG. 4A). For in vivo imaging, $1D8^{N/C}EGa1$ and the anti-4-1BB 3H3 mAb (Shuford W W, et al) were labeled with CF647. The CF647-labeled antibodies demonstrated a migration pattern similar to unconjugated antibodies, and specifically bound to cells expressing the cognate antigen/s (FIGS. 18A and B). Athymic nude mice bearing A431 human tumor xenografts subcutaneously implanted into the right flank were intravenously injected in the tail vein with CF647-labeled antibodies and imaged 24 hours later (FIG. 4B). $1D8^{N/C}EGa1$ showed high tumor localization with a tumor to normal tissue (T/N) ratio of 4.85±0.1266, as compared to that of 3H3 IgG (1.293±0.05812), which corresponds to little to no specific tumor accumulation (FIG. 4C).

Figure 19A:
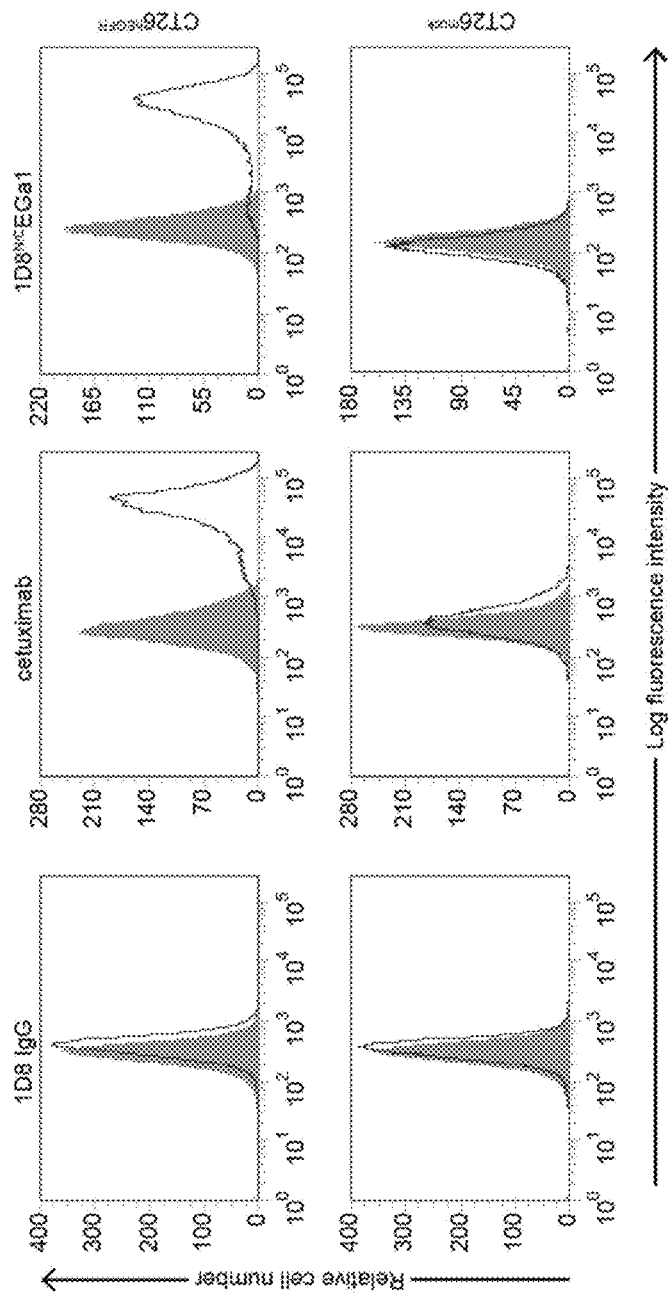
FIG. 19. Tumor model validation for $1D8^{N/C}EGa1$ trimerbody in vivo efficacy studies. (A) FACS analysis of $1D8^{N/C}EGa1$ trimerbody binding to the surface of CT26 EGFR-expressing cells (CT26$^{hEGFR}$) and CT26 infected with the empty vector retrovirus (CT26$^{mock}$). The 1D8 IgG and cetuximab were used as controls. The y-axis shows the number of cells and the x-axis represents the intensity of fluorescence, expressed on a logarithmic scale. One representative experiment out of three independent experiments is shown. (B) Comparative analysis of in vitro cell proliferation of CT26$^{hEGFR}$ versus CT26$^{mock}$ cells by the Cell Titer-Glo assay. Data represent the mean±SD of three independent experiments, and are presented as fold change relative to initial value. (C) Comparative in vivo tumor growth of CT26$^{mock}$ versus CT26$^{hEGFR}$ monitored up to 30 days. Tumor volume (cm$^3$) is expressed as a mean±SD (n=5) of one representative experiment (D). CT26$^{hEGFR}$ tumors were extracted after 30 days, mechanically dissociated and single cell suspensions analyzed for EGFR expression by FACS. Results from one representative animal are shown (n=5). (E) The $1D8^{N/C}EGa1$ trimerbody is not an inhibitor of CT26$^{hEGFR}$ proliferation. CT26$^{hEGFR}$ cells were incubated in the presence of equimolar concentrations of $1D8^{N/C}EGa1$, cetuximab and rituximab, and their effect on proliferation is represented as percentage compared to controls. Data represent mean±SD (n=5).
Figure 19B:
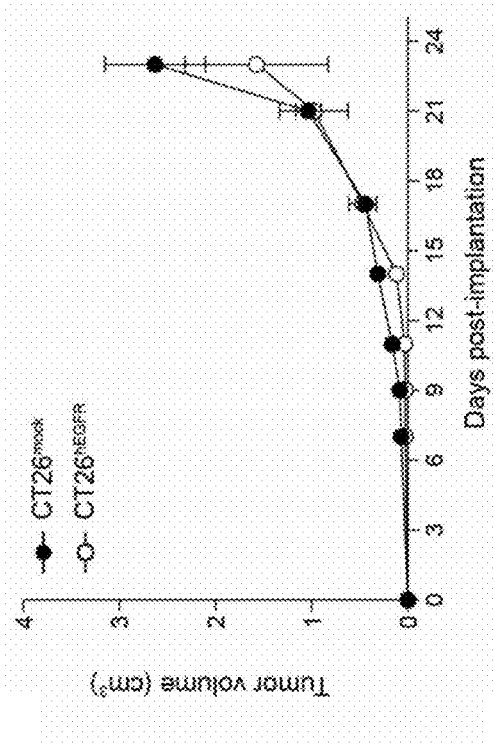
Figure 19C:
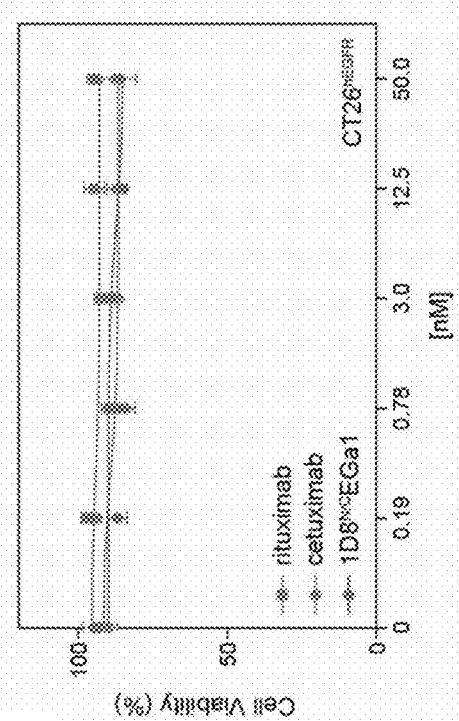
Figure 19D:
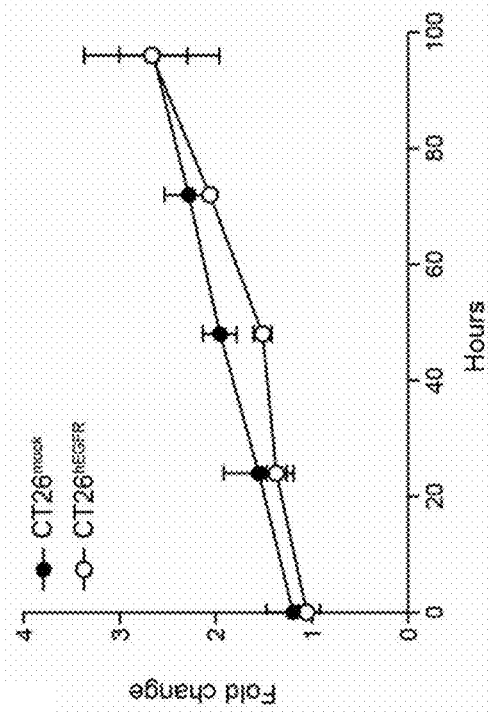
Figure 19E:
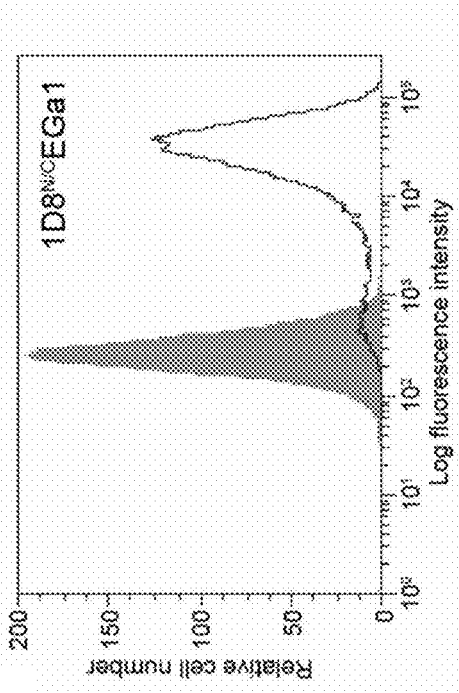

The EGFR-Targeted 4-1BB-Agonistic Trimerbody Demonstrated an Antitumor Activity Similar to IgG-Based 4-1BB Agonists To study the antitumor effects of the EGFR-targeted 4-1BB-agonist trimerbody in immune competent mice, murine CT26 colorectal carcinoma (H-2d) cells infected with retrovirus encoding human EGFR ($CT26^{hEGFR}$) were used (FIG. 19A). The in vitro cell proliferation rates, and the in vivo take rate and growth curves in BALB/c mice of $CT26^{hEGFR}$ cells and $CT26^{mock}$ cells, infected with empty vector retroviruses, were similar (FIGS. 19B and C), suggesting that expression of hEGFR did not significantly alter the poor immunogenicity of the CT26 tumor cells. Furthermore, ex vivo isolated $CT26^{hEGFR}$ cells from 3-weeks-old subcutaneous tumors expressed significant levels of surface hEGFR (FIG. 19D). To elucidate the functionality of the EGFR pathway in $CT26^{hEGFR}$ cells, the capacity of cetuximab and $1D8^{N/C}EGa1$ to inhibit their proliferation was studied. As shown in FIG. 19E, neither cetuximab nor $1D8^{N/C}EGa1$ had a significant effect on $CT26^{hEGFR}$ proliferation. Therefore, the potential therapeutic effect of $1D8^{N/C}EGa1$ is not contributed by an EGa1-mediated anti-proliferative effect.

Figure 5A:
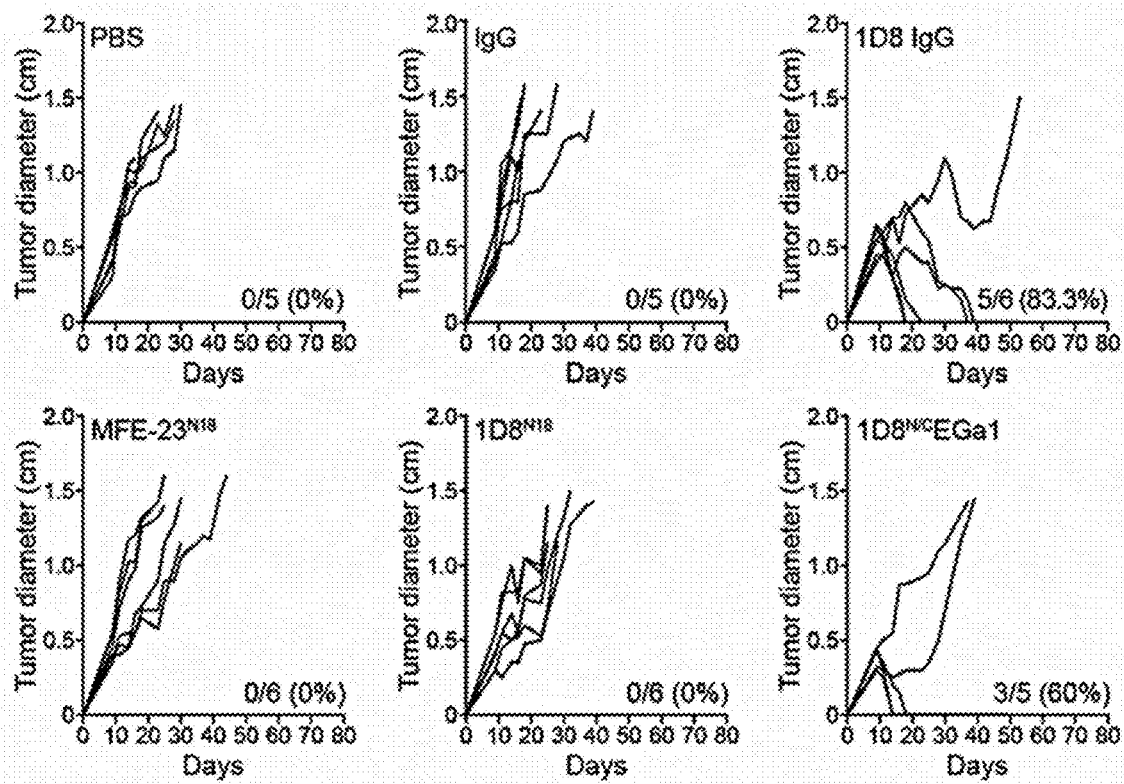
FIG. 5. Induction of tumor regression in mice treated with 1D8$^{N/C}$EGa1 trimerbody. BALB/c mice were inoculated s.c. with CT26$^{hEGFR}$ tumor cells. (A) Mice (n=6/group) were treated with three i.p. doses (4 mg/kg) of rat IgG$_{2a}$ isotype, 1D8 IgG, MFE-23$^{N18}$, 1D8$^{N18}$, 1D8$^{N/C}$EGa1, or with PBS, and monitored for tumor growth. Tumor diameter growth curves for individual mice in each treatment group are presented. The results are representative of two experiments identically performed. (B) Mice (n=5/group) were treated with three i.p. doses of either PBS, 3H3 IgG or 1D8$^{N/C}$EGa1 (B). (C) Survival curves of the 1D8$^{N/C}$EGa1 trimerbody-treated mice. Long-termed survivors, following complete tumor rejection (B) were rechallenged with CT26$^{mock}$ cells (s.c.) 50 days after i.p. injections of 3H3 IgG or 1D8$^{N/C}$EGa1 trimerbody. As a control group, tumor naïve mice developed tumors in every case. Tumor diameter growth curves for individual mice in each treatment group are presented.
Figure 5B:
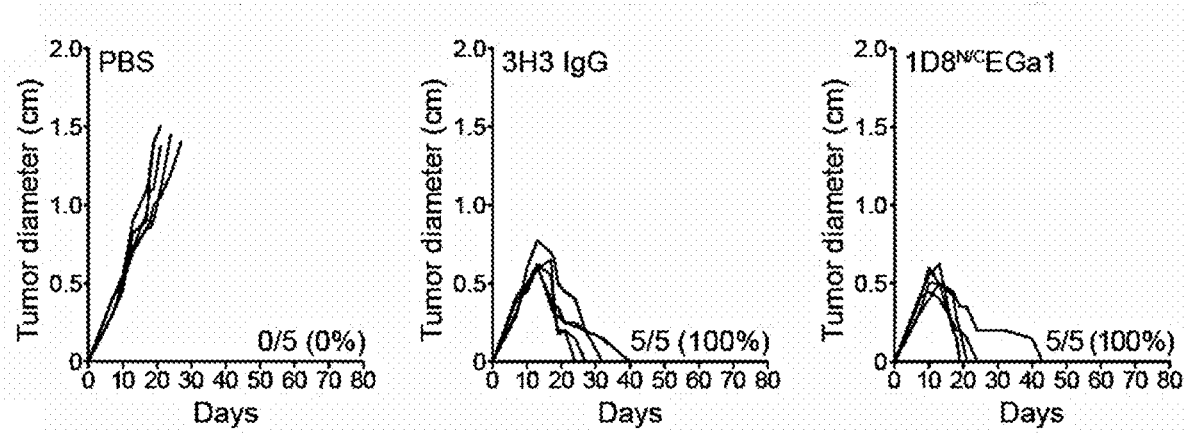
Figure 5C:
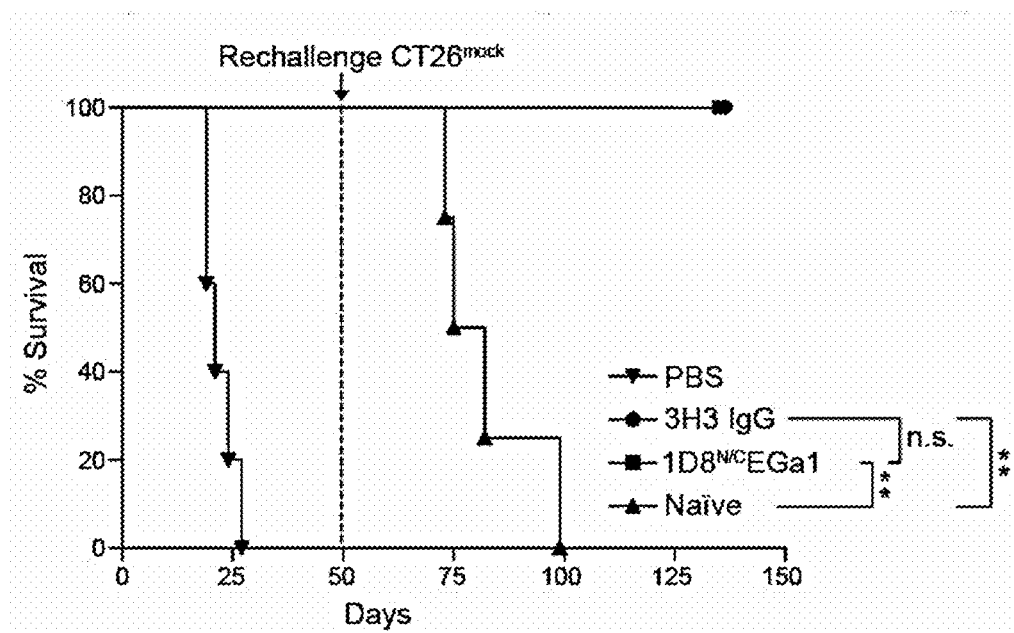
Figure 20:
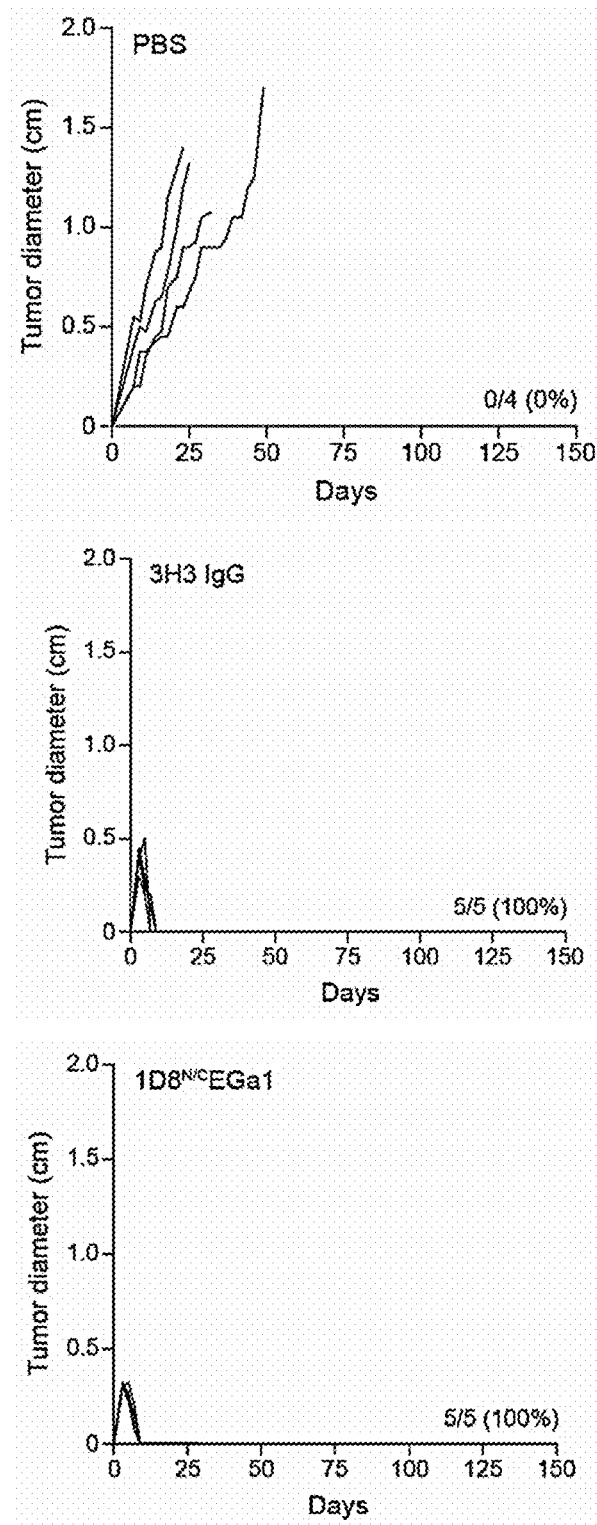
FIG. 20. Long-lasting systemic immune-mediated response after systemic injections of 3H3 IgG or $1D8^{N/C}EGa1$ trimerbody. Long-termed survivors, following complete tumor rejection were re-challenged with 1.5×10$^6$ CT26$^{mock}$ cells (s.c.) 50 days after i.p. injections of $1D8^{N/C}EGa1$ trimerbody and 3H3 IgG. As a control group, tumor naïve mice developed tumors in every case. Tumor diameter growth curves for individual mice in each treatment group are presented.

Intraperitoneal injections (3 times at 2-day intervals) of purified $1D8^{N/C}EGa1$ in mice bearing established $CT26^{hEGFR}$ tumors (average diameter of 0.4 cm) induced tumor regression in 8 out of 10 (80%) mice in two separate experiments (FIGS. 5A and B). Treatment with the IgG-based 4-1BB agonist antibodies 1D8 (FIG. 5A) or 3H3 (FIG. 5B) resulted in complete regression in 10 out of 11 (91%) mice bearing $CT26^{hEGFR}$ tumors. All mice treated with PBS, control antibodies (isotype rat $IgG_{2a}$ and $MFE-23^{N18}$), and $1D8^{N18}$ were sacrificed within 4-5 weeks after tumor cells implantation (FIGS. 5A and B). It is well established that mice cured by IgG-based 4-1BB-agonistic mAb treatment have long-lasting and tumor-specific immunity. To investigate whether the EGFR-targeted 4-1BB-agonistic trimerbody can generate a similar effect, mice that rejected the implanted $CT26^{hEGFR}$ tumor by treatment with 3H3 IgG or $1D8^{N/C}EGa1$ (FIG. 5B), were rechallenged 3 months later with $CT26^{mock}$ cells. 3H3 IgG- and $1D8^{N/C}EGa1$-cured mice, but not age-matched naive mice, were resistant to a rechallenge with $CT26^{mock}$ tumor cells (FIGS. 5C and 20), showing that the trimerbody-mediated EGFR-targeted 4-1BB costimulation can induce long-term protective immunological memory against CT26 tumors that do not express hEGFR.

Figure 6A:
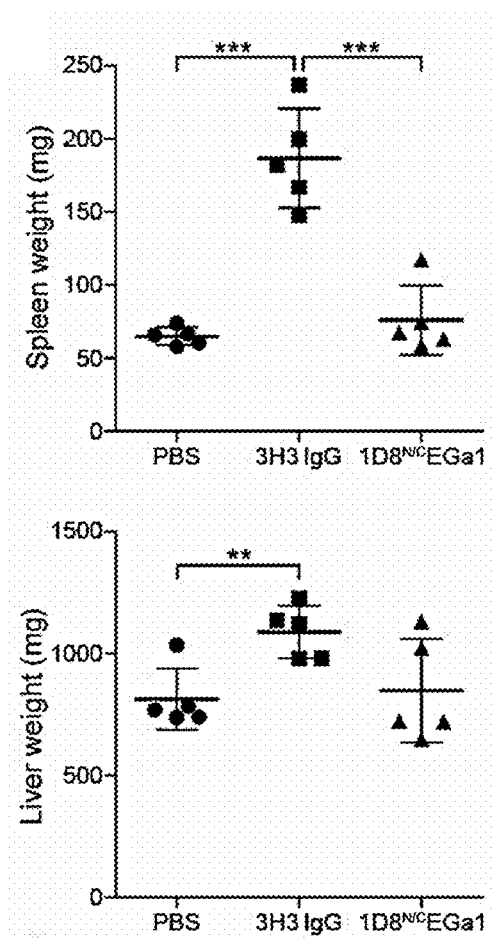
FIG. 6. Mice treated with 1D8$^{N/C}$EGa1 do not develop splenomegaly, hepatomegaly or tissue inflammation. (A) Spleens and liver weights from mice (n=5/group), treated with PBS, 3H3 IgG or 1D8$^{N/C}$EGa1 are shown. (B) Hematoxylin and eosin staining of representative tissue slides from spleen, liver, pancreas and lung of mice treated with PBS, 3H3 IgG and 1D8$^{N/C}$EGa1. Magnification is 40× (spleen and liver) and 200× (liver, pancreas and lung). Scale bars are shown. (C) Quantification of the mononuclear cells infiltrated surface in the liver of mice treated with PBS (n=3), 3H3 IgG (n=5) or 1D8$^{N/C}$EGa1 (n=4). (D) Sera from treated mice were collected from peripheral blood at day 0, 7 and 21 of treatment, and levels of INFγ, TNFα and IL-6 were measured by Luminex® assays (n=3 per time point). All statistics are represented as mean±SD. Significance was measured by unpaired Student's t test; *$P \leq 0.05$, $P \leq 0.01$, *$P \leq 0.001$.
Figure 6B:
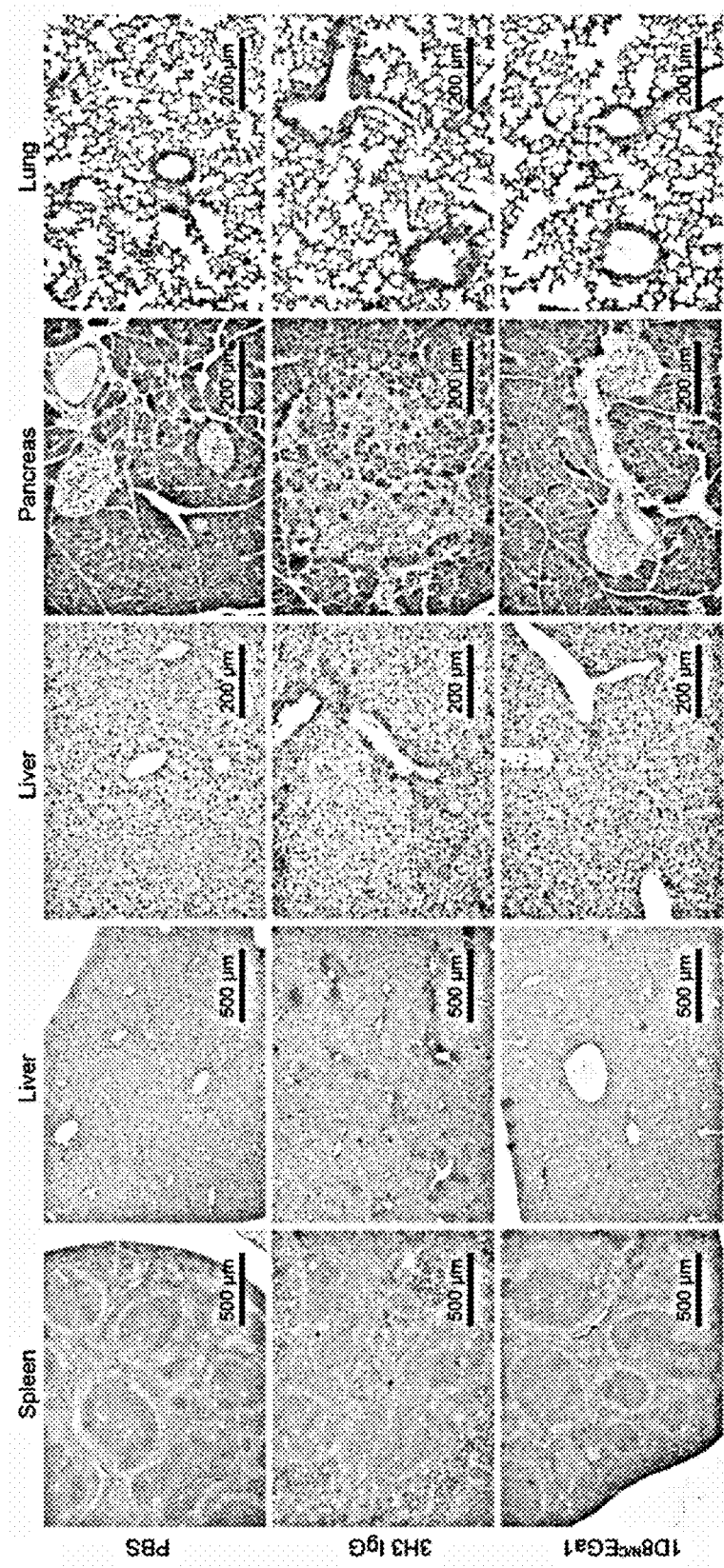
Figure 21:
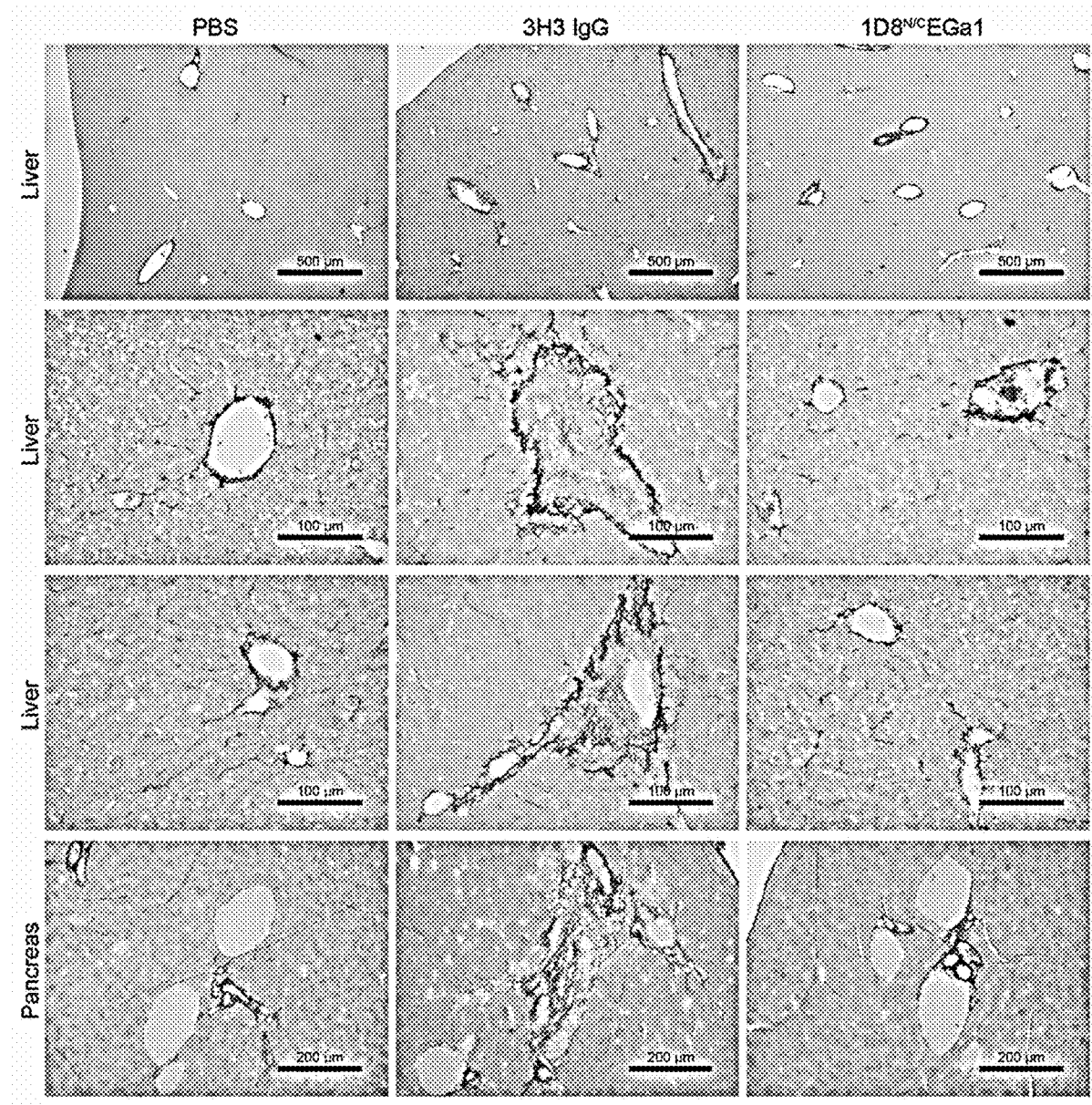
FIG. 21. Effect of $1D8^{N/C}EGa1$ trimerbody on collagen fibers formation. Sirius red staining of collagen fibers of representative tissue slides from liver and pancreas of mice treated with PBS, 3H3 IgG or $1D8^{N/C}EGa1$. Magnification is 40× and 200× (liver) and 100× (pancreas). Scale bars are shown.
Figure 22:
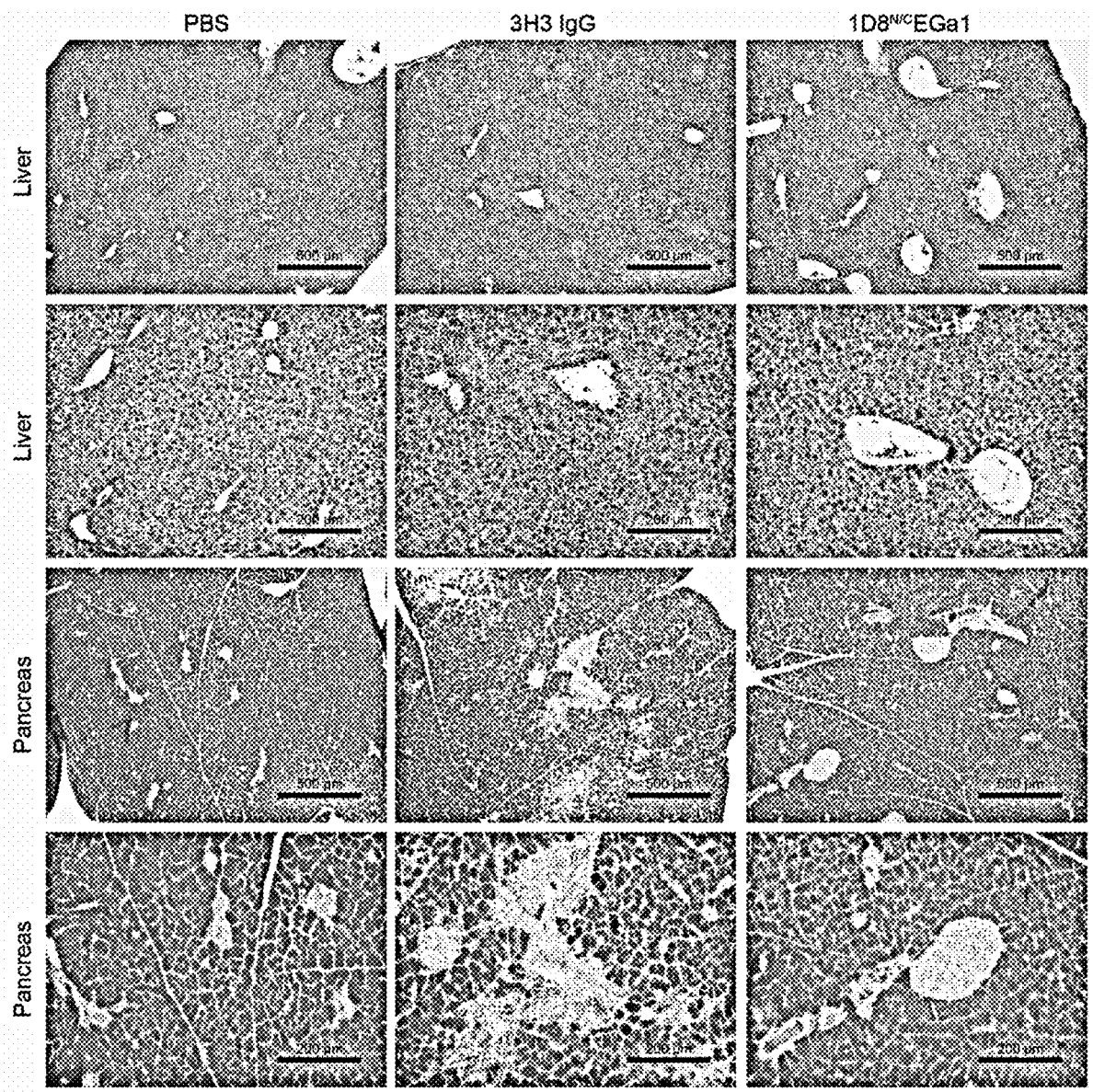
FIG. 22. Effect of $1D8^{N/C}EGa1$ trimerbody on collagen fibers formation. Masson trichrome staining of representative tissue slides from liver and pancreas of mice treated with saline, 3H3 IgG or $1D8^{N/C}EGa1$ Magnification is 40× and 100×. Scale bars are shown.

Mice Treated with the EGFR-Targeted 4-1BB-Agonistic Trimerbody Lack the Immunological Disorders Observed with IgG-Based 4-1BB Agonists It was compared the toxicity profile of $1D8^{N/C}EGa1$ directly with 3H3 IgG under similar conditions. Mice were injected i.p. with PBS, 3H3 IgG, or $1D8^{N/C}EGa1$ (6 mg/kg) once a week for 3 weeks and euthanized one week later. As shown in FIG. 6A, treatment with 3H3 IgG resulted in gross enlargement of spleen and livers as demonstrated by weight. In contrast, treatment with $1D8^{N/C}EGa1$ did not result in splenomegaly or hepatomegaly (FIG. 6A). The histologic study of the spleens of mice treated with 3H3 IgG revealed an altered architecture with expanded follicles with undefined zones and clear evidence of extramedullary hematopoiesis (FIG. 6B), as previously described (Niu L, et al. *J. Immunol.* 2007; 178:4194-4213). In contrast, spleens of mice treated with $1D8^{N/C}EGa1$ showed normal histology (FIG. 6B). Also confirming previous results (Niu L, et al.), treatment with 3H3 IgG caused significant mononuclear cell infiltration in the liver, forming periportal cuffs with thickening of tunica media and also infiltration foci associated to microvasculature, while no significant infiltration was observed in mice treated with $1D8^{N/C}EGa1$ (FIG. 6B). Indeed, the surface of infiltrating mononuclear cells accounted for 8% of the liver of mice treated with 3H3 IgG, while it only represented 0.6% in mice treated with $1D8^{N/C}EGa1$ and 0.25% in mice treated with PBS (FIG. 6C). In addition, staining of collagen fibers with sirius red (FIG. 21) or Masson's trichrome (FIG. 22) showed that 3H3 IgG treatment, but not $1D8^{N/C}EGa1$, caused the deposition and disarrayment of portal collagen fibers, indicative of an early stage of fibrosis. Mononuclear cell infiltration was also seen in lungs, forming perivascular cuffs, and in pancreas of 3H3 IgG treated mice. Pancreas infiltration radiated from the vasculature and extended to the neighboring intercalated ducts (FIG. 6B). Prominent collagen deposition in the infiltrated areas of the pancreas of mice treated with 3H3 IgG was observed, indicative of fibrosis. In contrast, none of these features were observed in mice treated with $1D8^{N/C}EGa1$ (FIGS. 21 and 22). It was then compared the effect of treatment with 3H3 IgG and $1D8^{N/C}EGa1$ on the levels of proinflammatory cytokines in serum. As shown in FIG. 6D, 3H3 IgG treatment triggered significant elevation of INFγ, TNFα and IL6, particularly evident at day 21. By contrast, $1D8^{N/C}EGa1$ induced minimal or undetectable levels of inflammatory cytokines comparable to PBS-treated animals.

Design and Expression of a CEA-Targeted 4-1BB-Agonistic Trimerbody

Figure 23:
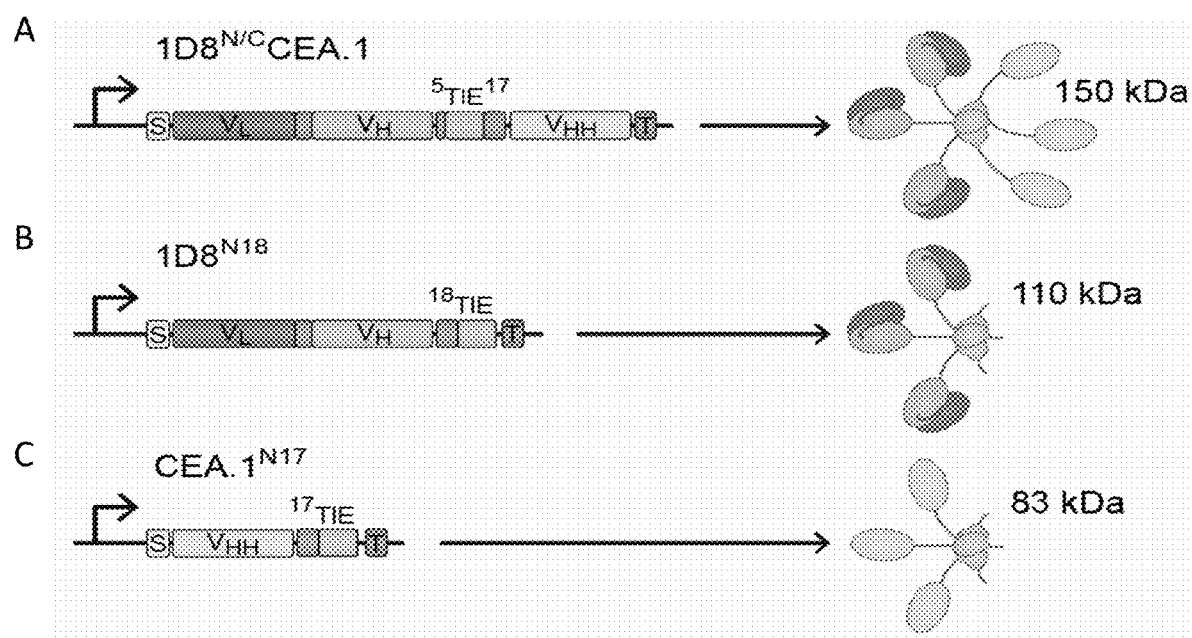
FIG. 23. Schematic diagrams showing the genetic (left) and domain structure (right) of the bispecific $1D8^{N/C}CEA.1$ trimerbody, and the monospecific $1D8^{N18}$ and CEA.1$^{N17}$ trimerbodies. The variable regions ($V_L$-$V_H$) derived from 1D8 antibody are represented in dark and light gray respectively, the anti-CEA $V_{HH}$ CEA.1 in light gray (designated by $V_{HH}$) the TIE$^{XVIII}$ domains in light gray, and the linker regions embracing it also in gray (indicated by $^5$TIE$^{17}$, $^{18}$TIE and $^{17}$TIE. All the trimerbodies contain a signal peptide from oncostatin M (white box designated by S), and a His6-myc tag (dark gray box designated by T). Arrows indicate the direction of transcription.

To generate the CEA-targeted 4-1BB-agonistic trimerbody the anti-human CEA single-domain antibody ($V_{HH}$; CEA.1) was fused to the C-terminus of $1D8^{N5}$ through a 17-residue-long linker giving the $1D8^{N/C}CEA.1$ trimerbody (FIG. 23a).

Figure 24A:
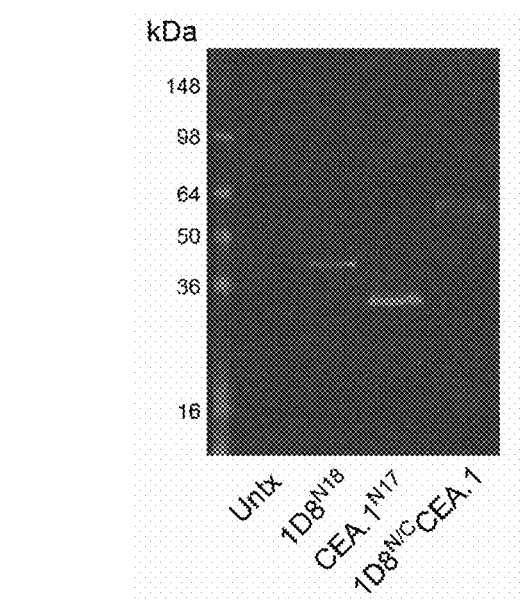
FIG. 24. Characterization of secreted $1D8^{N/C}CEA.1$ trimerbody. (A) The presence of secreted trimerbodies in the conditioned media from untransfected (untx) or transfected HEK293 cells was demonstrated by western blot analysis. Migration distances of molecular mass markers are indicated (kDa). The blots were developed with anti-c-myc mAb, followed by incubation with an IRDye800-conjugated goat anti-mouse IgG. The functionality of secreted trimerbodies was demonstrated by ELISA against plastic immobilized hCEA and m4-1BB (B). Simultaneous binding to hCEA and m4-1BB was assessed by dual ELISA by direct immobilization of hCEA, followed by 100 µl of neat supernatant from transfected HEK293 cells and addition of m4-1BB (C). Flow cytometry on HEK293 cells and HEK293m4-1BB cells (D), using 100 µl of neat supernatant from transiently transfected HEK293 cells. An anti-MHC class I mAb was used as control.
Figure 24B:
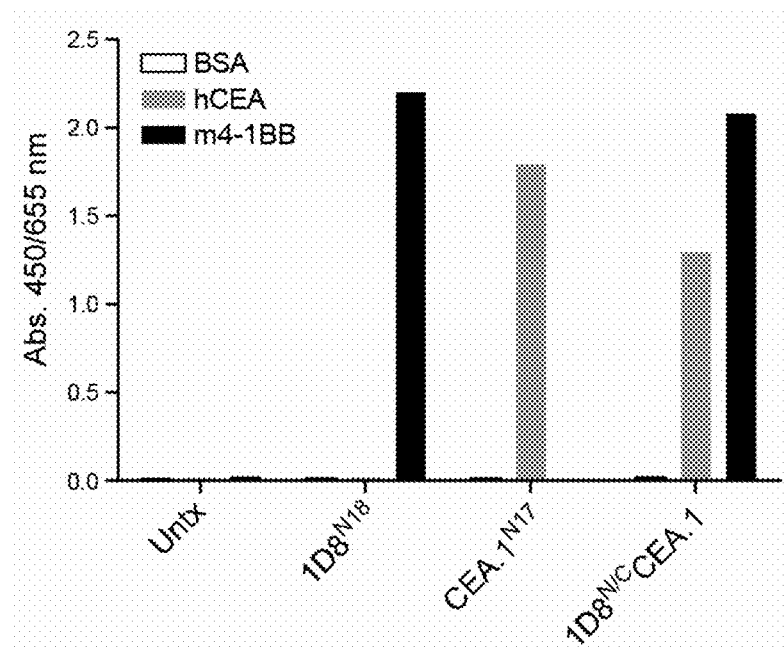
Figure 24C:
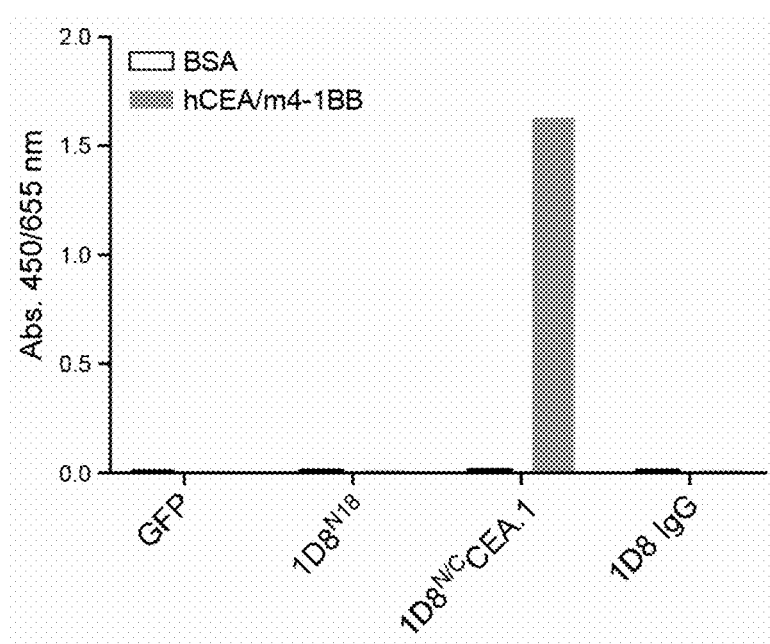
Figure 24D:
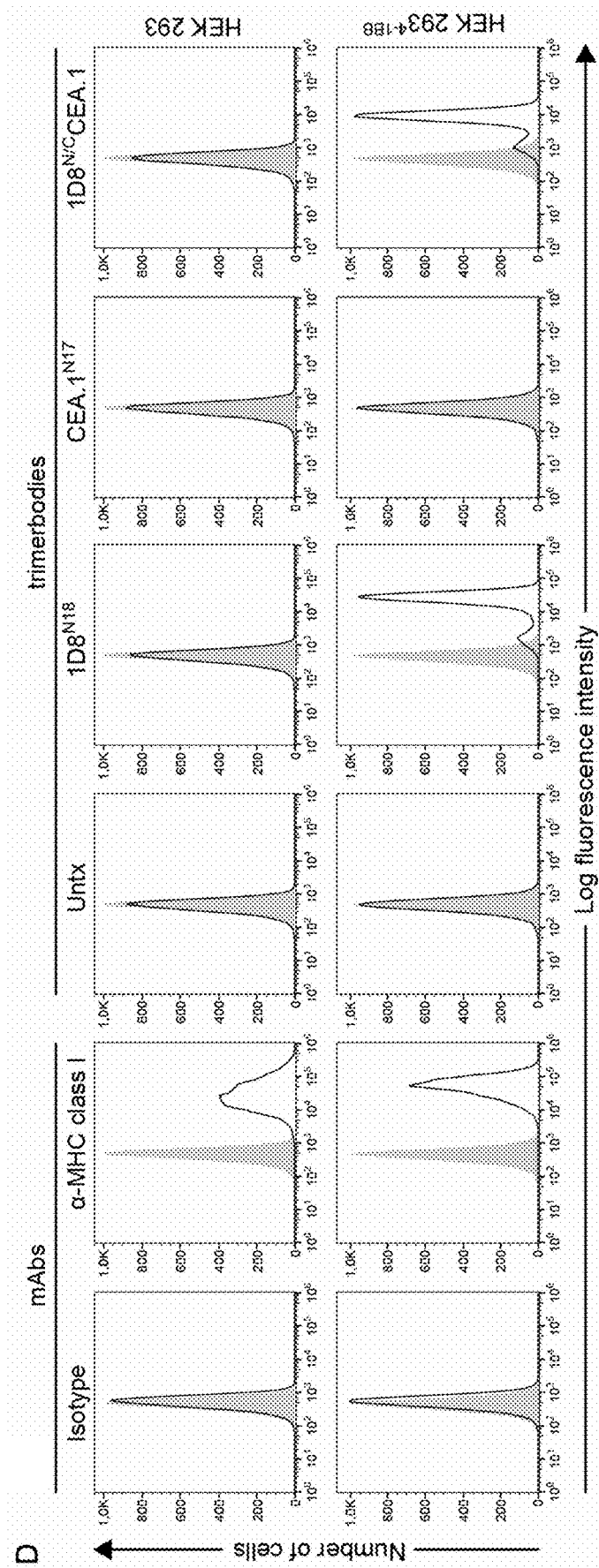

The $1D8^{N5}$ is a compact scFv-based N-terminal trimerbody in which the 1D8 scFv is connected to the murine collagen XVIII-derived homotrimerization ($TIE^{XVIII}$) domain with a 5-residue-long linker. The construct was designed with a c-myc and His tag at the C-terminus of the CEA.1 $V_{HH}$. The construct was secreted by transfected HEK293 cells at similar levels to $1D8^{N18}$ but at lower levels than the $V_{HH}$-based N-terminal trimerbody CEA.1$^{N17}$ (FIG. 24a). $1D8^{N18}$ is a scFv-based N-terminal trimerbody with an 18-residue-long linker (FIG. 23b), and CEA.1$N^{17}$ is $V_{HH}$-based N-terminal trimerbody with a 17-residue-long linker (FIG. 23c). ELISA analysis demonstrated that $1D8^{N18}$ specifically recognized murine 4-1BB in fusion with human Fc (m4-1BB), CEA.1$^{N17}$ specifically recognized human CEA (hCEA), whereas $1D8^{N/C}CEA.1$ showed specific binding to both antigens (FIG. 24b). Furthermore, when conditioned medium from $1D8^{N/C}CEA.1$-transfected HEK293 cells was added to hCEA-coated wells and, after washing, the CEA-bound trimerbodies were able to capture soluble m4-1BB (FIG. 24c). The ability to detect m4-1BB in a cellular context was studied by flow cytometry. $1D8^{N18}$ and $1D8^{N/C}CEA.1$ bound to HEK293 cells transfected to express murine 4-1BB on their cell surface (HEK293$^{m4-1BB}$), but not to untransfected HEK293 cells. No binding was detected for CEA.1N$^{17}$ (FIG. 24d).

Structural Characterization of the CEA-Targeted 4-1BB-Agonistic Trimerbody

Figure 25A:
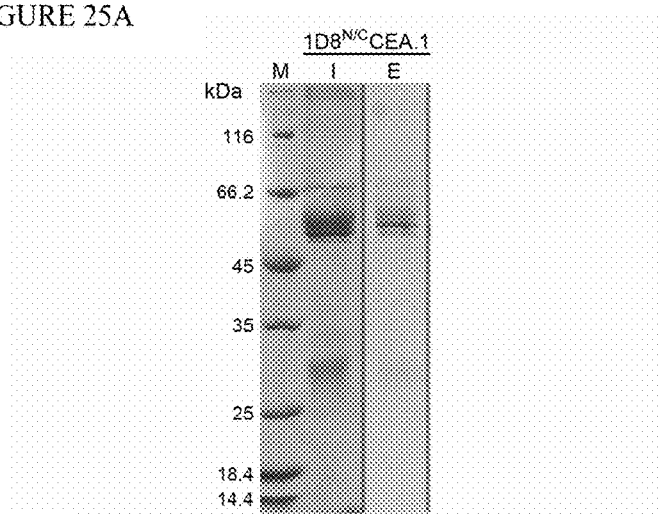
FIG. 25. Structural characterization of purified $1D8^{N/C}CEA.1$ trimerbody. (A) Reducing SDS-PAGE of $1D8^{N/C}CEA.1$. The sample injected in the SEC column (I, 5 575 µL of the 0.3 g/L stock) and eluted at 12.4 mL (E; total protein present in the central 300 µL fraction was precipitated before loading). The grey vertical line indicates that the lanes belong to different gels. (B) Oligomeric analysis of the purified $1D8^{N/C}CEA.1$ trimerbody by SEC-MALS with the indicated molecular mass measured at the center of the chromatography peak. (C) Circular dichroism spectrum (mean residue ellipticity) of $1D8^{N/C}CEA.1$, and (D) thermal denaturation measured by the change in ellipticity at 218 nm.
Figure 25B:
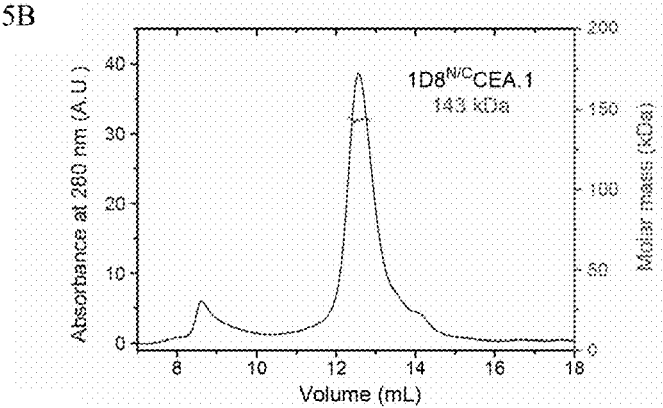
Figure 25C:
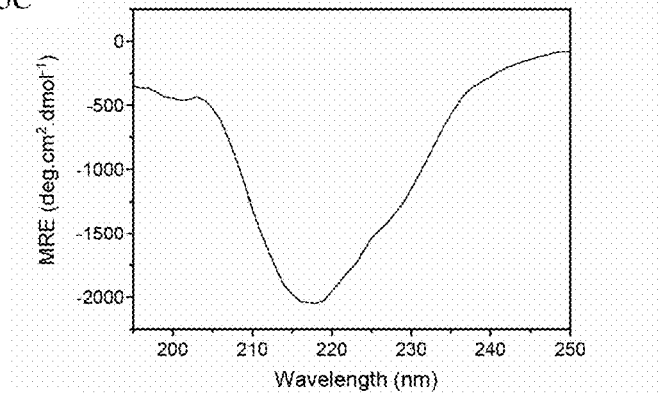
Figure 25D:
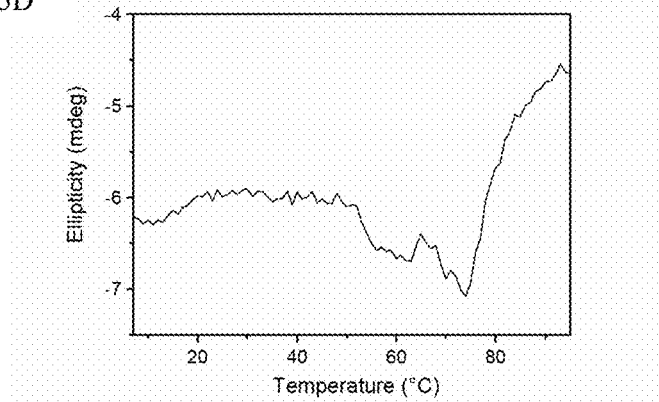

The $1D8^{N/C}CEA.1$ was produced in stably transfected HEK293 cells and purified from conditioned medium by immobilized metal affinity chromatography, which yielded proteins with a high degree of purity as determined by reducing SDS-PAGE (FIG. 25a). Mass spectrometry indicates a molecular weight of 50.4 kDa, which is the expected weight for the protomer after signal sequence processing (data not shown). The SEC-MALS chromatogram (FIG. 25b) shows a major peak eluting at 12.6 mL with a molar mass of 143 kDa at the center of the peak, which indicates the formation of trimers in solution (with a calculated mass of 151.2 kDa). The chromatography also shows a minor proportion of aggregated material eluting at 8.7 mL, the exclusion volume of the column. The circular dichroism spectrum, with a minimum at 218 nm is consistent with a predominantly n-sheet secondary structure, which is stable up to approximately 50° C. (FIG. 25c-d). The thermal denaturation is irreversible as a large pellet was observed in the cuvette.

Functional Characterization of the CEA-Targeted 4-1BB-Agonistic Trimerbody

Figure 26:
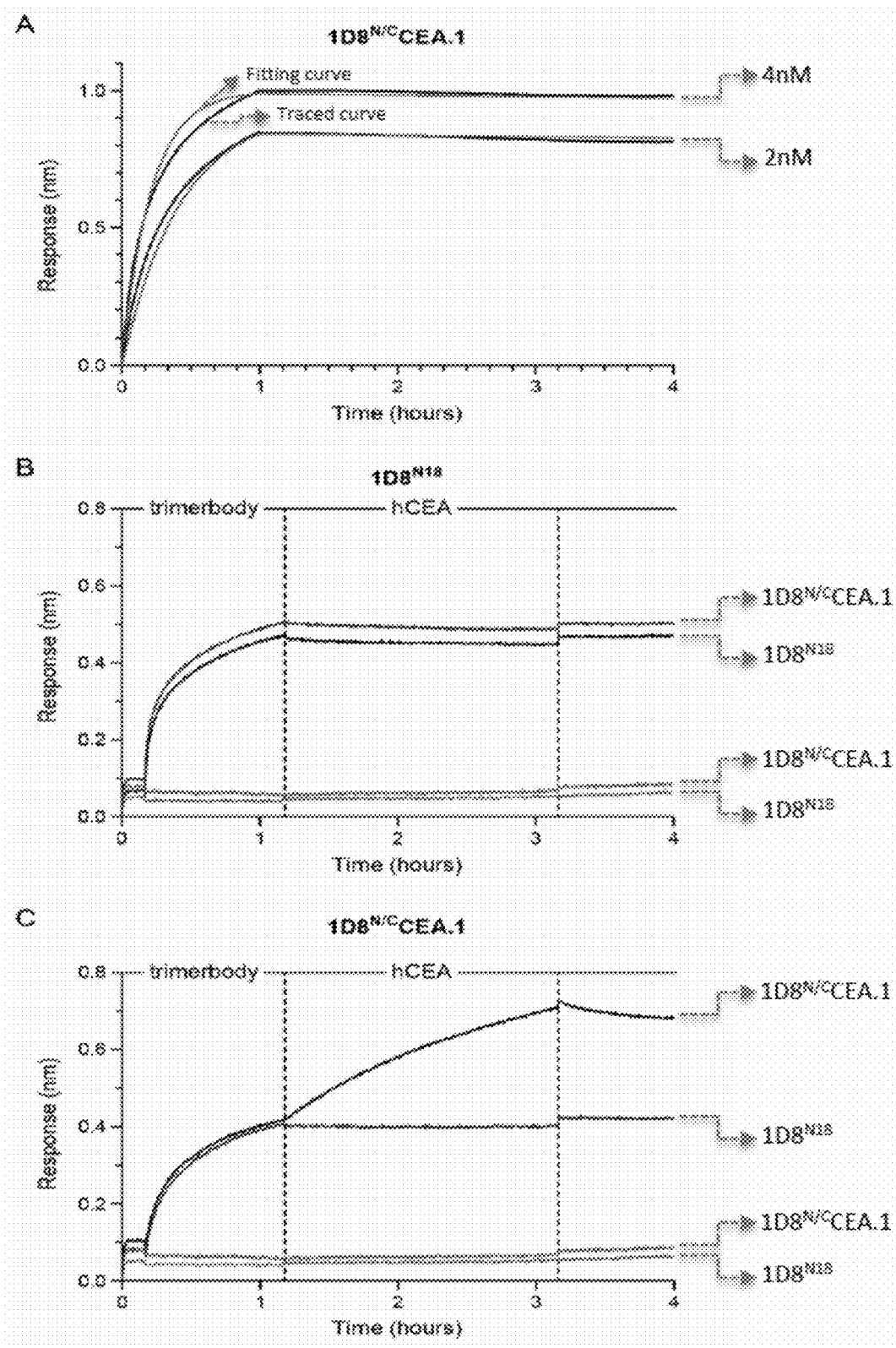
FIG. 26. Functional characterization of purified $1D8^{N/C}CEA.1$ trimerbody. Biolayer interferometry (BLI)-derived sensorgrams from the interactions between immobilized m4-1BB and $1D8^{N/C}CEA.1$ at 4 or 2 nM. Experimental responses are traced in black, and fitting curves are in gray (A). BLI sensorgrams demonstrating $1D8^{N/C}CEA.1$ bispecificity towards biosensors coated with m4-1BB and hCEA in solution (B and C). Following association with either $1D8^{N/C}CEA.1$ or $1D8^{N18}$ (sample indicated with arrows) or kinetics buffer only (sample indicated with arrows), biosensors were transferred into 50 nM of hCEA (black and red) or kinetics buffer only (blue and green). $1D8^{N/C}CEA.1$ binds to both antigens, while $1D8^{N18}$ only binds m4-1BB; hCEA did not interact with the m4-1BB-coated biosensors in the absence of trimerbody.

The binding kinetics of the bispecific $1D8^{N/C}CEA.1$ was investigated by biolayer interferometry (BLI) using biosensors coated with m4-1BB (FIG. 25a). As shown in FIG. 26a, the $1D8^{N/C}CEA.1$ showed saturating binding to m4-1BB at low nanomolar concentrations and an extremely slow dissociation (with an interaction half-life>40 hours, as less than 5% dissociation was observed over 3 hours), which is consistent with the binding behavior previously reported for m4-1BB-binding trimerbodies. We also used BLI to demonstrate the simultaneous binding of $1D8^{N/C}CEA.1$ to both m4-1BB and hCEA. $1D8^{N/C}CEA.1$ and $1D8^{N18}$ were both able to associate with sensor-immobilized m4-1BB, and $1D8^{N/C}CEA.1$ showed a subsequent binding to hCEA in solution (FIGS. 26b and c). Importantly, this indicates that the binding to either antigen does not sterically inhibit binding to the other antigen, which would prevent $1D8^{N/C}CEA.1$ from participating in the crosslinking of T cells and tumor cells.

Figure 27:
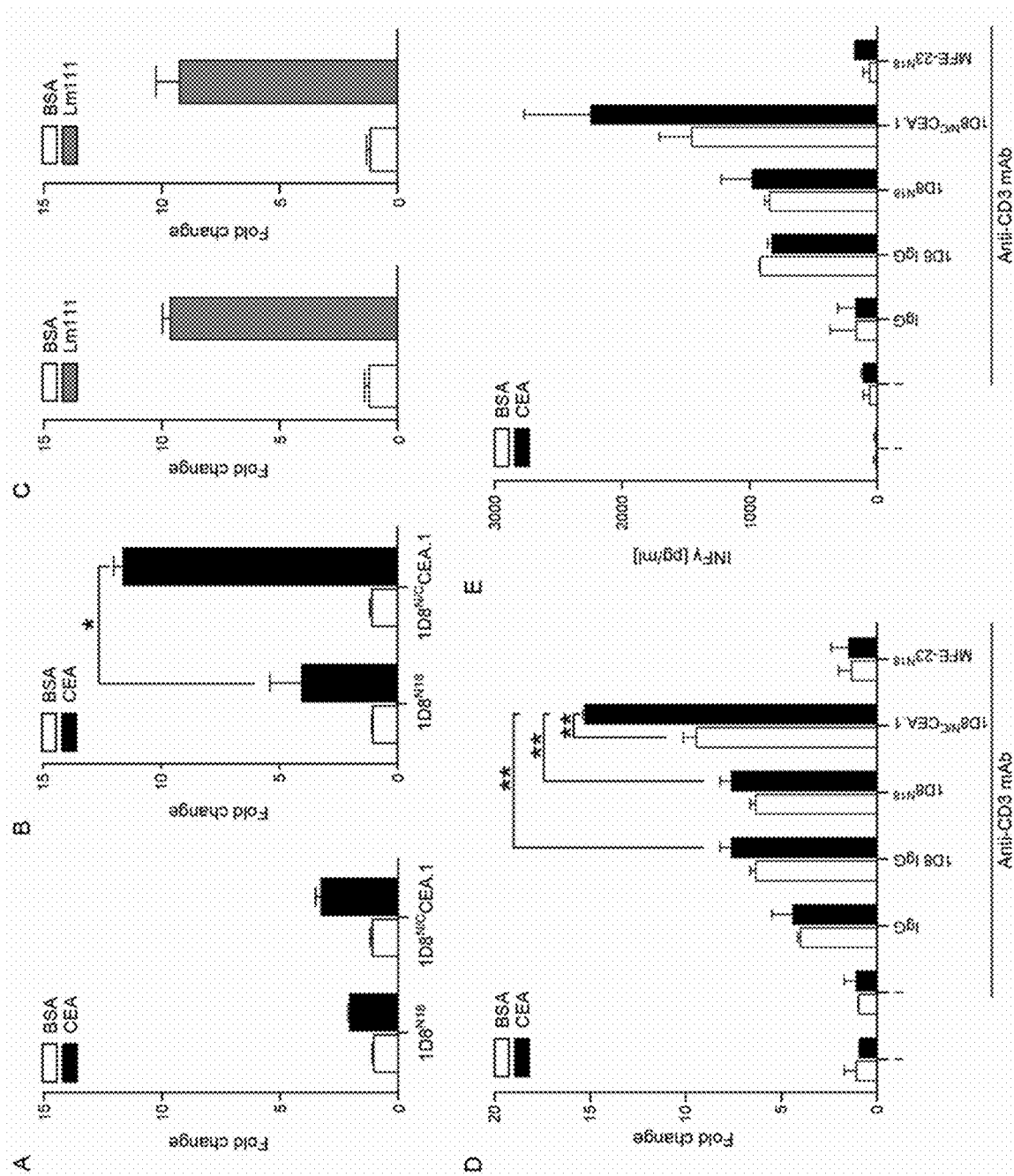
FIG. 27. Functional characterization of 1D8$^{N/C}$CEA.1 trimerbody. Adhesion of HEK293 cells (A) and HEK293$^{m4\text{-}1BB}$ cells (B) to plastic-immobilized BSA or CEA, after incubation with purified 1D8$^{N18}$ or 1D8$^{N/C}$CEA.1 trimerbodies. Adhesion of HEK293 cells and HEK293$^{m4\text{-}1BB}$ cells to plastic-immobilized laminin 111 (Lm111) was used as a control (C). Data are plotted as the fold change in adhesion relative to BSA. Costimulatory activity of anti-4-1BB antibodies (D and E). Mouse CD8a+ T cells were plated with immobilized anti-CD3 mAb and hCEA or BSA in the presence of 1D8 IgG, 1D8$^{N18}$, or 1D8$^{N/C}$CEA.1, and proliferation (D) and IFN-γ secretion (E) were determined after 48 hours. All the results are representative of one of three independent experiments. Data are mean±SD (n=3), **P≤0.01, Student's t test.

To further assess the multivalency and multispecificity of the $1D8^{N/C}CEA.1$ trimerbody, cell adhesion assays (FIGS. 27a and b) were performed. As shown in FIG. 27b, HEK293m4-1BB cells adhered to CEA-coated wells after incubation with $1D8^{N/C}CEA.1$. Moreover, $1D8^{N/C}CEA.1$ was more efficient than laminin in supporting the adhesion of 4-1BB-positivecells (FIG. 27c). The adhesion of HEK293m4-1BB cells was specific since no adhesion of wild-type HEK293 cells to BSA- and CEA-coated wells was detected (FIG. 27a). Furthermore, BSA- and CEA-coated wells, preincubated with $1D8^{N18}$ did not support any significant cell adhesion of 4-1BB-positive and 4-1BB negative cells (FIGS. 27a and b).

Then, it was determined whether $1D8^{N/C}CEA.1$ retained the baseline costimulatory capacity seen for $1D8^{N18}$, and whether this was improved by the crosslinking provided through CEA.1's binding to hCEA. Mouse CD8a+ T cells were stimulated with immobilized anti-CD3 mAb and the costimulatory antibodies 1D8 IgG, $1D8^{N18}$ and $1D8^{N/}$ cCEA.1 in solution, in the presence or absence of plasticimmobilized hCEA. The $1D8^{N/C}CEA.1$ had a costimulatory effect similar to $1D8^{N18}$ in the absence of hCEA, but proliferation (P=0.003) and IFNγ levels (P=0.090) were greatly enhanced when hCEA was included (FIGS. 27c and d).

---

The invention claimed is:

1. A trimeric polypeptide complex comprising three monomer polypeptides
   wherein each monomer polypeptide comprises:
   i. a homotrimerization domain selected from the group consisting of the collagen XVIII homotrimerization domain ($TIE^{XVIII}$), the collagen XV homotrimerization domain ($TIE^{XV}$) and a functionally equivalent variant thereof, wherein the functionally equivalent variant of $TIE^{XVIII}$ is a sequence showing at least 80% identity with the sequence SEQ ID NO: 12 and the functionally equivalent variant of $TIE^{XV}$ is a sequence showing at least 80% identity with the sequence SEQ ID NO: 2; and
   ii. an agonist of a TNFR family costimulatory receptor, and
   wherein at least one monomer polypeptide further comprises a polypeptide region which is capable of specifically binding to a tumor associated antigen.

2. The trimeric polypeptide complex according to claim 1 wherein the region which is capable of specifically binding to the tumor associated antigen is positioned N-terminal or C-terminal with respect to the homotrimerization domain.

3. The trimeric polypeptide complex according to claim 2 wherein
   a. if the region which is capable of specifically binding to the tumor associated antigen is positioned N-terminal with respect to the homotrimerization domain, then the agonist of a TNFR family costimulatory receptor is positioned C-terminal with respect to the homotrimerization domain, or
   b. if the region which is capable of specifically binding to the tumor associated antigen is positioned C-terminal with respect to the homotrimerization domain, then the agonist of a TNFR family costimulatory receptor is positioned N-terminal with respect to the homotrimerization domain.

4. The trimeric polypeptide complex according to claim 1 wherein the TNFR family costimulatory receptor is 4-1BB.

5. The trimeric polypeptide complex according to claim 1 wherein the agonist of the TNFR family costimulatory receptor is an agonistic antibody.

6. The trimeric polypeptide complex according to claim 1 wherein the tumor associated antigen is the epidermal growth factor receptor (EGFR).

7. The trimeric polypeptide complex according to claim 6, wherein the polypeptide region which is capable of specifically binding to EGFR is an antibody.

8. The trimeric polypeptide complex according to claim 7, wherein the anti-EGFR antibody is the EGA1 nanobody encoded by the sequence shown in SEQ ID NO: 3.

9. The trimeric polypeptide complex according to claim 1 wherein the tumor associated antigen is a carcinoembryonic antigen (CEA).

10. The trimeric polypeptide complex according to claim 9, wherein the polypeptide region which is capable of specifically binding to CEA is an anti-CEA antibody.

11. The trimeric polypeptide complex according to claim 1 wherein the agonist of the TNFR family costimulatory receptor, the polypeptide region which is capable of specifically binding to the tumor associated antigen and/or the homotrimerization domain are either directly linked or linked through a spacer.

12. The trimeric polypeptide complex according to claim 1 wherein the agonist of the TNFR family costimulatory receptor is linked to the homotrimerization domain through a 18-residue-long linker and/or wherein the polypeptide region which is capable of specifically binding to the tumor associated antigen is linked to homotrimerization domain through a 16-residue long linker.

13. The trimeric polypeptide complex according to claim 1 wherein at least one of the monomers further comprises a tag suitable for detection and/or purification of the trimeric polypeptide complex and/or wherein at least one of the monomers further comprise a moiety which increases its circulation half-life.

14. The trimeric polypeptide complex according to claim 5 wherein the agonistic antibody of the TNFR family costimulatory receptor is a scFv, a nanobody or an antibody mimetic.

15. The trimeric polypeptide complex according to claim 6, wherein the polypeptide region which is capable of specifically binding to EGFR is a scFv, a nanobody or an antibody mimetic.

16. The trimeric polypeptide complex according to claim 10, wherein the anti-CEA antibody is a scFv, a nanobody or an antibody mimetic.

17. The trimeric polypeptide complex according to claim 11 wherein the spacer is a flexible linker with between 1 and 18 residues.

18. The trimeric polypeptide complex according to claim 13 wherein the moiety that increases the circulation half-life of the trimer is an albumin fragment or an albumin-binding moiety.

19. A pharmaceutical composition comprising a trimeric polypeptide complex according to claim 1.

20. A polynucleotide encoding the monomer polypeptide forming part of the trimeric polypeptide complex as defined in claim 1, wherein the monomer polypeptide comprises:
   a homotrimerization domain selected from the group consisting of the collagen XVIII homotrimerization domain ($TIE^{XVIII}$), the collagen XV homotrimerization domain ($TIE^{XV}$) and a functionally equivalent variant thereof; and
   an agonist of a TNFR family costimulatory receptor, and
   a polypeptide region which is capable of specifically binding to a tumor associated antigen.

21. A vector comprising the polynucleotide according to claim 20.

22. A host cell comprising a vector according to claim 21.

23. A method for producing a trimeric polypeptide complex according to claim 1 which comprises isolating said trimeric polypeptide complex from a culture comprising a host cell which carries and expresses a polynucleotide which encodes a polypeptide comprising:

a homotrimerization domain selected from the group consisting of the collagen XVIII homotrimerization domain ($TIE^{XVIII}$), the collagen XV homotrimerization domain ($TIE^{XV}$) and a functionally equivalent variant thereof; and an agonist of a TNFR family costimulatory receptor, and a polypeptide region which is capable of specifically binding to a tumor associated antigen, and optionally subjecting the trimeric polypeptide to further processing.

24. A method of treating cancer which comprises administering the trimeric polypeptide complex according to claim 1 to a subject in need thereof.

25. The method for treating cancer according to claim 24, wherein the cancer is positive for the tumor associated antigen which is specifically recognized by the polypeptide region capable of specifically binding to a tumor associated antigen present in the trimeric polypeptide complex.

26. The method for treating cancer according to claim 25, wherein the cancer is selected from the group consisting of colorectal cancer, lung cancer, breast cancer, pancreatic, renal, head and neck, gastric cancer, esophageal cancer, gynecologic cancer, prostate cancer, urothelial, a neurological cancer, and an haematological cancer.

27. The method according to claim 26, wherein the gynecologic cancer is selected from the group consisting of ovarian, cervical and endometrial cancer, the neurological cancer is glioblastoma multiforme or the haematological cancer is acute myelogenous leukaemia.

\* \* \* \* \*